(12) United States Patent
Wang et al.

(10) Patent No.: US 9,738,398 B1
(45) Date of Patent: Aug. 22, 2017

(54) EJECTABLE FLIGHT DATA RECORDER SYSTEMS, METHODS, AND DEVICES

(71) Applicant: COMAC AMERICA CORPORATION, Newport Beach, CA (US)

(72) Inventors: Mingwei Wang, Irvine, CA (US); Richard Lane, Fullerton, CA (US); Don Harris, Corona, CA (US); Chen Li, Irvine, CA (US)

(73) Assignee: COMAC AMERICA CORPORATION, Newport Beach, CA (US)

( * ) Notice: Subject to any disclaimer, the term of this patent is extended or adjusted under 35 U.S.C. 154(b) by 0 days.

(21) Appl. No.: 15/581,567

(22) Filed: Apr. 28, 2017

Related U.S. Application Data

(60) Provisional application No. 62/451,516, filed on Jan. 27, 2017.

(51) Int. Cl.
*B64D 45/00* (2006.01)
*B64D 1/14* (2006.01)
(Continued)

(52) U.S. Cl.
CPC ............... *B64D 45/00* (2013.01); *B64D 1/12* (2013.01); *B64D 1/14* (2013.01); *G01S 1/70* (2013.01);
(Continued)

(58) Field of Classification Search
CPC ................ B64D 2045/0065; B64D 2045/0085
See application file for complete search history.

(56) References Cited

U.S. PATENT DOCUMENTS 3,055,621 A 9/1962 Martin
3,140,847 A 7/1964 Ames, Jr.
(Continued)

FOREIGN PATENT DOCUMENTS

CN 2344293 10/1999
EP 2453417 5/2012
(Continued)

OTHER PUBLICATIONS

U.S. Appl. No. 15/581,709, Wang et al.
(Continued)

*Primary Examiner* — Hovhannes Baghdasaryan
(74) *Attorney, Agent, or Firm* — Knobbe Martens Olson & Bear LLP

(57) ABSTRACT

An ejectable flight data recorder for robust retention of flight data and aiding in locating an aircraft after an emergency situation comprises: a buoyant housing comprising an internal cavity, a door for access to at least a portion of the internal cavity, and an aerodynamic outer shape having a longitudinal axis; an energy-dissipating nose cone for reducing an impact load on the housing when the flight data recorder impacts a water surface; a nonvolatile memory configured to store flight data; a position sensor for detecting a geographic position of the flight data recorder; a radio transmitter; an antenna electrically coupled to the radio transmitter; a sustainable power system; and a hydrophone for acoustically tracking a sinking trajectory of the aircraft in a body of water.

19 Claims, 25 Drawing Sheets

(51) Int. Cl.
   *B64D 1/12* (2006.01)
   *G10K 11/00* (2006.01)
   *G01S 1/70* (2006.01)
   *G01S 15/66* (2006.01)
   *G01S 1/72* (2006.01)

(52) U.S. Cl.
   CPC .............. *G01S 1/725* (2013.01); *G01S 15/66* (2013.01); *G10K 11/006* (2013.01); *B64D 2045/0065* (2013.01)

(56) References Cited

U.S. PATENT DOCUMENTS

| | | | |
|---|---|---|---|
| 3,181,809 A | 5/1965 | Lobelle | |
| 6,260,508 B1 | 7/2001 | Morse | |
| 6,895,314 B2 | 5/2005 | Ailor et al. | |
| 6,898,492 B2 | 5/2005 | de Leon et al. | |
| 7,027,719 B1 | 4/2006 | Schneider et al. | |
| 8,489,259 B2 | 7/2013 | Vinue Santolalla et al. | |
| 8,493,715 B1 | 7/2013 | Angelucci | |
| 8,509,998 B2 | 8/2013 | Thomas et al. | |
| 8,670,879 B1 | 3/2014 | Angelucci | |
| 8,706,357 B1 | 4/2014 | van den Heuvel et al. | |
| 8,727,263 B2 | 5/2014 | Fabre et al. | |
| 8,766,820 B2 | 7/2014 | Santiago Fontaina | |
| 9,440,749 B1 | 9/2016 | Ye et al. | |
| 9,452,844 B1 | 9/2016 | Ye et al. | |
| 2003/0152145 A1* | 8/2003 | Kawakita | H04N 5/77 375/240.12 |
| 2011/0149849 A1 | 6/2011 | Brownrig | |
| 2012/0138741 A1 | 6/2012 | Fabre et al. | |
| 2012/0166037 A1 | 6/2012 | Vinue Santolalla et al. | |
| 2012/0200460 A1* | 8/2012 | Weed | B64D 45/00 342/385 |
| 2013/0070556 A1 | 3/2013 | Huskamp et al. | |
| 2013/0317673 A1 | 11/2013 | Leroy et al. | |
| 2014/0002651 A1 | 1/2014 | Plante | |
| 2014/0277923 A1 | 9/2014 | Kaufmann et al. | |
| 2014/0297101 A1* | 10/2014 | Girod | B64D 45/00 701/33.4 |
| 2015/0312449 A1 | 10/2015 | Gibbins et al. | |
| 2016/0047880 A1 | 2/2016 | Helfrick | |
| 2016/0075443 A1 | 3/2016 | Schmutz et al. | |
| 2016/0078693 A1 | 3/2016 | Miller et al. | |
| 2017/0029128 A1 | 2/2017 | Ye et al. | |

FOREIGN PATENT DOCUMENTS

| | | |
|---|---|---|
| FR | 2957680 | 9/2011 |
| GB | 1288076 | 9/1972 |
| GB | 1318197 | 5/1973 |
| GB | 2228458 | 8/1990 |

OTHER PUBLICATIONS

Adler, Banish the black box: there's a better way to capture plane crash data, WIRED, http://www.wired.com/2011/06/ff_blackboxes/, Jun. 28, 2011.

Flight recorder, Wikipedia, https://en.wikipedia.org/wiki/Flight_recorder, Pub. Date Unknown, Submitted copy retrieved Apr. 20, 2016.

International Search Report and Written Opinion for application No. PCT/US2016/020765, dated Jun. 23, 2016, in 14 pages.

Jansen, Lawmaker urges 'black boxes' that eject from planes, USA Today, http://www.usatoday.com/story/news/nation/2014/03/12/ejectable-recorders-plane-crash-data-voice-black-boxes/6338397/, Mar. 13, 2014.

Lowry, Boeing, Airbus at odds over black boxes that eject, Phys.org, http://phys.org/news/2014-10-boeing-airbus-odds-deployable-black.html, Oct. 7, 2014.

* cited by examiner

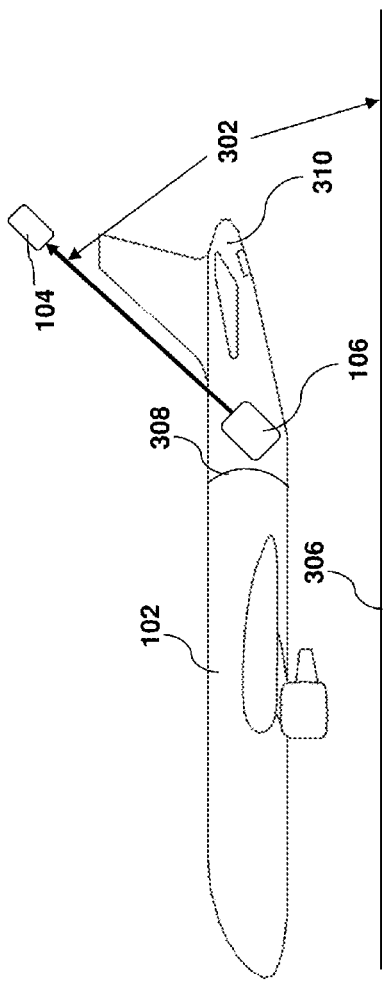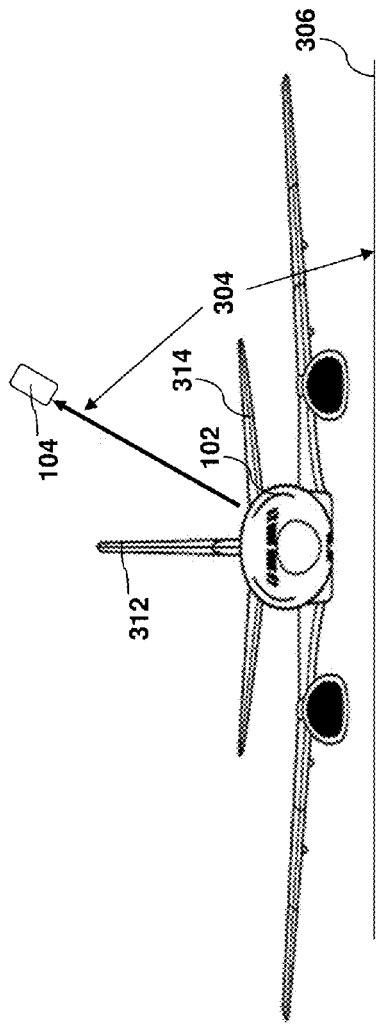
Figure 3A
Figure 3B

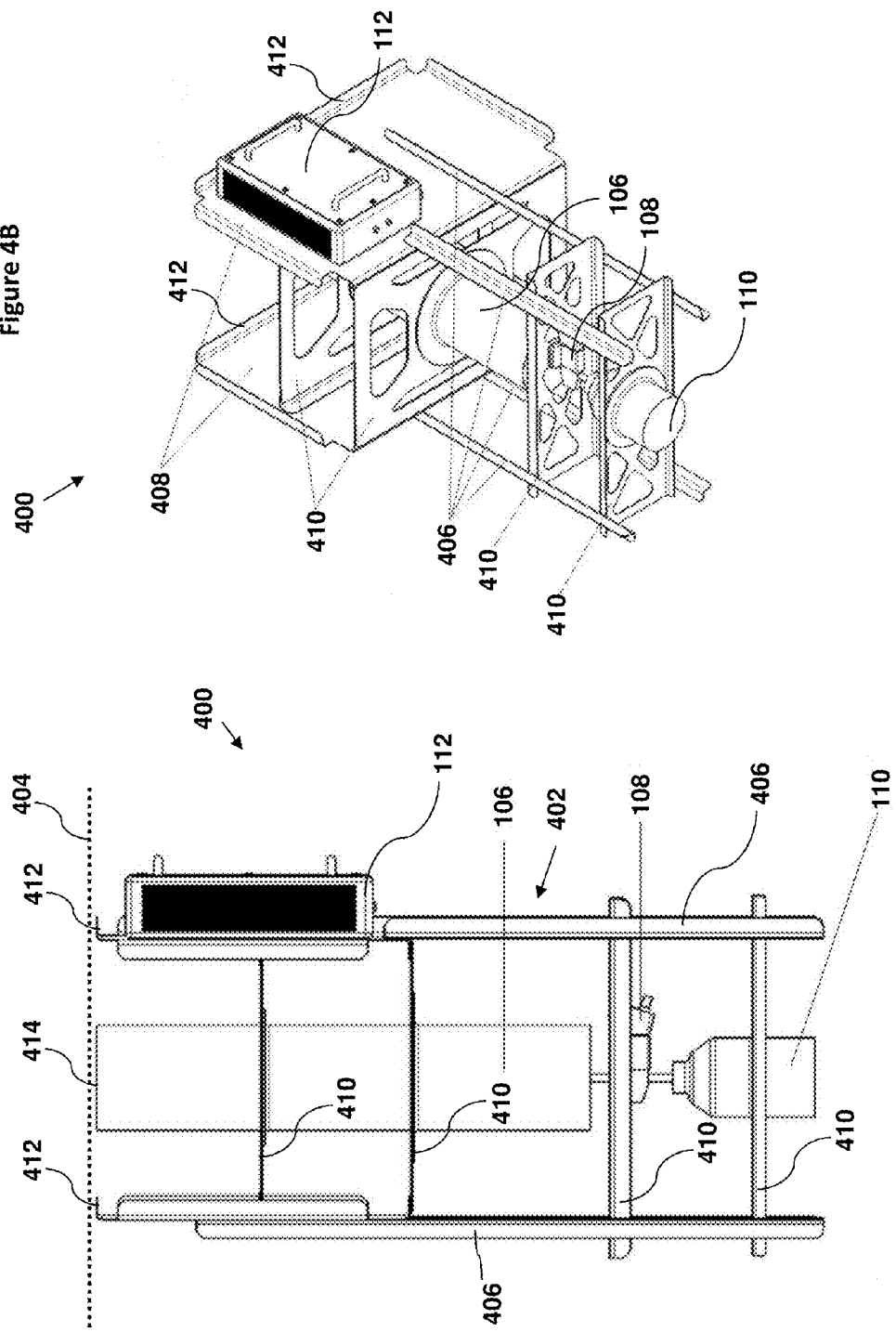

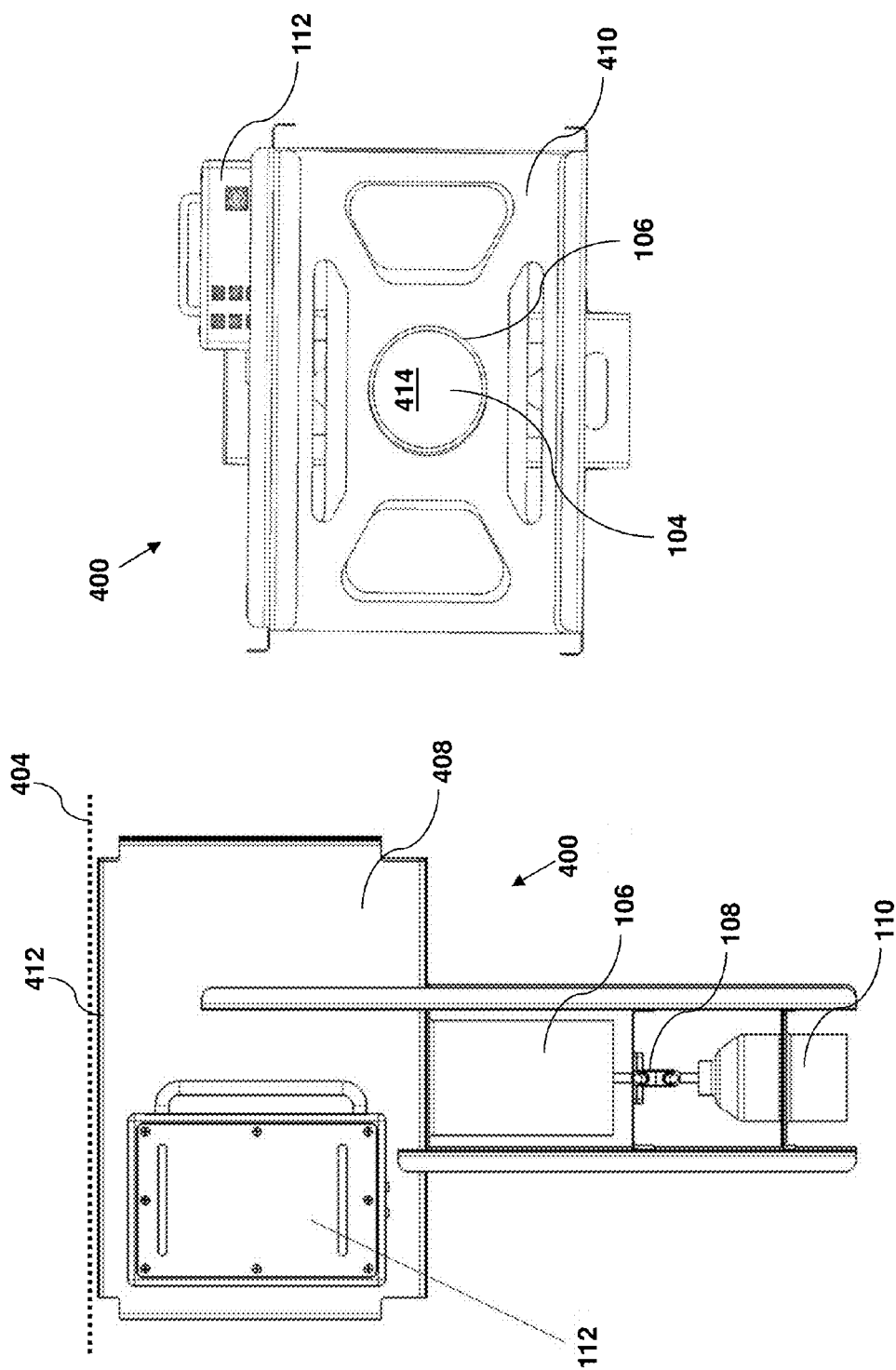

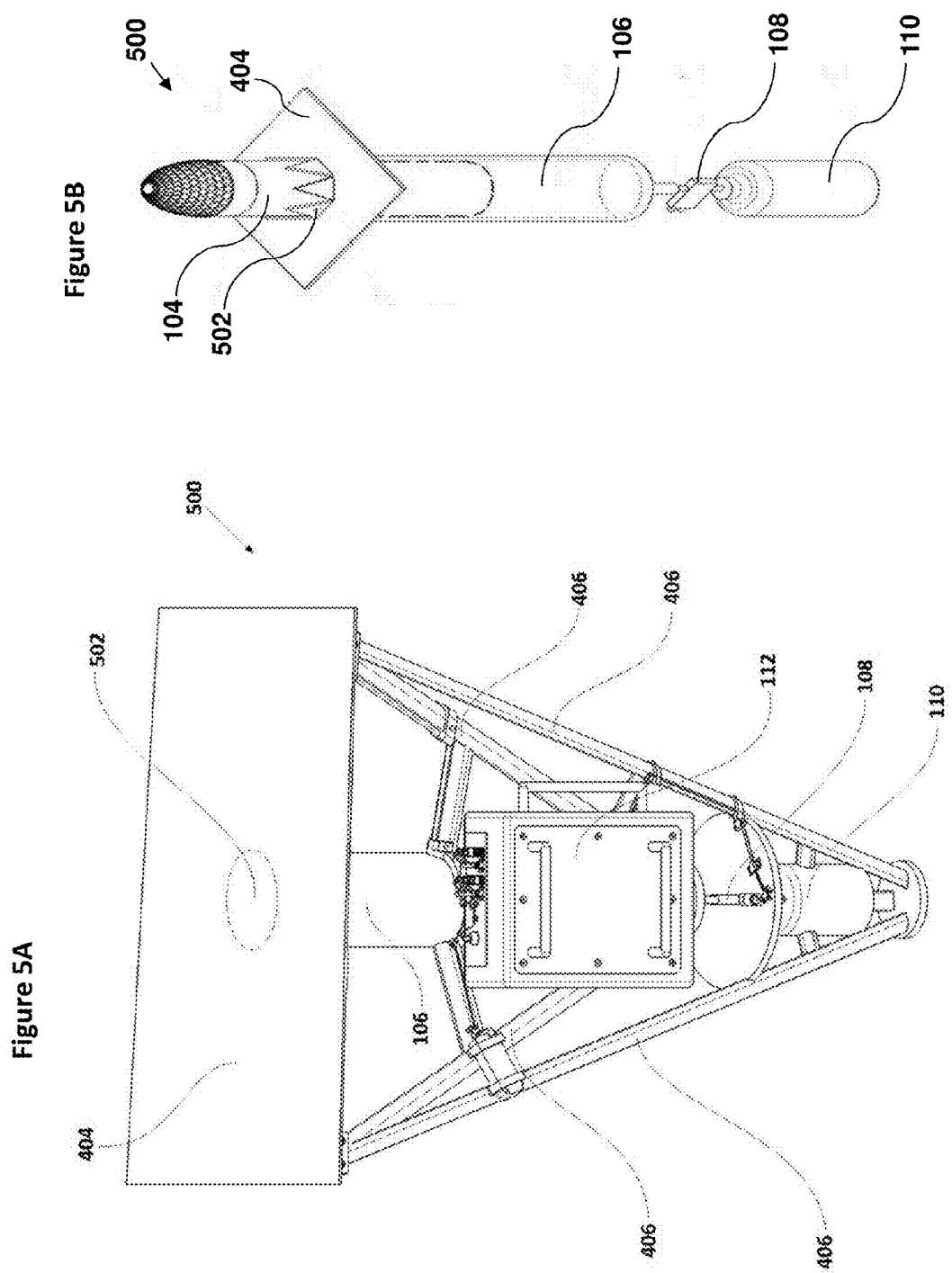

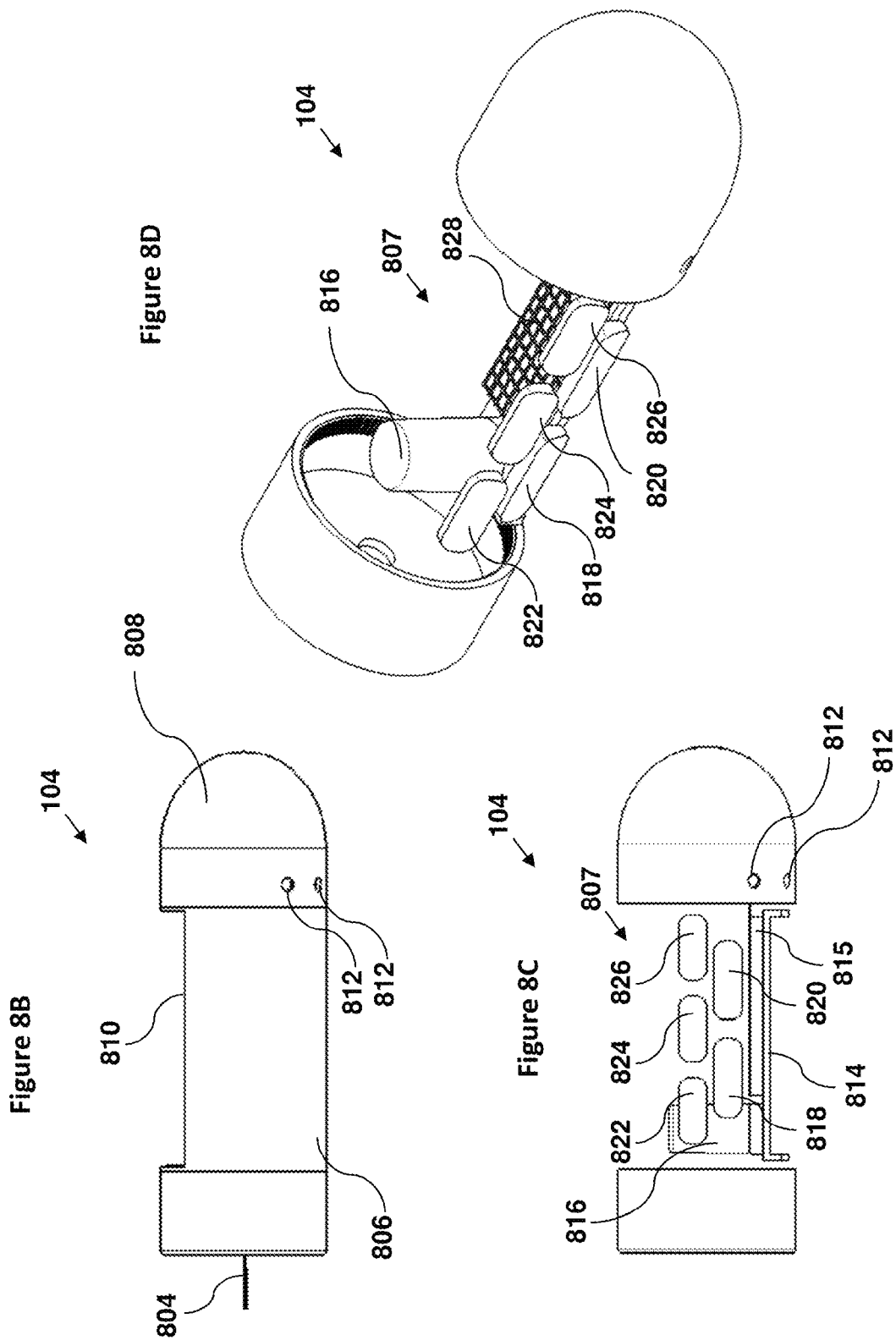

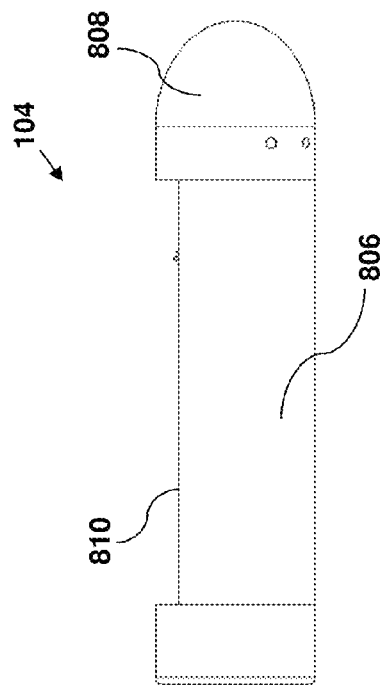
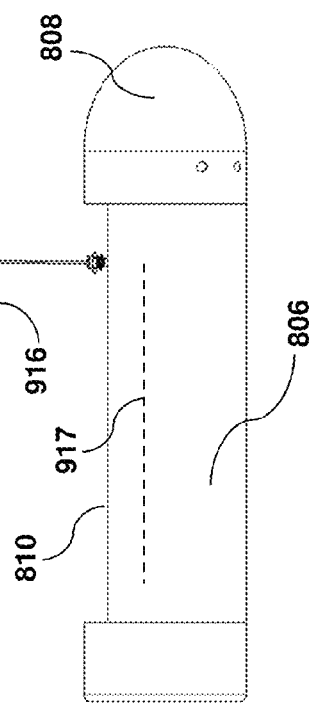
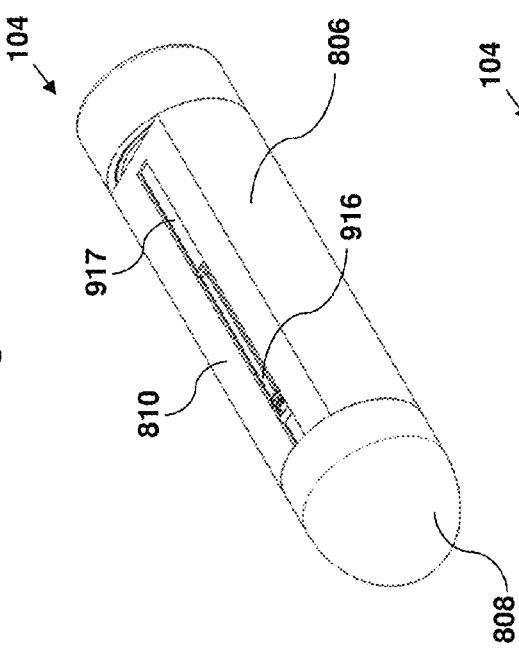
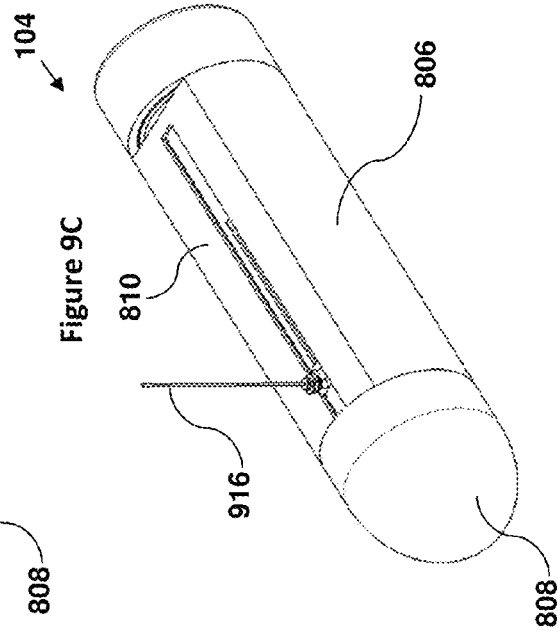

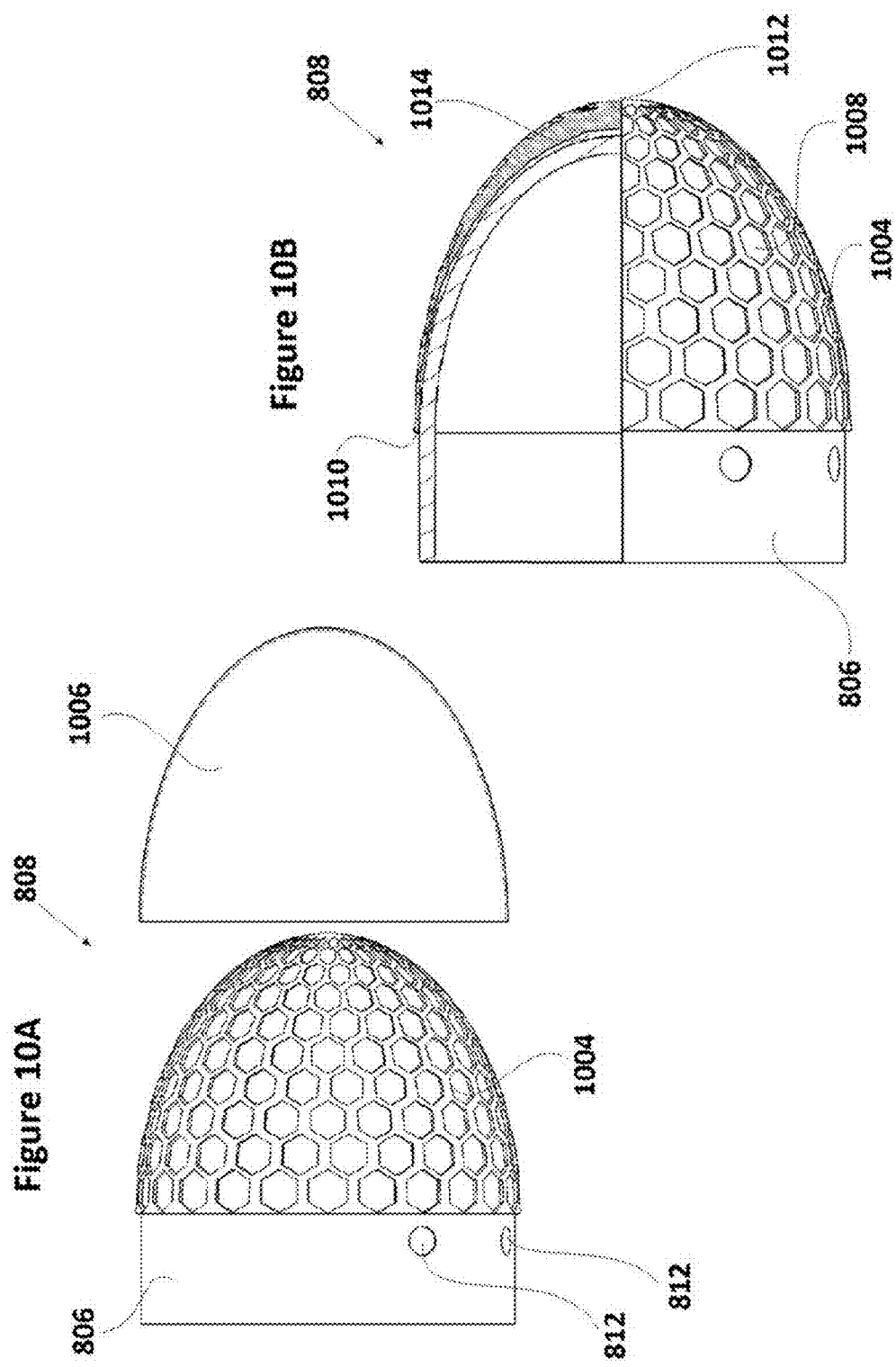

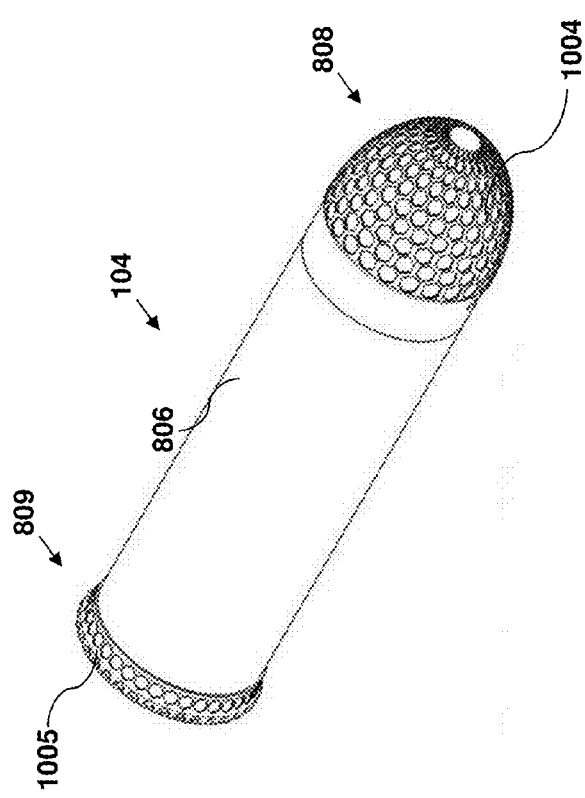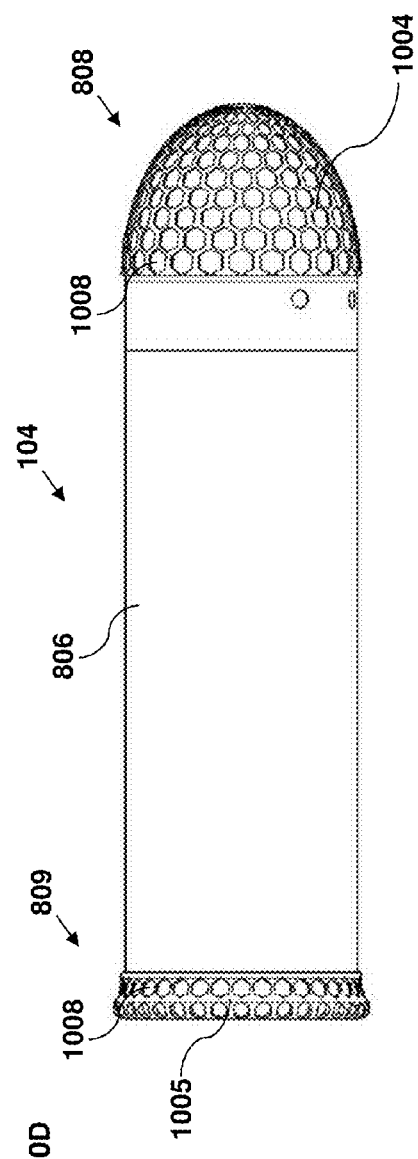
Figure 10C
Figure 10D

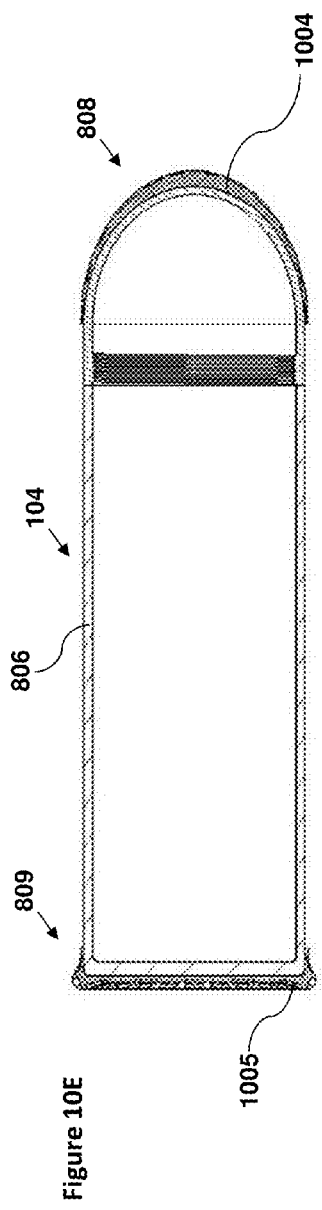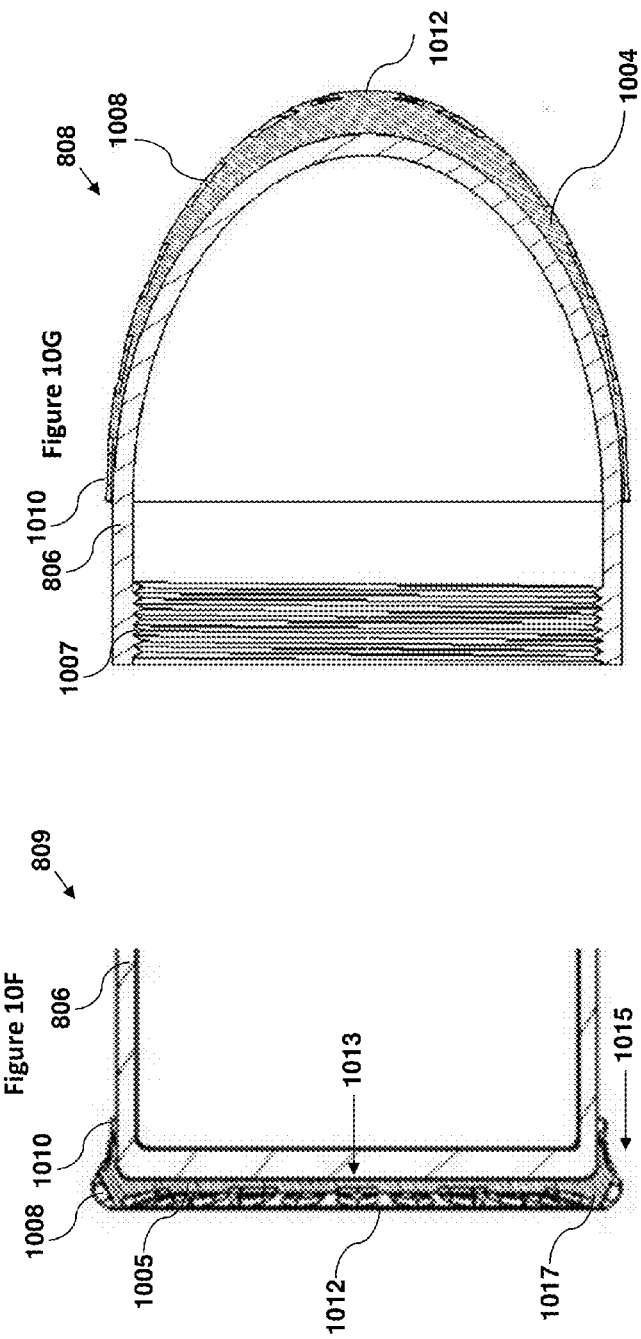

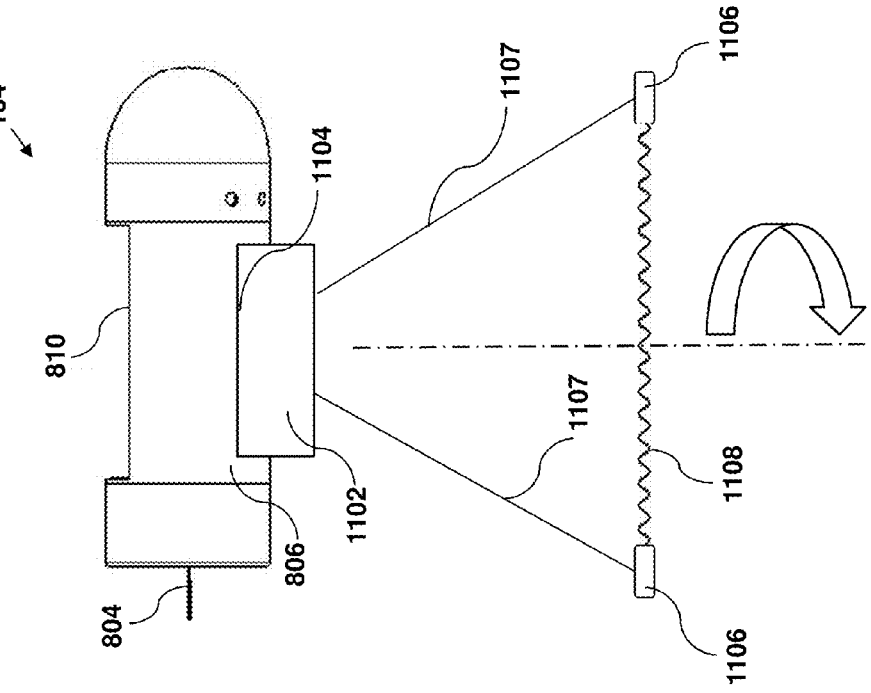
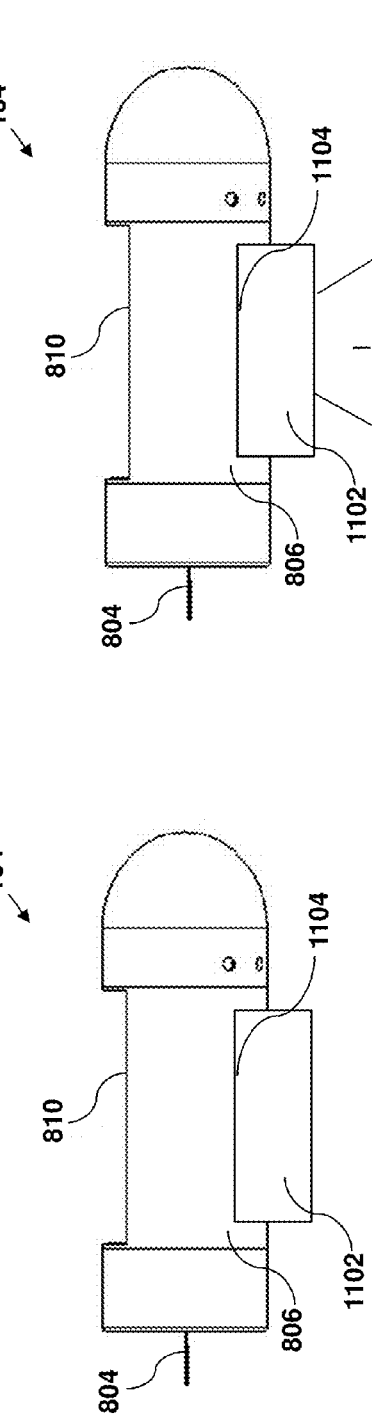
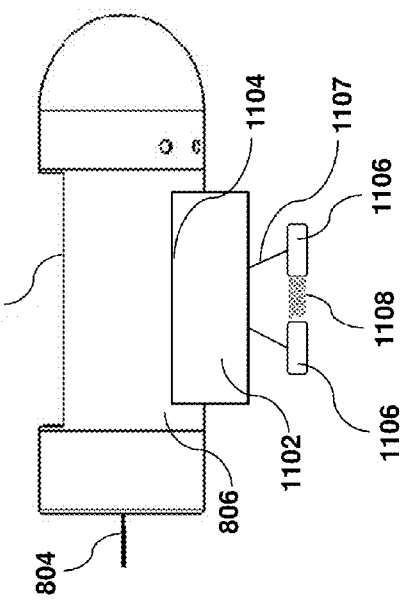

EJECTABLE FLIGHT DATA RECORDER SYSTEMS, METHODS, AND DEVICES

CROSS-REFERENCE TO RELATED APPLICATIONS

This application claims the benefit of U.S. Provisional Application No. 62/451,516, titled SYSTEMS, METHODS, AND DEVICES FOR AIRCRAFT EMERGENCIES, filed on Jan. 27, 2017, which is hereby incorporated by reference herein in its entirety.

BACKGROUND

Field

This disclosure relates generally to systems, methods, and devices for recovery of flight data and locating an aircraft in the event of an aircraft mishap or other emergency situation.

Description

Several commercial jets have gone missing in the past few years, and the protracted searches for the black boxes are presenting new demands for aviation security and rescue. For example, in the high profile disappearance of Malaysia Airlines flight MH370, search and rescue were unable to locate where exactly the plane crashed, and the black box is yet to be found. In view of the foregoing, there are needs for systems, methods, and devices for locating a crashed aircraft and retrieving data stored in a flight data recorder more quickly and efficiently.

SUMMARY

The disclosure herein provides systems, methods, and devices for retention of flight data in the event of a flight emergency and for aiding in locating the ejected flight data recorder and/or the sunken or crashed aircraft after the emergency. In some embodiments, an ejectable flight data recorder system comprises an ejectable module that stores flight data and comprises various features that enable the ejectable module to be robust and remain powered for extended periods of time after ejection. For example, some embodiments comprise multiple sustainable power sources, such as, for example, solar power, motion harvesting energy creation, saltwater energy creation, and/or the like. As another example, some embodiments comprise an aerodynamic shape having an energy dissipating nose cone. Further, some embodiments of ejectable modules disclosed herein comprise an acoustic search system configured to be deployed after the ejectable module lands in a body of water. The acoustic search system can comprise one or more hydrophones, sonar, or other devices or sensors configured to track a sinking trajectory of the aircraft by tracking the sound of an underwater locator beacon or other source of sound as the aircraft descends.

The disclosure herein further provides systems, methods, and devices for causing an ejectable flight data recorder system to eject an ejectable module at a desirable time, but to not eject to the ejectable module at other times when it would be less desirable to eject the ejectable module. For example, some embodiments disclosed herein comprise an arming controller that is configured to selectively arm and disarm the ejection system, with the arming controller configured to disarm the system when the aircraft is at a position where launching or ejecting of the ejectable module may have a higher likelihood of harming bystanders and/or when the aircraft is in a position where it is more likely that the aircraft will be relatively easily found after the emergency event. As another example, some embodiments disclosed herein comprise an ejection controller configured to monitor one or more sensors and/or aircraft flight data, and to control launching of an ejectable module responsive to detection of various ejection conditions or emergency conditions. In some embodiments, the ejection controller is configured to respond differently to different ejection conditions. For example, the ejection controller may be configured to immediately cause the ejectable module to be launched responsive to the ejection controller detecting a probable explosion of the aircraft. As another example, the ejection controller may be configured to delay causing the ejectable module to be ejected when an aircraft is experiencing an emergency event that is ongoing and is not likely to result in an imminent crash. The ejection controller may be configured to monitor such a situation and cause the ejectable module to be deployed or launched just before a crash or impact occurs. Such a configuration can be desirable, for example, in order to keep the ejectable module relatively close to the aircraft impact site and/or to increase the survivability chances of the ejectable module. Various other features and benefits of systems, methods, and devices as disclosed herein are given below.

According to some embodiments, an ejectable flight data recorder for robust retention of flight data and aiding in locating an aircraft after an emergency situation comprises: a buoyant housing comprising an internal cavity, a door for access to at least a portion of the internal cavity, and an aerodynamic outer shape having a longitudinal axis; an energy-dissipating nose cone for reducing an impact load on the housing when the flight data recorder impacts a water surface, the energy-dissipating nose cone being aligned with the longitudinal axis and comprising a proximal end and a distal end, wherein the energy-dissipating nose cone comprises an outer shape that tapers from a larger size at the proximal end to a smaller size at the distal end to redirect at least a portion of the impact load when the flight data recorder impacts the water surface in an orientation where the longitudinal axis is between horizontal and vertical, wherein a first portion of the nose cone adjacent the proximal end is coupled to the housing, and a second portion of the nose cone distal to the first portion is positioned covering, but not in contact with, an exterior surface of the housing, the second portion of the nose cone comprising a plurality of interconnected voids to enable crumpling of the second portion to absorb energy when the ejectable flight data recorder impacts the water surface; a nonvolatile memory positioned within the internal cavity of the housing, the nonvolatile memory configured to store flight data; a position sensor for detecting a geographic position of the flight data recorder; a radio transmitter positioned within the internal cavity of the housing; an antenna electrically coupled to the radio transmitter, wherein the radio transmitter is configured to transmit via the antenna data comprising at least the geographic position of the flight data recorder; a sustainable power system for powering at least the radio transmitter, the sustainable power system comprising a battery and a charging system; and a hydrophone for acoustically tracking a sinking trajectory of the aircraft in a body of water, the hydrophone positioned within the internal cavity of the housing and configured to be deployable from the housing through the door of the housing and suspended beneath the housing after a water landing of the ejectable flight data recorder.

In some embodiments, the position sensor comprises a global positioning system (GPS) sensor. In some embodiments, the ejectable flight data recorder further comprises a smooth cover positioned over at least the second portion of the energy-dissipating nose cone. In some embodiments, the plurality of interconnected voids of the nose cone comprises a honeycomb configuration. In some embodiments, the ejectable flight data recorder further comprises a compressible material positioned between second portion of the nose cone and the exterior surface of the housing. In some embodiments, the ejectable flight data recorder further comprises a water sensor configured to detect a water landing of the ejectable flight data recorder and to cause deployment of the hydrophone. In some embodiments, the ejectable flight data recorder further comprises one or more computer processors programmed to analyze acoustic information received by the hydrophone to estimate the sinking trajectory of the aircraft in the body of water, and wherein the radio transmitter is further configured to transmit via the antenna data comprising the estimated sinking trajectory of the aircraft. In some embodiments, the hydrophone is a directional hydrophone. In some embodiments, the ejectable flight data recorder further comprises: at least one additional hydrophone positioned within the internal cavity of the housing and configured to be deployable from the housing; and a hydrophone separation structure comprising a spring positioned to separate the hydrophones from each other after deployment from the housing. In some embodiments, the ejectable flight data recorder further comprises: an orientation sensor for detecting an orientation of the housing. In some embodiments, the ejectable flight data recorder further comprises: an orientation sensor for detecting an orientation of the hydrophone. In some embodiments, the ejectable flight data recorder further comprises: at least one additional antenna, wherein the antennas each comprise a different orientation. In some embodiments, the antenna is hingedly connected to the housing, and the antenna is configured to rotate outwardly from the housing after the water landing of the ejectable flight data recorder. In some embodiments, the charging system of the sustainable power system comprises at least one of a solar panel, a saltwater iconic power generator, an electrochemical power generator, an osmotic power generator, or a kinetic energy generator. In some embodiments, the charging system of the sustainable power system comprises at least two of a solar panel, a saltwater iconic power generator, an electrochemical power generator, an osmotic power generator, or a kinetic energy generator. In some embodiments, the ejectable flight data recorder further comprises one or more computer processors programmed to cause a timing between radio transmissions by the radio transmitter to depend at least partially on a current energy level of the battery or a current charging capacity of the charging system. In some embodiments, the ejectable flight data recorder further comprises the aircraft, wherein the housing is positioned within a launching tube adjacent a fuselage of the aircraft.

According to some embodiments, an ejectable flight data recorder for robust retention of flight data and aiding in locating an aircraft after an emergency situation comprises: a buoyant housing comprising an internal cavity, a door for access to at least a portion of the internal cavity, and an aerodynamic outer shape; a nonvolatile memory positioned within the internal cavity of the housing, the nonvolatile memory configured to store flight data; a position sensor for detecting a geographic position of the flight data recorder; a radio transmitter positioned within the internal cavity of the housing; an antenna electrically coupled to the radio transmitter; a sustainable power system for powering at least the radio transmitter, the sustainable power system comprising a battery and a charging system; two or more hydrophones for acoustically tracking a sinking trajectory of the aircraft in a body of water, the hydrophones positioned within the internal cavity of the housing and configured to be deployable from the housing through the door of the housing and suspended beneath the housing after a water landing of the ejectable flight data recorder; a hydrophone separation structure comprising a spring positioned to separate the hydrophones from each other after deployment from the housing; and one or more computer processors programmed to analyze acoustic data generated by the hydrophones to estimate the sinking trajectory of the aircraft in the body of water, wherein the radio transmitter is configured to transmit via the antenna data comprising at least the geographic position of the flight data recorder and the estimated sinking trajectory of the aircraft.

In some embodiments, the ejectable flight data recorder further comprises a water sensor configured to detect a water landing of the ejectable flight data recorder and to cause deployment of the hydrophones. In some embodiments, the ejectable flight data recorder further comprises one or more orientation sensors coupled to the hydrophones for detecting orientations of the hydrophones.

According to some embodiments, an ejectable flight data recorder for robust retention of flight data and aiding in locating an aircraft after an emergency situation comprises: a buoyant housing comprising an internal cavity and an aerodynamic outer shape having a longitudinal axis; an energy-dissipating nose cone for reducing an impact load on the housing when the flight data recorder impacts a water surface, the energy-dissipating nose cone being aligned with the longitudinal axis and comprising a proximal end and a distal end, wherein the energy-dissipating nose cone comprises an outer shape that tapers from a larger size at the proximal end to a smaller size at the distal end to redirect at least a portion of the impact load when the flight data recorder impacts the water surface in an orientation where the longitudinal axis is between horizontal and vertical, wherein a first portion of the nose cone adjacent the proximal end is coupled to the housing, and a second portion of the nose cone distal to the first portion is positioned covering, but not in contact with, an exterior surface of the housing, the second portion of the nose cone comprising a plurality of interconnected voids to enable crumpling of the second portion to absorb energy when the flight data recorder impacts the ground or water surface; a smooth cover positioned over at least the second portion of the energy-dissipating nose cone; a nonvolatile memory positioned within the internal cavity of the housing, the nonvolatile memory configured to store flight data; a position sensor for detecting a geographic position of the flight data recorder; a radio transmitter positioned within the internal cavity of the housing; and an antenna electrically coupled to the radio transmitter, wherein the radio transmitter is configured to transmit via the antenna data comprising at least the geographic position of the flight data recorder.

According to some embodiments, a system for ejecting a flight data recorder from an aircraft in an emergency situation comprises: a flight data recorder disposed within a launching tube, the flight data recorder configured to be ejectable from the launching tube, the flight data recorder comprising a nonvolatile memory for storing flight data; an ejection system comprising a stored energy source configured to cause rapid ejection of the flight data recorder from the launching tube when the ejection system is triggered; and an emergency detection system comprising: a plurality of sensors configured to generate at least altitude data and position data; an arming controller for automatically arming and disarming the ejection system based at least in part on the altitude data and the position data, wherein the arming controller is configured to dynamically arm the ejection system below a lower threshold altitude, disarm the ejection system between the lower threshold altitude and an upper threshold altitude, and arm the ejection system above the upper threshold altitude, and wherein the arming controller is configured to dynamically disarm the ejection system within a threshold distance from a geographic location; and an ejection controller for automatically triggering the ejection system responsive to detection of one or more of a plurality of ejection conditions, the plurality of ejection conditions comprising ejection conditions grouped into at least two levels of authority, wherein the ejection controller is configured to, responsive to detection of an ejection condition having a lower level of authority, trigger the ejection system only if the ejection system is armed, and wherein the ejection controller is configured to, responsive to detection of an ejection condition having a higher level of authority, trigger the ejection system regardless of a current arming state of the ejection system.

In some embodiments, the plurality of ejection conditions comprises at least: an anticipated collision within a threshold period of time, a shock load above a threshold level, and an explosion, the explosion ejection condition comprising the higher level of authority, and the anticipated collision and shock load ejection conditions comprising the lower level of authority. In some embodiments, the geographic location comprises one or more of a populated area, a coastline, and an airport. In some embodiments, the arming controller is configured to dynamically disarm the ejection system within different threshold distances from at least two of a plurality of geographic locations. In some embodiments, the flight data recorder further comprises a visual warning system comprising one or more of a laser or LED light source configured to project light from the flight data recorder after the flight data recorder is ejected from the launching tube. In some embodiments, the flight data recorder further comprises an audible warning system comprising one or more holes in an exterior surface of the flight data recorder, the one or more holes sized and positioned to cause air passing therethrough to generate a sound as the flight data recorder descends after being ejected from the launching tube. In some embodiments, the plurality of sensors comprises one or more of a global positioning system (GPS) sensor, a wide area augmentation system (WAAS) sensor, and a VHF Omni Direction Radio Range (VOR) sensor for generating the position data. In some embodiments, the flight data comprises one or more of flight parameters and cockpit voice data from a period of time leading up to the emergency situation. In some embodiments, the stored energy source comprises a propellant, a pressurized gas, or a combination of both. In some embodiments, the system further comprises an aircraft comprising the flight data recorder, the ejection system, and the emergency detection system.

According to some embodiments, a system for ejecting a flight data recorder from an aircraft in an emergency situation comprises: a flight data recorder disposed within a launching tube, the flight data recorder configured to be ejectable from the launching tube, the flight data recorder comprising a nonvolatile memory for storing flight data; an ejection system comprising a stored energy source configured to cause rapid ejection of the flight data recorder from the launching tube when the ejection system is triggered; and an emergency detection system comprising: a sensor interface configured to receive sensor data generated by a plurality of sensors, the sensor data comprising at least position data; an arming controller for automatically arming and disarming the ejection system based at least in part on the position data, wherein the arming controller is configured to dynamically disarm the ejection system within a first threshold distance from a first geographic location, and the arming controller is configured to dynamically disarm the ejection system within a second threshold distance from a second geographic location, the second threshold distance being different than the first threshold distance; and an ejection controller for automatically triggering the ejection system responsive to detection of one or more of a plurality of ejection conditions, the plurality of ejection conditions comprising ejection conditions grouped into at least two levels of authority, wherein the ejection controller is configured to, responsive to detection of an ejection condition having a lower level of authority, trigger the ejection system only if the ejection system is armed, and wherein the ejection controller is configured to, responsive to detection of an ejection condition having a higher level of authority, trigger the ejection system regardless of a current arming state of the ejection system.

In some embodiments, the first geographic location comprises a populated area, the second geographic location comprises a coastline, and the first threshold distance is larger than the second threshold distance, and wherein the arming controller is configured to disregard the first threshold distance when the position data indicates the aircraft is positioned over a body of water. In some embodiments, the flight data recorder further comprises a visual warning system comprising one or more of a laser or LED light source configured to project light from the flight data recorder after the flight data recorder is ejected from the launching tube. In some embodiments, the flight data recorder further comprises an audible warning system comprising one or more holes in an exterior surface of the flight data recorder, the one or more holes sized and positioned to cause air passing therethrough to generate a sound as the flight data recorder descends after being ejected from the launching tube. In some embodiments, the stored energy source comprises a propellant, a pressurized gas, or a combination of both.

According to some embodiments, a computer-implemented method of ejecting a flight data recorder from an aircraft in an emergency situation comprises: storing flight data in a nonvolatile memory of a flight data recorder, the flight data recorder being disposed within a launching tube and configured to be ejectable from the launching tube; receiving sensor data generated by a plurality of sensors, the sensor data comprising at least position data; analyzing, by a computer system, the position data to determine if the aircraft is within a threshold distance from a geographic location; dynamically arming an ejection system responsive to the computer system determining the aircraft is not within the threshold distance from the geographic location, wherein the ejection system comprises a stored energy source configured to cause rapid ejection of the flight data recorder from the launching tube when the ejection system is triggered; dynamically disarming the ejection system responsive to the computer system determining the aircraft is within the threshold distance from the geographic location; analyzing, by the computer system, at least a portion of the sensor data to determine if one or more of a plurality of ejection conditions has occurred, wherein the plurality of ejection conditions comprises ejection conditions grouped into at least two levels of authority; automatically triggering the ejection system responsive to the computer system determining an ejection condition having a lower level of authority has occurred, only if the ejection system if armed; and automatically triggering the ejection system responsive to the computer system determining an ejection condition having a higher level of authority has occurred, regardless of a current arming state of the ejection system.

In some embodiments, the sensor data further comprises altitude data, and the method further comprises: analyzing, by the computer system, the altitude data to determine if the aircraft is below a lower threshold altitude; and dynamically arming the ejection system responsive to the computer system determining the aircraft is below the lower threshold altitude. In some embodiments, the method further comprises: analyzing, by the computer system, the altitude data to determine if the aircraft is above an upper threshold altitude; and dynamically arming the ejection system responsive to the computer system determining the aircraft is above the upper threshold altitude. In some embodiments, the geographic location comprises one or more of a populated area, a coastline, and an airport. In some embodiments, the method further comprises: analyzing, by the computer system, the position data to determine if the aircraft is within a different threshold distance from a different geographic location; dynamically arming the ejection system responsive to the computer system determining the aircraft is not within the different threshold distance from the different geographic location; and dynamically disarming the ejection system responsive to the computer system determining the aircraft is within the different threshold distance from the different geographic location.

According to some embodiments, an ejectable flight data recorder for robust retention of flight data and aiding in locating an aircraft after an emergency situation in a remote location over a body of water comprises: a buoyant housing configured to provide shock and heat protection to components positioned within the housing; a nonvolatile memory positioned within the housing, the nonvolatile memory configured to store flight data comprising at least duplicated data from a conventional flight data recorder and a cockpit voice recorder; an energy-dissipating nose cone positioned at a distal end of the housing for reducing an impact load on the housing and components positioned within the housing when the ejectable flight data recorder impacts a water surface; a distress signal generating circuit positioned within the housing; an antenna electrically coupled to the distress signal generating circuit, wherein the distress signal generating circuit is configured to transmit via the antenna a distress signal to a satellite; and a hydrophone for acoustically tracking a sinking trajectory of the aircraft in a body of water, the hydrophone configured to be deployable from the housing and suspended beneath the housing after a water landing of the ejectable flight data recorder.

In some embodiments, the ejectable flight data recorder further comprises a water sensor configured to detect the water landing of the ejectable flight data recorder and to cause deployment of the hydrophone and activation of the distress signal generating circuit. In some embodiments, the ejectable flight data recorder further comprises: at least one additional hydrophone configured to be deployable from the housing; and a hydrophone separation structure comprising a spring positioned to separate the hydrophones from each other after deployment from the housing, wherein the hydrophones are configured to detect a signal transmitted by an underwater locator beacon of the aircraft. In some embodiments, the at least one additional hydrophone comprises at least two additional hydrophones to enable triangulation of the signal transmitted by the underwater locator beacon of the aircraft. In some embodiments, the ejectable flight data recorder further comprises at least one sonar sensor for tracking the sinking trajectory of the aircraft. In some embodiments, the ejectable flight data recorder further comprises: a first orientation sensor for detecting an orientation of the housing with respect to an environment; and a second orientation sensor for detecting an orientation of the hydrophone with respect to the environment or the housing. In some embodiments, the nonvolatile memory is further configured to store data relating to an orientation and position of the ejectable flight data recorder. In some embodiments, the ejectable flight data recorder further comprises: a sustainable power system for providing backup electrical power, the sustainable power system comprising a solar panel array. In some embodiments, the ejectable flight data recorder further comprises: a sustainable power system for providing backup electrical power, the sustainable power system comprising an electrochemical salt water generator. In some embodiments, the ejectable flight data recorder further comprises: a sustainable power system for providing backup electrical power, the sustainable power system comprising a kinematic movement based generator. In some embodiments, the antenna comprises a combination of horizontally and vertically oriented elements. In some embodiments, the housing comprises an aerodynamically stable shape. In some embodiments, the energy-dissipating nose cone comprises a plurality of interconnected voids to enable crumpling of the nose cone to absorb energy when the ejectable flight data recorder impacts the water surface, the plurality of interconnected voids comprising a honeycomb configuration. In some embodiments, the buoyant housing comprises an aerodynamically stable shape having a longitudinal axis, the housing further comprising a flat outer surface oriented parallel to the longitudinal axis, a center of gravity of the ejectable flight data recorder being positioned such that the flat outer surface will tend to be oriented in an upward direction when the buoyant housing is floating in the body of water. In some embodiments, the housing comprises a polycarbonate material. In some embodiments, the housing comprises a plurality of composite materials. In some embodiments, the nonvolatile memory is further configured to store at least thirty minutes of data relating to a position of the ejectable flight data recorder. In some embodiments, the ejectable flight data recorder further comprises one or more position sensors for detecting a geographic position of the ejectable flight data recorder, wherein the one or more position sensors comprises at least one of the following: a global positioning system (GPS) sensor, a GLONASS sensor, an inertia based sensor, an altimeter, a barometer, or a compass. In some embodiments, the ejectable flight data recorder further comprises a visual warning system comprising one or more of a laser or LED light source configured to project light from the ejectable flight data recorder after the ejectable flight data recorder is deployed from the aircraft. In some embodiments, the ejectable flight data recorder further comprises an audible warning system configured to generate a sound as the ejectable flight data recorder descends after being deployed from the aircraft, the audible warning system comprising at least one of the following: one or more holes in an exterior surface of the housing sized and positioned to cause air passing therethrough to generate a sound, a whistle, a siren, or a speaker.

According to some embodiments, a system for ejecting a flight data recorder from an aircraft in an emergency situation comprises: a flight data recorder disposed within a launching tube, the flight data recorder configured to be ejectable from the launching tube, the flight data recorder comprising a nonvolatile memory for storing flight data; an ejection system comprising a stored energy source configured to cause rapid ejection of the flight data recorder from the launching tube when the ejection system is triggered; and an emergency detection system comprising: a sensor interface configured to receive sensor data generated by a plurality of sensors, the sensor data comprising at least position data, altitude data, vertical speed data, and airspeed data, the plurality of sensors comprising at least a plurality of collision sensors; an arming controller for automatically arming and disarming the ejection system based at least in part on one or more of the position data, the altitude data, the vertical speed data, or the airspeed data, wherein the arming controller is configured to dynamically disarm the ejection system within a first threshold distance from a first geographic location, and the arming controller is configured to dynamically disarm the ejection system within a second threshold distance from a second geographic location, the second threshold distance being different than the first threshold distance; and an ejection controller for automatically triggering the ejection system responsive to detection of one or more of a plurality of ejection conditions, the plurality of ejection conditions comprising ejection conditions grouped into at least two levels of authority, wherein the ejection controller is configured to, responsive to detection of an ejection condition having a lower level of authority, trigger the ejection system only if the ejection system is armed, and wherein the ejection controller is configured to, responsive to detection of an ejection condition having a higher level of authority, trigger the ejection system regardless of a current arming state of the ejection system. According to some embodiments, a system for ejecting a flight data recorder from an aircraft in an emergency situation comprises: a flight data recorder disposed within a launching tube, the flight data recorder configured to be ejectable from the launching tube, the flight data recorder comprising a nonvolatile memory for storing flight data; an ejection system comprising a stored energy source configured to cause rapid ejection of the flight data recorder from the launching tube when the ejection system is triggered; and an emergency detection system comprising: an aircraft data bus interface configured to receive aircraft data bus information comprising at least position data, altitude data, vertical speed data, and airspeed data; a sensor interface configured to receive sensor data generated by a plurality of sensors, the plurality of sensors comprising at least a plurality of collision sensors; an arming controller for automatically arming and disarming the ejection system based at least in part on one or more of the position data, the altitude data, the vertical speed data, or the airspeed data, wherein the arming controller is configured to dynamically disarm the ejection system within a first threshold distance from a first geographic location, and the arming controller is configured to dynamically disarm the ejection system within a second threshold distance from a second geographic location, the second threshold distance being different than the first threshold distance; and an ejection controller for automatically triggering the ejection system responsive to detection of one or more of a plurality of ejection conditions, the plurality of ejection conditions comprising ejection conditions grouped into at least two levels of authority, wherein the ejection controller is configured to, responsive to detection of an ejection condition having a lower level of authority, trigger the ejection system only if the ejection system is armed, and wherein the ejection controller is configured to, responsive to detection of an ejection condition having a higher level of authority, trigger the ejection system regardless of a current arming state of the ejection system.

In some embodiments, the arming controller is further configured to dynamically arm the ejection system below a lower threshold altitude. In some embodiments, at least one of the plurality of ejection conditions comprises an anticipated collision within a threshold period of time, and wherein the ejection controller is configured to calculate an anticipated time to collision based on at least the altitude data and the vertical speed data. In some embodiments, the threshold period of time is 0.5 seconds. In some embodiments, at least one of the plurality of ejection conditions comprises an explosion or a fire. In some embodiments, the ejection controller is configured to determine that the explosion has occurred by detecting both of the following: a loss in main bus power and a shock load above a threshold value. In some embodiments, the ejection controller is configured to determine that the fire has occurred by detecting both of following: a loss in main bus power and passage of a threshold amount of time without a return of the main bus power. In some embodiments, the ejection system further comprises a relief valve operatively positioned between the stored energy source and the flight data recorder to enable selective redirection of energy released from the stored energy source away from the flight data recorder, wherein the arming controller is configured to automatically cause opening of the relief valve when the aircraft is on the ground, to avoid launching of the flight data recorder even if energy is released from the stored energy source, and wherein the arming controller is configured to automatically cause closing of the relief valve when the aircraft is airborne. In some embodiments, the launching tube is positioned adjacent a fuselage of the aircraft, to enable the flight data recorder to be launched through a hole in the fuselage of the aircraft. In some embodiments, the launching tube is positioned such that the flight data recorder is configured to be launched from an area positioned between vertical and horizontal fins of the aircraft.

According to some embodiments, a system for ejecting an ejectable flight data recorder from an aircraft in an emergency situation comprises: an ejectable flight data recorder disposed within a launching tube, the ejectable flight data recorder configured to be ejectable from the launching tube, the ejectable flight data recorder comprising a nonvolatile memory; an ejection system comprising a stored energy source configured to cause rapid ejection of the flight data recorder from the launching tube by rapidly pressurizing the launching tube when the ejection system is triggered; and a control system comprising: one or more computer processors configured to receive flight data as stored in a conventional flight data recorder and cockpit voice data as stored in a conventional cockpit voice recorder, and to transmit the flight data and cockpit voice data to the ejectable flight data recorder for storage in the nonvolatile memory of the ejectable flight data recorder; an arming controller for automatically arming and disarming the ejection system based at least in part on data received from an aircraft data bus comprising one or more of position data, altitude data, vertical speed data, or airspeed data; and an ejection controller for automatically triggering the ejection system responsive to detection of one or more of a plurality of ejection conditions, wherein the ejection controller is configured to detect the plurality of ejection conditions by analyzing one or more of the data received from the aircraft data bus and data received from one or more collision sensors.

In some embodiments, the control system further comprises a battery for powering the control system if a loss of main bus power occurs. In some embodiments, the control system is configured to automatically disable itself when the aircraft is on the ground to prevent discharging of the battery when the aircraft is on the ground. In some embodiments, the arming controller is configured to dynamically disarm the ejection system when the aircraft is currently in at least one of the following two situations: (1) the aircraft is within a first threshold distance from a first geographic location, or (2) the aircraft is above a lower threshold altitude and below an upper threshold altitude. In some embodiments, the first geographic location comprises one or more of a populated area, a coastline, or an airport. In some embodiments, the lower threshold altitude is 6,000 feet, and the upper threshold altitude is a service ceiling of the aircraft. In some embodiments, the arming controller is configured to dynamically disarm the ejection system when the aircraft is within a first threshold distance from a first geographic location, and the arming controller is configured to dynamically disarm the ejection system when the aircraft is within a second threshold distance from a second geographic location, the second threshold distance being shorter than the first threshold distance. In some embodiments, the first geographic location comprises a populated area, the second geographic location comprises a coastline, and the arming controller is configured to disregard the first threshold distance when the position data indicates that the aircraft is positioned over a body of water. In some embodiments, the arming controller is configured to dynamically disarm the ejection system within different threshold distances from at least two of a plurality of geographic locations. In some embodiments, the stored energy source comprises at least one of a propellant, a pressurized gas, or a combination of both to cause the rapid pressurizing the launching tube when the ejection system is triggered.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The features of some embodiments of the present disclosure, which are believed to be novel, will be more fully disclosed in the following detailed description. The following detailed description may best be understood by reference to the accompanying drawings wherein the same numbers in different drawings represents the same parts. All drawings are schematic and are not intended to show any dimension to scale. The drawings comprise the following figures in which:

FIGS. 3A and 3B illustrate a position and direction of launching of an ejectable flight data recorder module, according to one embodiment.

FIGS. 4A-4D illustrate an embodiment of an ejectable flight data recorder system having a support structure for mounting to an aircraft fuselage.

FIGS. 5A-5E illustrate another embodiment of an ejectable flight data recorder system having a support structure for mounting to an aircraft fuselage.

FIGS. 8A-8E illustrate an embodiment of an ejectable flight data recorder module.

FIGS. 9A-9D illustrate another embodiment of an ejectable flight data recorder module.

FIGS. 10A and 10B illustrate an embodiment of an energy dissipating nose cone of an ejectable flight data recorder module.

FIGS. 10C-10G illustrate an embodiment of an ejectable flight data recorder module housing comprising energy dissipating features.

FIGS. 11A-11E illustrate an embodiment of an ejectable flight data recorder module comprising an acoustic search system.

DETAILED DESCRIPTION

Figure 1:
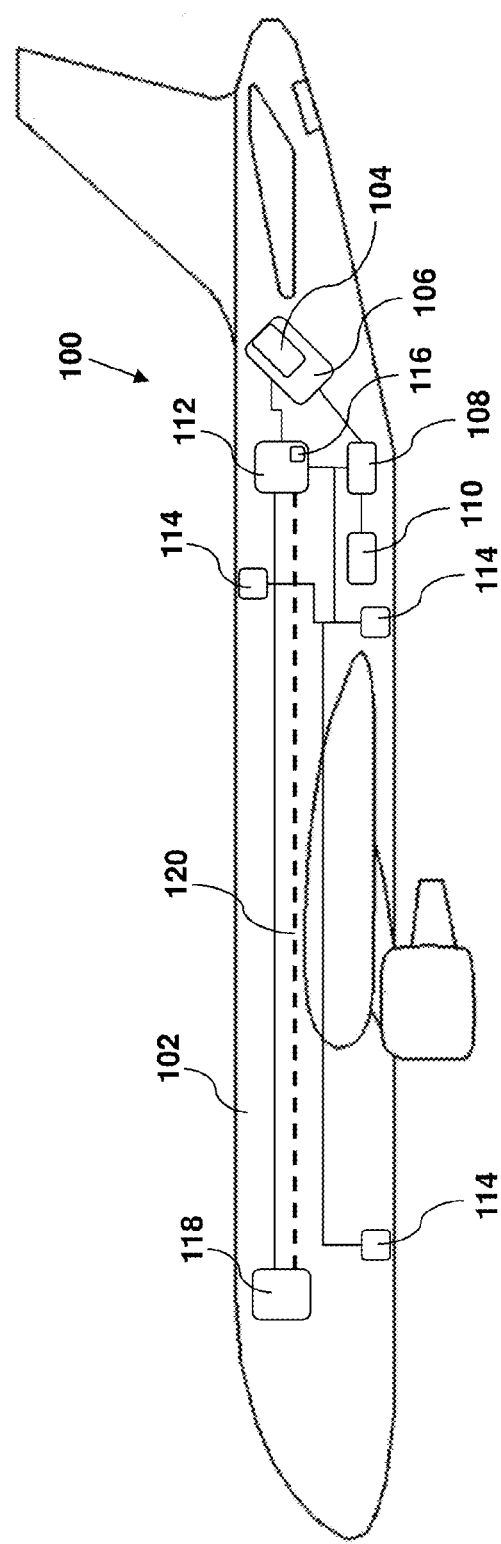
FIG. 1 is a schematic diagram of one embodiment of an ejectable flight data recorder system.

Although several embodiments, examples, and illustrations are disclosed below, it will be understood by those of ordinary skill in the art that the inventions described herein extend beyond the specifically disclosed embodiments, examples, and illustrations and include other uses of the inventions and obvious modifications and equivalents thereof. Embodiments of the inventions are described with reference to the accompanying figures, wherein like numerals refer to like elements throughout. These drawings are considered to be a part of the entire description of some embodiments of the inventions. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The disclosure herein presents various embodiments of systems, methods, and devices for retention of aircraft flight data in the event of an emergency situation and/or for aiding in locating a sunken aircraft after an aircraft emergency situation. Generally, a flight data recorder, also known as a "black box," is used to record data representing the flight state of an aircraft. In the event of an aircraft mishap, a conventional flight data recorder goes down with the plane and emits distress signals for 30 days. It typically stores two hours of cockpit voice dialogue and 25 hours of flight data before the crash. However, when the plane goes down at sea, the sonar signal emitted from the underwater locator beacon (ULB) attached to the black box only transmits several kilometers, therefore requiring a rather definitive search area, which is often difficult in sea crashes. If the black box becomes covered in seabed sludge (or heavy snow, in the case of a mountainside crash), distress signals are weakened and hard to detect, making it difficult to locate the crash site in a timely manner for rescue. Further, the deeper an aircraft sinks in the water, the harder it is for a signal emitted from the plane or black box to reach the surface. In some cases, an aircraft fitted with a flight data recorder may be lost in a deep ocean trench. It can be very difficult to locate the aircraft and/or determine the cause of the accident in this situation.

The systems, methods, and devices disclosed herein solve several problems associated with a typical black box configuration. For example, some embodiments disclosed herein comprise an ejectable black box or ejectable module that stores a copy of some or all of the data stored in a typical black box, but that is ejected from the aircraft in response to detection of an aircraft emergency. For example, some embodiments store duplicated data from a conventional flight data recorder (FDR) and/or cockpit voice recorder (CVR). The ejectable module can be configured to be robust, such as to be able to survive a landing on water or land, and the module can be configured to be buoyant, allowing the module to float on the water in the event of a water landing. In some embodiments, the ejectable module comprises communication hardware, such as one or more radios (which may comprise one or more Global Positioning System (GPS) devices, electronic locator transmitters, homing beacons, and/or the like), that are configured to communicate with a satellite, satellite network, aircraft, boat, and/or the like, to aid in finding the ejected flight data recorder module and/or to transmit some or all of the stored flight data wirelessly to another device. In some embodiments, only a single type of radio is used, such as a radio configured to transmit GPS data to a satellite, and other types of radios that could transmit data to an aircraft, boat, or the like are not used. Such a configuration can reduce complexity, size, power requirements, and the like. Some embodiments may, however, include additional radios and/or types of radios.

As used herein, the terms "radio" and "radio transmitter" are used to refer to any type of electronic device capable of transmitting electromagnetic radio frequency communications. Some embodiments disclosed herein comprise a relatively simple radio or radio transmitter that is configured to transmit a single type of data, such as GPS data that a satellite can use to track the location of a floating ejectable module. In some embodiments, such a radio may be a distress signal generating circuit. Such a radio transmitter may be part of a homing beacon, electronic locator transmitter (ELT), and/or the like. Some embodiments disclosed herein comprise more complex radios and/or a plurality of radios that can be used to transmit different types of data, transmit data to more than one type of remote device, such as a satellite, aircraft, buoy, and/or the like, which may all utilize different frequencies or types of radio protocols, and/or the like. In some embodiments, the radios of the systems disclosed herein are configured only to transmit data. In some embodiments, however, at least one radio of an ejectable module also comprises a radio receiver configured to receive electromagnetic radio frequency communications from a remote device. In some embodiments, the radio receiver is a separate device. In some embodiments, the radio receiver is part of a radio transceiver that includes both radio transmission and reception functionality.

With radio transmission functionality, an ejected flight data recorder module can ideally be relatively easy for search and rescue crews to find. However, in the event that the ejected flight data recorder module is not found quickly, some embodiments disclosed herein comprise a sustainable power source that enables the ejected flight data recorder module to remain powered for extended periods of time, in some cases indefinitely. For example, some embodiments comprise a solar power system, a kinetic energy generation system, a saltwater energy generation system, and/or the like. In some embodiments, the ejectable module comprises more than one sustainable power source. Having more than one power source can provide redundancy and can also be beneficial because some portions of the ejectable module may have higher power requirements than others. For example, a strobe light on the ejectable module may have relatively low power requirements, while a radio transmitter operating at a relatively high power level may have higher power requirements. Accordingly, some embodiments may be configured to operate functions of the system having higher power requirements only when a power source capable of supporting that power requirement is operating. Further, in some embodiments, the system may be configured to control an amount of time various functions are used, such as to reduce their average power usage over time, thus extending the service life of the unit given a particular level of power generation capability.

As mentioned above, a significant problem with aircraft emergency situations occurring over a body of water is the ability for search and rescue crews to find the sunken aircraft in the body of water. Particularly in deep oceans, it can be very hard or even impossible to find a sunken aircraft that is resting on the ocean floor, and too far from the surface of the ocean for its radio or sonar distress signals to reach the surface. Various embodiments of systems, methods, and devices disclosed herein address this problem by providing an ejectable module that incorporates one or more acoustic receivers configured to track a sinking trajectory of an aircraft as the aircraft is sinking. For example, in some embodiments, the ejectable flight data recorder module is configured to sense when the ejected module has landed in the water, and deploy one or more acoustic sensors, such as hydrophones, into the water below the floating ejectable module. These acoustic receivers can then be used to detect a sonar or other audible signal from the sinking aircraft, such as from an underwater locator beacon of the sinking aircraft and/or from the black box of the sinking aircraft. The floating ejected flight data recorder module can be configured to then analyze the detected beacon signal from the aircraft and determine an estimated sinking trajectory of the aircraft. This estimated sinking trajectory can be stored on the ejected flight data recorder module memory and/or transmitted wirelessly to a remote system, such as via a radio transmitter of the ejected flight data recorder module which can transmit such data to a satellite, aircraft, boat, buoy, and/or the like.

By knowing a sinking trajectory of the aircraft, the search radius or search area can be significantly reduced, thus enabling the sunken aircraft to be found more quickly (or even enabling it to be found at all in cases where the sunken aircraft would not otherwise have been able to be found). In some embodiments, the system can be configured to use more than one acoustic receiver, and the system can comprise a separation device, such as a spring or spring-loaded device, that separates the more than one acoustic receivers after being deployed from a main housing of the ejected module. By adding separation space between the acoustic receivers, the sinking trajectory of the aircraft may be able to be more accurately estimated. Further, in some embodiments, the ejectable module can comprise one or more devices configured to detect and/or control a rotational orientation of the one or more acoustic receivers (and/or an acoustic receiver array comprising the one or more acoustic receivers). By controlling and/or detecting the current rotational orientation of the acoustic receivers, the system may be able to even more accurately estimate a sinking trajectory of the aircraft.

Another potential problem with an ejectable flight data recorder system is that there may be safety concerns around the ejectable module inadvertently being deployed when an emergency is not occurring. Such inadvertent deployment or accidental deployment may, for example, happen while the aircraft is on the ground being serviced by a mechanic, while the aircraft is flying during a normal flight and not experiencing an emergency, and/or the like. One safety concern in such a situation is that people around the aircraft on the ground may be harmed by the module being ejected. Another safety concern, when a module is inadvertently deployed while the aircraft is flying, is that the module could descend onto a populated area and impact people, animals, buildings, vehicles, and/or the like, leading to damage and/or injury. Another safety concern is that, once an ejected flight data recorder module has been ejected from the aircraft, a hole may then be present in the aircraft's body, thus causing potentially a change in aerodynamics of the aircraft and/or causing increased stresses in portions of the aircraft body.

Systems, methods, and devices disclosed herein address these safety concerns by, among other things, reducing a likelihood of the ejectable module being ejected when the aircraft is near people or a populated area, refraining from ejecting the ejectable module when the aircraft is in a situation or location where finding a crashed aircraft likely will not be a problem, and/or the like. For example, some embodiments comprise an arming controller that monitors one or more sensors and/or flight data to selectively and dynamically arm or disarm an ejection system or launching system. For example, in some embodiments, the arming controller is configured to monitor a geographic location of the aircraft, such as by using GPS or other geographic location information. The arming controller may be configured to dynamically disarm the system when the aircraft is within a certain distance from a geographic location or landmark, such as, for example, a city, an airport, a populated area, a coastline, and/or the like. Further, in some embodiments, the system is configured to detect whether the aircraft is flying over water or land, such as based on the geographic location data. In some embodiments, the system is configured to cause the arming controller to remain armed closer to a city, populated area, and/or the like if the aircraft is presently over water than if the aircraft were presently over land. This can be desirable, for example, because the likelihood of an inadvertently ejected ejectable module hitting a person or property may be less when the aircraft is over water than over land.

In some embodiments, the system may also or alternatively be configured to take into account an altitude of the aircraft and/or a distance of the aircraft above the ground in arming and disarming the system. For example, the system may be configured to disarm the launching or ejection system when the aircraft is above a predetermined altitude, and arm the system when the aircraft is below the predetermined altitude. One benefit of such a configuration is that, when the aircraft is above a certain altitude, it may be more likely that certain emergency situations may be resolved before the aircraft crashes. For example, an aircraft may go into a stall, which may be considered an emergency situation. However, the higher the aircraft is when the stall occurs, the more likely the aircraft may be able to recover from the stall without crashing. As a specific example, if the predetermined altitude is 6000 feet, and a stall occurs at 15,000 feet, the system may detect this stall as an emergency situation, but keep the launching or ejection system disarmed until the aircraft passes below the 6000 foot level. At that point, the system may be configured to arm the launching system, for example, allowing an ejection controller of the system to cause the launching system to launch the ejectable module at an appropriate time, which could be immediately or could be at a later time, such as shortly before an impact with the ground or water occurs.

In some embodiments, the system may also or alternatively be configured to have an upper limit on the altitude where the ejection or launching system is disarmed. For example, the system may be configured to arm the ejection or launching system when the aircraft goes above a predetermined altitude, such as an altitude equal to or near the aircraft's service ceiling. This may be desirable in some cases, for example, because it may be more likely that an emergency event occurs when an aircraft exceeds its designed service ceiling than if the aircraft were within its operating limits. This does not necessarily mean, however, that the ejectable flight data recorder module will always be ejected upon the aircraft exceeding its service ceiling. For example, if a potentially recoverable emergency event occurs above the service ceiling, the system may still be configured to disarm the ejection or launching system when the aircraft falls back below the service ceiling, but then re-arm the ejection or launching system upon passing the lower altitude threshold.

As mentioned above, some emergency events may be recoverable, and may not result in a crash of the aircraft. Some emergency events may not necessarily be recoverable, but may involve the aircraft descending at least partially intact for an extended period of time until the aircraft impacts the ground or water. Other emergency events may comprise a quick or almost immediate loss of the aircraft in the air, such as, as a result of an explosion. Various embodiments of systems, methods, and devices disclosed herein comprise an ejection controller configured to take into account these various types of emergency situations to increase a likelihood that the ejectable module is launched or ejected in response to an emergency event, but that the ejectable module can also be launched relatively close to a point of impact of the aircraft with the ground or water, when possible. Such functionality can be desirable, such as to enable the acoustic receivers of the ejectable module to more effectively track a sinking trajectory of the aircraft, to reduce a landing impact load on the ejectable module, and/or the like.

In some embodiments, an ejection controller of an ejectable flight data recorder system as disclosed herein can be configured to monitor one or more sensors and/or aircraft flight data to determine when an emergency event is occurring, a type of emergency event that is occurring, an estimated time to impact with the ground, and/or the like. For example, the system may be configured to analyze flight data and/or data from sensors to determine that a descent likely to result in a ground impact is occurring, a collision with another aircraft or object has occurred, an explosion has occurred, and/or the like. The ejection controller in some embodiments can be configured to cooperate with the arming controller such that, when at least some types of emergency conditions are detected, the ejection controller will still not cause ejection or launching of the ejectable module if the arming controller has disarmed the launching system. For example, if the ejection controller determines that a collision has occurred or that a descent likely to result in a ground impact is occurring, the ejection controller may be configured to obey the current arming state set by the arming controller. This may be desirable, because, if the arming controller has disarmed the system, that may be indicative of a situation where recovery from the emergency situation is possible, or where ejection of the ejectable module may be likely to cause harm to people or property, such as because the aircraft is in close proximity to people or property.

In some embodiments, however, the ejection controller can be configured to detect at least one type of emergency condition that can override the arming controller, and cause ejection of the ejectable module regardless of a current arming state set by the arming controller. This may be desirable, for example, because some situations, such as an explosion, may result in an almost immediate loss of the aircraft. In such a situation, if the ejectable module is not relatively quickly ejected, the risk that the ejectable module will also be lost as a result of the explosion is higher. Also, if the aircraft is exploding, there will already be debris falling to the ground or water, and adding a relatively small ejectable module to that falling debris may introduce only a negligible increase in risk of harm to people or property below. Accordingly, it may be desirable in such a situation to go ahead and eject the ejectable module even if the arming controller has disarmed the system.

In some embodiments, systems, methods, and devices disclosed herein may comprise additional safety features that can help to reduce a risk of harm to people or property on the ground or in the water (or even other flights in the air) after an ejectable flight data recorder module has been ejected. For example, some embodiments of the ejectable flight data recorder modules disclosed herein comprise audible and/or visual warning systems that can help to alert people on the ground to a descending ejected module. For example, some embodiments comprise one or more lasers or other types of lights that project light from a descending ejected flight data recorder module that may be visible to people on the ground or in the air. As another example, some embodiments comprise one or more devices that generate sound to warn people on the ground. For example, some embodiments may comprise one or more holes in a skin of the housing of the ejectable module that act as a whistle when air passes therethrough.

Although various embodiments described herein refer to an ejectable flight data recorder module, an ejectable module, an ejectable unit, an ejectable system, and/or the like, this is not necessarily intended to mean that the main flight data recorders or black boxes of an aircraft are ejectable from the aircraft. Although such a configuration is conceivable, it can be more desirable to have an ejectable module that is separate from the one or more standard black boxes of the aircraft. This can have multiple benefits. For example, in case the ejectable module is lost for whatever reason, if the sunken aircraft itself is found, the original black box or black boxes may still be with the aircraft and be recoverable. As another example, the ejectable module may be configured to be relatively small and lightweight, and re-creating all of the functionality of a standard black box in such an ejectable module may make the ejectable module larger and/or heavier than desirable. In some embodiments, an ejectable module comprises a nonvolatile memory that is configured to store a copy of some or all of the data being recorded in a normal black box or flight data recorder, but may not comprise some other features of such a normal black box (and/or may incorporate some of the other features of a normal black box into the overall design of an ejectable module that comprises various other features, such as multiple sustainable power sources, an acoustic search system, descent warning systems, and/or the like).

Various specific embodiments will be described below with reference to the accompanying figures. Some of the embodiments include one or more features and/or benefits, such as, for example, acoustically tracking a sinking aircraft, absorbing and/or dissipating energy or impact upon landing, one or more sustainable power sources, visual and/or audio warning systems during descent, arming or disarming of the system based on a geographic location and/or altitude, causing ejection of an ejectable module upon occurrence of one or more ejection conditions, preventing ejection of an ejectable module in certain situations even upon occurrence of an ejection condition, and/or the like. For simplicity in describing these embodiments, some embodiments are described with reference to and/or the drawings and description focus on only one of these features or advantages, or a subset of these features or advantages. The various features of the individual embodiments disclosed herein may be combined, however, with features of other embodiments disclosed herein, and such resulting embodiments are considered part of the disclosure. Further, U.S. Pat. No. 9,440,749, entitled EMERGENCY MECHANICAL AND COMMUNICATION SYSTEMS AND METHODS FOR AIRCRAFT, which is hereby incorporated by reference herein in its entirety, discloses various other embodiments of ejectable flight data recorder systems. The various features of the individual embodiments disclosed herein may be combined with any of the embodiments disclosed in the '749 patent, and the various features disclosed in the '749 patent may be combined with any of the embodiments disclosed herein, and such resulting embodiments are considered part of the present disclosure. Further, the portion of the system that is intended to be ejected or launched from the aircraft may be referred to herein as an ejectable module, ejectable system, or the like.

Ejectable Flight Data Recorder Systems

FIG. 1 illustrates one example embodiment of a schematic diagram of an ejectable flight data recorder system 100. The ejectable flight data recorder system 100 is installed in an aircraft 102. The ejectable flight data recorder system 100 comprises an ejectable system or module 104, a launching system or launching tube 106, a valve 108, a stored energy source 110, a control system 112, a plurality of sensors 114, such as collision sensors, one or more sensors 116 integrated into the control system 112, such as shock sensors, a flight data acquisition unit (FDAU), and an aircraft data bus 120. In this embodiment, the ejectable module 104 is configured to be ejected from the launching tube 106 upon occurrence of one or more ejection conditions, as further described below with reference to an ejection controller and arming controller. The ejectable module 104 in this embodiment is configured to be ejected by a stored energy source 110, such as a compressed gas, which can be selectively delivered to the launching tube 106 via a valve 108. The control system 112 can be configured to operate the valve 108 to cause a rapid ejection of the ejectable module 104 on demand. In some embodiments, the control system 112 may be referred to as an emergency detection system. In some embodiments, the control system 112 comprises a battery for powering the control system in the event of a loss of main bus power. In some embodiments, the control system 112 is configured to automatically disable itself, or power itself down, upon landing of the aircraft, to prevent discharge of the battery when the aircraft is not in flight.

Although this embodiment illustrates a launching or ejection system that comprises a compressed gas that launches the ejectable module 104 from the launching tube 106, various other methods or techniques for ejecting the ejectable module 104 may be utilized with the concepts disclosed herein. For example, a pyrotechnic stored energy source may be used, one or more mechanical springs may be used, explosive bolts may be used, and/or the like.

In this embodiment, the control system 112 is desirably configured to monitor a plurality of sensors and/or aircraft data that can be obtained by the control system 112 by communicating with the various sensors 114, 116, the aircraft data bus 120, and/or the flight data acquisition unit 118. The control system 112 may be configured to monitor the plurality of sensors and/or aircraft data through a sensor interface that may be a single interface incorporated into the control system 112, may be divided among any number of components of the control system 112, such as the arming controller 220, ejection controller 222, data converter 223, and/or the like. The sensor interface 112 may, for example, comprise one or more electrical connections at or electrically coupled to the control system 112 that functionally connect the control system 112 to the flight data acquisition unit 118, aircraft data bus 120, sensors 114, 116, and/or the like. In some embodiments, the sensor interface further comprises one or more electronic components, such as integrated circuits, resistors, capacitors, and/or the like, that enable the control system 112 to receive and/or interpret sensor data. In some embodiments, the sensor interface 112 may comprise specific interfaces for different data sources, such as an aircraft data bus interface to receive data from the aircraft data bus 120, a flight data acquisition unit interface to receive data from the flight data acquisition unit 118, a separate sensor interface to receive data from the sensors 114, and/or the like. Any number or combination of sensors 114, 116 may be used. In this embodiment, the sensors 114 are distributed throughout the aircraft and electronically connected to the control system 112. The sensor 116 is integrated into the control system 112. In this embodiment, each of the remote sensors 114 comprises a collision sensor, such as a sensor configured to detect a collision of the aircraft 102 with another object. Sensor 116 in this embodiment comprises a shock sensor, such as a sensor that can detect a shock load, such as might occur as a result of an explosion. In some embodiments, the system is configured to detect that an explosion has occurred when a shock load above a threshold level is detected. Various other sensors may be utilized, either directly attached to the control system 112, and/or as part of the existing aircraft's sensors, and passed to the control system 112 through the aircraft data bus 120 and/or the control system 112's connection to the flight data acquisition unit 118. For example, some of the parameters that may be monitored by the control system 112, either directly or via the aircraft data bus 120 and/or connection to the flight data acquisition unit 118, are power, fuel, engine speed, thrust, acceleration, vertical speed, airspeed, altitude, position, intended flight path, orientation, cockpit control inputs, cockpit voice data, radio information received from remote sources, collision indicators, shock indicators, and/or the like. The parameters monitored by the control system 112 may all be considered to be sensor data, regardless of whether the control system 112 receives that sensor data directly from a sensor, such as sensors 114 or 116, or indirectly from the aircraft data bus 120 or flight data acquisition unit 118.

The embodiment illustrated in FIG. 1 may be utilized with any of the embodiments of specific features or components of an ejectable flight data recorder system described below with reference to the remainder of the drawings.

Figure 2:
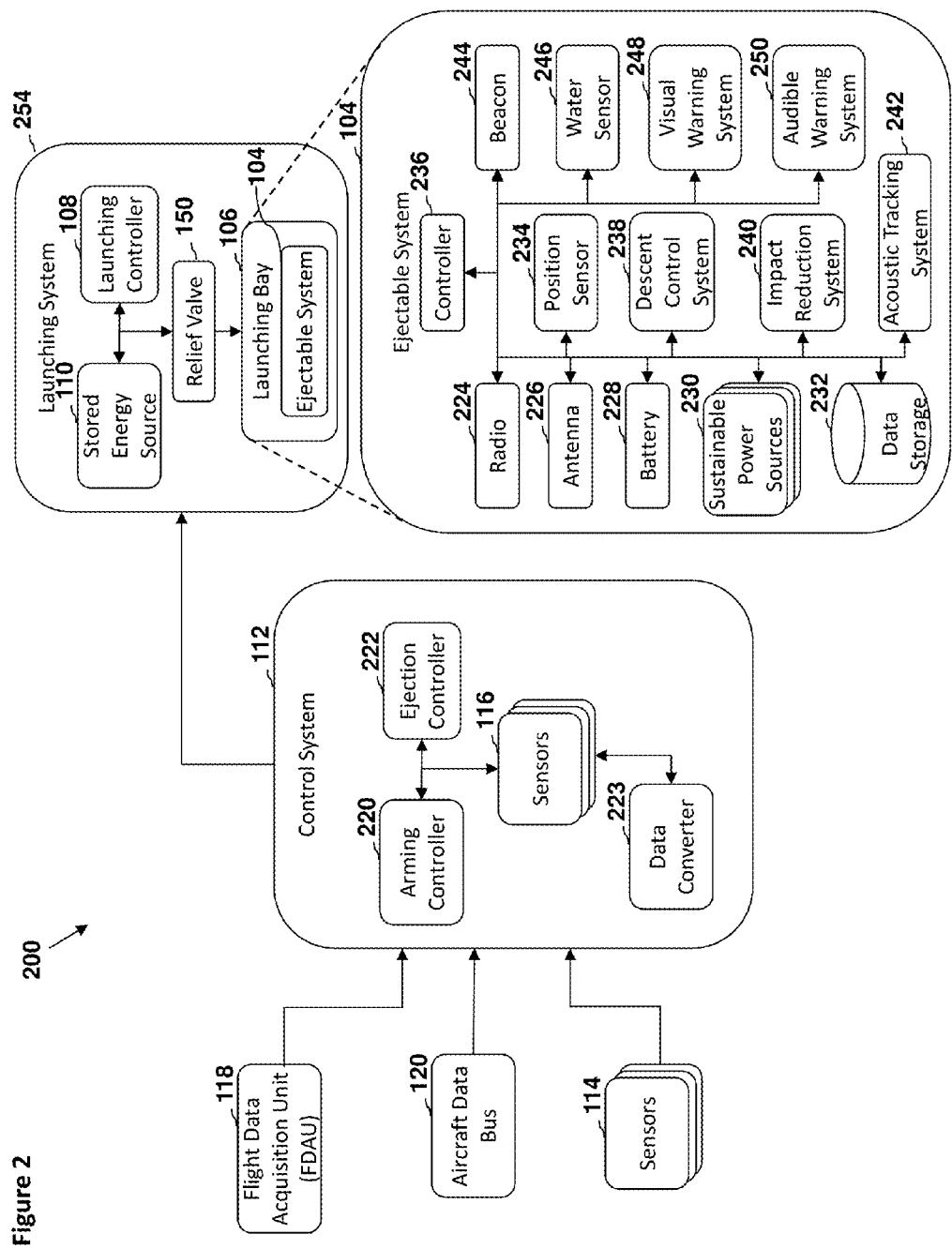
FIG. 2 is a block diagram of an embodiment of an ejectable flight data recorder system.

FIG. 2 illustrates a block diagram of an embodiment of an ejectable flight data recorder system 200. The ejectable flight data recorder system 200 may be similar to the system 100 illustrated in FIG. 1. The embodiment shown in FIG. 2, however, illustrates additional details of the control, launching, and ejectable systems. The ejectable flight data recorder system 200 comprises a control system 112 configured to control a launching system 254. The control system 112 is configured to receive data from one or more sources, and to analyze that data in order to arm or disarm the launching system 254 and/or to cause the launching system 254 to eject the ejectable system or module 104 from the launching bay 106. In this embodiment, the control system 112 receives data from a plurality of sensors 114, a flight data acquisition unit 118, and an aircraft data bus 120. The control system 112 may further receive data from one or more sensors 116 that are built into the control system 112, instead of being remote from the control system 112.

The control system 112 further comprises an arming controller 220 and an ejection controller 222. The arming controller 220 can be configured to analyze the data received from the sensors 114, sensors 116, flight data acquisition unit 118, and/or aircraft data bus 120 to determine whether the launching system 254 should presently be armed or disarmed. The arming controller 220 can be configured to then cause the launching system 254 to be dynamically armed or disarmed based on changing data received by the control system 112. For example, the arming controller 220 may be configured to dynamically and automatically cause the launching system 254 to be disarmed when the aircraft is within a certain distance from a city, populated area, airport, coastline, and/or the like. The arming controller 220 may further be configured to cause the launching system 254 to be automatically and dynamically disarmed when the aircraft is above a predetermined altitude level and/or below a second predetermined altitude level.

In some embodiments, arming or disarming the launching system 254 is done electronically (e.g., in software), mechanically, or using a combination of the two. For example, disarming the launching system 254 may comprise instructing the launching controller 108 of the launching system 254 to not respond to one or more ejection commands received from the control system 112. This is an example of electronically disarming the system. In some embodiments, the launching system 254 comprises a mechanical relief valve 150. The relief valve 150 may be positioned operatively between the stored energy source 110 and the launching bay 106. In some embodiments, disarming the system may comprise causing the relief valve 150 to open. When the relief valve 150 is open, if the stored energy source 110 is activated, such as by releasing a pressurized gas, activating a propellant, and/or the like, the pressure released from the stored energy source 110 will be redirected out of the system through the relief valve 150, instead of being directed into the launching bay 106 to cause ejection of the ejectable module or ejectable system 104. This is an example of mechanically disarming the system. Desirably, the systems disclosed herein can comprise a combination of electronic and manual disarming. For example, in a case where the aircraft is on the ground, it may be desirable to cause the relief valve 150 to open, thus not allowing ejection of the ejectable module or ejectable system 104 in any situation. In a case where the aircraft is in flight, however, it may be desirable to electronically disarm the system in certain situations, which may enable certain ejection commands from the control system 112 to be obeyed and others disobeyed. In some embodiments, the relief valve 150 may still be used in such situations, but the launching controller 108 may be configured to close the relief valve 150 in response to receipt of an ejection command from the control system 112 that should override the current disarmed state of the launching system 254. In some embodiments, the system is configured to automatically open the relief valve 150 when the aircraft is on the ground, and to automatically close the relief valve 150 when the aircraft is airborne. In some embodiments, the system is configured to determine whether the aircraft is on the ground or airborne by monitoring a weight on wheels signal.

By dynamically and automatically arming and disarming the launching system 254, the arming controller 220 can beneficially make the ejectable flight data recorder system 200 more robust and safer to use. For example, by avoiding launching the ejectable module 104 when the aircraft is within a certain distance from a city or other populated area, a risk that someone on the ground is hit by the ejected system 104 can be reduced. Further, if the aircraft is within the predetermined distance from a populated area, it is less likely that an aircraft wreckage would be hard to find, and thus the value in having the ejectable module 104 ejected may be reduced. Further, as mentioned above, it may be beneficial to have the launching system 254 disarmed when the aircraft is above a predetermined altitude level, to avoid ejection of the ejectable module 104 in a situation where the aircraft may still recover. In such a case, ejecting the ejectable module 104 could potentially cause more harm than good, such as by changing the aerodynamics of the aircraft when a hole is created through the fuselage. Further, by delaying ejection of the ejectable module 104 until the aircraft is closer to the ground or water, the ejectable module 104 may be able to land relatively closely to a point of impact of the aircraft.

The ejection controller 222 of the control system 112 can also be configured to monitor various information or data streams coming in from the various sensors 114, 116, flight data acquisition unit 118, and/or aircraft data bus 120. The ejection controller 222 can be configured to analyze this information in real time to dynamically detect an emergency condition or a condition where it may be desirable to cause the launching system 254 to eject the ejectable module 104. In some embodiments, the ejection controller 222 may be configured to immediately cause the launching system 254 to eject the ejectable module 104 in response to the ejection controller 222 detecting an emergency condition. In some embodiments, the ejection controller 222 can be configured to monitor one or more ongoing emergency conditions, and eventually cause the launching system 254 to launch the ejectable module 104 if the emergency condition is sustained for a predetermined amount of time and/or if a crash landing is imminent.

In some embodiments, the ejection controller 222 may be configured to analyze data for detection of ejection conditions having different authority levels. In some embodiments, the system is configured to have ejection conditions comprising at least two authority levels, including a lower level of authority and a higher level of authority. Ejection conditions having a lower level of authority may be configured to obey an arming status of the launching system 254, such as was dynamically set by the arming controller 220 based on the aircraft's present geographic location and/or altitude. For example, if an ejection condition having a lower level of authority is detected by the ejection controller 222, that ejection condition may not cause deployment of the ejectable module 104 unless the arming controller 220 has armed the launching system 254. Ejection conditions having a higher level of authority, however, may be configured to not obey an arming status of the launching system 254. For example, if an ejection condition having a higher level of authority is detected by the ejection controller 222, that ejection condition may cause deployment of the ejectable module 104 regardless of the arming state set by the arming controller 220. This may be a beneficial feature, particularly in cases where destruction of the aircraft is imminent or presently occurring. For example, the arming controller 220 may be configured to disarm the launching system 254 when the aircraft is flying at a cruising altitude. This can be beneficial, because many emergency situations that occur at cruising altitude can either be resolved before the aircraft crashes or will at least result in the aircraft still descending for an extended period of time before the aircraft crash lands. If the launching system 254 were armed at cruising altitude, then there may be a higher likelihood that some ejection conditions detected by the ejection controller 222 could result in a deployment of the ejectable module 104 at the cruising altitude, which could have adverse effects on the aerodynamics of the aircraft, or which could cause of the ejectable module 104 to land at an area relatively far away from the eventual landing area of the aircraft. In the case of certain ejection conditions, such as, for example, an explosion that may destroy the aircraft in a matter of milliseconds, it may be desirable for the ejection controller 222 to override the disarmed status of the launching system 254, and thus cause an immediate or relatively quick deployment of the ejectable module 104.

In some embodiments, the control system 112 may comprise a data converter 223 that is configured to analyze various data received from the flight data acquisition unit 118, aircraft data bus 120, sensors 114, and/or sensors 116 and convert this data into data suitable for storage in the data storage 232 of the ejectable system or ejectable module 104. For example, in some embodiments, it may not be desirable or feasible for the data storage 232 of the ejectable system 104 to store every bit of information generated by the flight data acquisition unit 118, aircraft data bus 120, sensors 114, and/or sensors 116. Storing all of this data may take too much memory space, may take too much time, and/or the like. Rather, it can be desirable to extract only the most important data and convert that data into a suitable format for transmission to the ejectable system 104 for storage in the data storage 232. In some embodiments, the data converter 223 is configured to use an application programming interface (API) that controls conversion of such data into a format suitable for storage by the ejectable system 104.

With continued reference to FIG. 2, the launching system 254 comprises a stored energy source 110, a launching controller 108, and the launching bay 106 having the ejectable module 104 positioned therein or coupled thereto. The stored energy source 110 may comprise, for example, a compressed gas, a pyrotechnic energy source, an electromagnetic energy source, and/or the like. The launching controller 108 may be configured to cause the stored energy source 110 to release its stored energy to the launching bay 106, thus causing the ejectable module 104 to be deployed from the launching bay 106. In some embodiments, the launching controller 108 may comprise a valve, an electronic igniter, a relay, and/or the like. The launching bay 106 may take various forms. For example, in some embodiments, the launching bay 106 may comprise a tubular structure, having the ejectable module 104 positioned therein. The tubular structure may act like a barrel of a gun, enabling the ejectable module 104 to be launched therefrom responsive to the launching controller 108 causing the stored energy source 110 to release its stored energy to the launching bay 106.

FIG. 2 further illustrates various components of one embodiment of an ejectable module 104. Such an ejectable system may alternatively be referred to herein as an ejectable module, an ejectable flight data recorder module, and/or the like. This embodiment of an ejectable module 104 comprises a radio 224, and antenna 226, a battery 228, a plurality of sustainable power sources 230, an electronic data storage 232, a position sensor 234, a controller 236, a descent control system 238, an impact reduction system 240, an acoustic tracking system 242, a beacon 244, a water sensor 246, a visual warning system 248, and an audible warning system 250. Various other embodiments of ejectable systems may comprise more or fewer components, may comprise more than one of any of these components, and some components may be combined.

The radio 224 may be configured to, for example, transmit data to and/or receive data from a satellite, other aircraft, boat, buoy, and/or the like. More than one radio may be included in some embodiments, such as different radios for different purposes. For example, one radio 224 may be configured to communicate with a satellite system at a particular frequency, using a particular protocol, using a particular power level, and/or the like. Another radio may be configured to communicate with a buoy system using a particular frequency, protocol, power level, and/or the like. The antenna 226 may be electrically coupled to the radio 224 to enable the radio 224 to transmit and/or receive data. In some embodiments, more than one antenna 226 is included. For example, different antennas 226 may be tuned for different frequencies. As another example, different antennas 226 may be oriented differently, to increase a likelihood that at least one of the antennas 226 is aligned at any particular time in a fashion that allows efficient communications between the ejectable module 104 and a remote system. For example, because the ejectable module 104 may be floating on the ocean, and the ocean may be turbulent, the antennas 226 may sometimes be in constant motion. By having multiple antennas 226 in multiple orientations, such as, for example, two antennas oriented substantially perpendicular to one another, a likelihood is increased that at least one of the antennas will have a desirable alignment or orientation with a remote system's antenna at any particular time.

The battery 228 may be configured to store electrical power for powering the various modules or components of the ejectable module 104. In some embodiments, the battery 228 is sized to have enough power to power the various components of the ejectable module 104 for a predetermined period of time. For example, the battery 228 may be configured to store enough power to power the ejectable module 104 for 30 days after ejection from the aircraft. Particularly in situations where an aircraft is lost in a remote location, it can be desirable to allow the ejectable module 104 to operate for an extended period of time. However, extending the designed operation time of the ejectable module 104 may also require additional battery capacity, unless other power management techniques are used, such as by reducing a duration or frequency of radio transmissions, and/or the like.

Additional battery capacity may mean the ejectable module 104 comprises additional weight. It can be desirable, however, to reduce the size and/or weight of the ejectable module 104. By reducing the size and/or weight of the ejectable module 104, the amount of mass descending to the ground after ejection is reduced, and thus the various components of the ejectable module 104 that control the descent of the ejectable system and/or that reduce an impact of the ejectable system on the ground or water can also be reduced in size and/or weight. Further, reductions in size and/or weight of the ejectable module 104 can reduce the size and/or power requirements of the launching system 254. Accordingly, it can be desirable to reduce a size of the battery 228.

Some embodiments disclosed herein are able to reduce the size of the battery 228, while sustaining extended and/or indefinite powering of the ejectable module 104, by utilizing one or more sustainable power sources 230. For example, some embodiments of the ejectable module 104 comprise one or more sustainable or renewable power sources such as solar power, kinetic energy generation, saltwater power generation, and/or the like. For example, the ejectable module 104 may comprise one or more solar panels positioned within or about a housing of the ejectable module 104 in a position to gather energy from sunlight when the ejectable module or ejectable module 104 is floating on the surface of the water. In some embodiments, the ejectable module 104 comprises various components that are laid out within a cavity of a housing in a fashion that positions a center of gravity of the ejectable module 104 such that a predetermined side or surface of the ejectable module 104 is pointing upward when the ejectable module 104 is floating on the water. This may be desirable, for example, to enable positioning of solar panels to gather sunlight, to enable a particular orientation of the antennas 226, and/or the like.

In an embodiment that comprises a sustainable power source 230 comprising a kinetic energy generation system, the sustainable power source 230 may comprise, for example, a weight, rotor, pendulum, and/or the like configured to sway, move back and forth, rotate, and/or the like in response to movement of the ejectable module 104, such as movement in response to waves on the surface of an ocean. The movements of the weight, rotor, pendulum, and/or the like may be converted into energy by a generator and stored in the battery 228. In some cases, this may be similar to a kinetic energy generator used in wristwatches to recharge a battery in a wristwatch.

In an embodiment that comprises a sustainable power source 230 comprising a saltwater power generation system, the saltwater power generation system may comprise, for example, an iconic power, electrochemical power, osmotic power, salinity gradient power, or blue energy generator.

Such a system can be configured to generate energy through reverse electrodialysis, pressure retarded osmosis, and/or the like.

In addition to such power sources 230 being sustainable, meaning they can recharge the battery 228 for an extended period of time, potentially indefinitely, after ejection from the launching system 254, it can be desirable to have more than one sustainable power source 230 to provide redundancy. For example, in a system that includes a solar power generation system, little or no solar power would be able to be generated at night, when there is very little sunlight. If a second type of sustainable power source 230 is available, however, which can generate power during the night, the system can be configured to use that power source during the night and the solar generating power source during the day. Further, due to the harsh operating environment of the ejectable module 104 after ejection, having redundant sustainable power sources 230 may be desirable in the event that one or more of the sustainable power sources 230 is damaged and fails to generate power, or fails to generate power as efficiently as expected. In some embodiments, multiple sustainable power sources 230 can be configured to generate power simultaneously, increasing a total level of power generation at any particular time.

In some embodiments, the controller 236 can be configured to monitor a power level of the battery 228, and/or a current power output level of one or more sustainable power sources 230, and dynamically disable certain systems or components of the ejectable module 104 to reduce a current power requirement and/or extend a life of the battery 228. For example, in some embodiments, the system may be configured to transmit some of the flight data stored in the data storage 232 to a remote system, such as a satellite, buoy, aircraft, boat, and/or the like. In an instance where the power level of the battery 228 is below a certain level, and/or the sustainable power sources 230 are outputting power at a rate below a certain level, the system may be configured to stop or disable, at least temporarily, transmission of the stored flight data, but continue to operate systems that can help searchers to locate the ejectable module 104, such as the beacon 244. In some embodiments, the system is configured to not necessarily fully disable certain systems or subsystems, but to at least reduce a frequency of transmissions or the like, resulting in a reduction in power requirements.

In some embodiments, the ejectable module 104 may have different power requirements depending on a current stage of its operation. For example, as the ejectable module 104 is descending toward the ground or water, its power requirements may be relatively low. In an initial stage after landing, power requirements may be higher, for example, in order to implement some initialization procedures, such as, for example, deploying one or more antennas, deploying an acoustic tracking system, and/or the like. After such initial procedures have occurred, however, power requirements may drop, as the ejectable system may not need to perform those initial procedures anymore. Further, some systems, such as the acoustic tracking system 242 may be configured to only be used as long as needed. For example, the acoustic tracking system 242 can be configured to track a sinking trajectory of the aircraft in the water. Once the aircraft has sunk far enough that the acoustic tracking system 242 can no longer detect the aircraft, however, the acoustic tracking system 242 may no longer be needed. Accordingly, at such time, the ejectable module 104 may be configured to deactivate the acoustic tracking system 242, thus reducing power requirements of the ejectable module 104. Such power management techniques may enable the ejectable module 104 to last longer with a smaller battery 228 and/or sustainable power sources 230 having lower power output levels. This can desirably lead to, among other things, weight reduction.

In some embodiments, the stage that requires maximum power is a stage beginning after landing in the water and ending after the acoustic tracking system 242 has been deactivated. Since this stage can be expected to be a relatively short portion of the ejected system's active lifespan, which may comprise several days or even months until the system is located, the system design may take this into account. For example, to reduce the weight of the ejectable module 104, the battery 228 may be sized to have enough power to sustain that first stage of higher power usage without any recharging from the sustainable power sources 230. After that higher power stage has ended, however, the sustainable power sources 230 may be sized to be able to power the ejectable module 104 indefinitely until the ejectable module 104 has been located by searchers. Such a design can enable the sustainable power sources 230 to be smaller, less expensive, and lighter weight than if the sustainable power sources 230 were designed to allow the ejectable module 104 to operate indefinitely even in its highest power usage stages.

Still referring to FIG. 2, the electronic data storage 232 of the ejectable module 104 may comprise, for example, a nonvolatile memory or any other type of electronic memory storage. The electronic data storage 232 may be configured to store, for example, flight data from the aircraft prior to the ejectable module 104 being deployed from the launching system 254, position data related to a position of the ejectable module 104 after being deployed from the launching system 254, acoustic tracking data generated by the acoustic tracking system 242 when the ejectable module 104 has landed in the water and is tracking a sinking trajectory of the aircraft, and/or the like. The ejectable module 104 may be configured to transmit at least some of the data stored in the data storage 232 to an external system via the radio 224 and antenna 226. The ejectable module 104 may also be configured to enable retrieval of data in the electronic data storage 232 via a wireless or wired connection to the ejectable module 104 after the ejectable module 104 has been retrieved or recovered.

In some embodiments, it can be desirable for the data storage 232 to comprise nonvolatile memory, meaning stored data is not lost if power to the data storage 232 is lost. This can be desirable, for example, because there may be instances when the battery 228 runs out of power, the sustainable power sources 230 stop generating power and/or are not generating sufficient power, and/or the like. By having nonvolatile memory, the storage of the data can be more robust in such situations. In some embodiments, the data storage 232 may further comprise volatile memory, such as RAM, which may be desirable because it may be faster than a nonvolatile memory. This could be particularly desirable in rapidly transferring flight data from the aircraft to the ejectable module 104 prior to deploying the ejectable module 104. For example, in a case where an emergency condition has been detected, and the control system 112 is going to rapidly cause the launching system 254 to deploy the ejectable module 104, it may be desirable to rapidly transmit the latest flight data from, for example, the flight data acquisition unit 118, aircraft data bus 120, sensors 114, and/or sensors 116, to the ejectable module 104 for storage in the data storage 232. By utilizing RAM as a buffer, the data source 232 may be able to store more data quickly just before deployment. The system can be configured to then transfer the data from the volatile memory to the nonvolatile memory for longer-term storage.

The position sensor 234 of the ejectable module 104 may comprise, for example, one or more sensors configured to detect a present position of the ejectable module 104. The position sensors 234 may comprise, for example, a global positioning system or GPS sensor, a GLONASS sensor (Globalnaya Navigazionnaya Sputnikovaya Sistema), an inertia based sensor, an altimeter, a barometer, a compass, and/or the like. The position sensor or sensors 234 can be used, for example, to enable the ejectable module 104 to detect its present location and store a history of its location in the electronic data storage 232. In some embodiments, the system is configured to store at least thirty minutes of location history data. In some embodiments, the system is configured to store more or less location history data, such as at least 10, 20, 60, 120, or more minutes of location history data. In some embodiments, the system is configured to store location history data from a time of landing on the water to a time of recovery. By having a history of the ejectable module 104's location, this could help a search crew in tracking a path of the sinking aircraft, since the aircraft's sinking path may be at least partially related to the path the ejectable module 104 follows when floating on the surface of the water. However, since surface currents can move in different directions than currents below the surface, it may be desirable to also include an acoustic tracking system 242, which can enable the ejectable module 104 to directly track and store the sinking trajectory of the aircraft. In some embodiments, the system is configured to transmit at least some of the detected positions of the ejectable module 104 to an external system via, for example, the radio 224 and antenna 226.

Still referring to FIG. 2, the controller 236 may comprise, for example, one or more computer processors configured to control and/or manage the operation of the various components of the ejectable module 104. For example, the controller 236 may be programmed to control transmission timing and frequencies of the radio 224, monitor power levels of the battery 228 and power output or generation levels of the sustainable power sources 230, control deployment of the acoustic tracking system 242, and/or the like.

The descent control system 238 can be configured to control a descent of the ejectable module 104 after the ejectable module 104 has been deployed or ejected from the launching bay 106 of the launching system 254. For example, the descent control system 238 may comprise one or more parachutes configured to be deployed after ejection from the launching system 254. In some embodiments, the one or more parachutes are configured to be automatically separated from the ejectable module 104 after the ejectable module 104 has made contact with the ground or water, such as by activating a solenoid or the like. The controller 236 may be configured to automatically cause such separation in response to, for example, the water sensor 246 detecting a water landing, a shock sensor detecting an impact with the ground, an altimeter detecting that the ejectable module 104 has discontinued its descent, and/or the like. In some embodiments, the parachute is coupled to the housing using a water-soluble glue that is configured to dissolve after landing in the water.

The impact reduction system 240 of the ejectable module 104 may be configured to reduce an impact load on the ejectable module 104 resulting from the ejectable module 104 landing on the ground or water after being deployed from the aircraft. In some embodiments, the impact reduction system 240 may comprise an energy dissipating nosecone of the housing that is shaped to deflect at least a portion of the impact load. In some embodiments, the energy dissipating nosecone may comprise one or more compressible areas or crush zones or crumple zones that are configured to absorb at least a portion of an impact load through plastic deformation of the nosecone. Further details of such an embodiment are described below with reference to FIGS. 10A and 10B.

The acoustic tracking system 242 of the ejectable module 104 may be configured to track a sinking trajectory of the aircraft after the aircraft crash-landed in a body of water. In some embodiments, the acoustic tracking system 242 may comprise one or more hydrophones or other acoustic or sonar sensors that are configured to track a sound transmitted by the sinking aircraft, such as a sound generated by an underwater locator beacon. In some embodiments, the acoustic tracking system 242 may comprise one or more active sonar transducers configured to actively ping or search for the aircraft as it is sinking. Such an embodiment may be desirable, such as in an instance where the underwater locator beacon of the aircraft has been damaged and is not generating a sound.

In some embodiments, such as is described in more detail below, the acoustic tracking system 242 may comprise one or more separation members configured to separate two or more hydrophones or other acoustic sensors from one another after being deployed from the floating ejectable module 104. By separating the sensors, the system may be able to more accurately track a sinking trajectory of the aircraft. Further, in some embodiments, the acoustic tracking system 242 may be configured to detect a present orientation of the acoustic sensors, which may also enable the system to more accurately track a sinking trajectory of the aircraft. For example, the acoustic tracking system 242 may comprise, for example, one or more compasses coupled to the separation member and/or acoustic sensors, a rotation orientation sensor coupled to the support members and/or acoustic sensors, and/or the like.

In some embodiments, the acoustic tracking system 242 comprises a rotator assembly configured to actively rotate the acoustic sensors in the water. Such a feature may be desirable, for example, to enable redirecting or rotating the sensor array in an orientation that allows more accurate or efficient tracking of the sinking aircraft. For example, if a sensor array comprises two or three acoustic sensors aligned in a co-linear fashion, the most accurate tracking of the sinking aircraft may occur when a line passing through the two or three sensors is generally perpendicular to a line between the sensor array and the sinking aircraft. The least accurate tracking of the sinking aircraft may occur when the line passing through the two or three sensors is generally parallel with the line between the sensor array and the sinking aircraft. In some embodiments, the rotator assembly may be coupled to the housing of the floating ejectable module 104, and be configured to cause rotation of cables, tethers, or other structure that are coupling the acoustic sensors to the floating ejectable module 104. In some embodiments, the individual acoustic sensors may comprise or be coupled to a compressed gas source being directable through a nozzle, a propeller, and/or the like that enables the acoustic sensors to be directly repositioned or rotated.

Still referring to FIG. 2, the beacon 244 may comprise, for example, a locator beacon that can help a search crew to locate the ejectable module 104 after the ejectable module 104 has landed on the ground or water. This may comprise, for example, an electronic locator transmitter (ELT), homing beacon, and/or the like. The ejectable system 104 may further comprise an underwater locator beacon (ULB), for example, for use if the ejectable module sinks in the water. The water sensor 246 can be configured to detect the presence of water, such as when the ejectable module 104 lands in the water. For example, the water sensor 246 may comprise two electrical contacts that complete a circuit when the ejectable module 104 lands in the water. Detecting a water landing can be desirable to, for example, enable the controller 236 to cause automatic separation of a parachute, deployment of the acoustic tracking system 242, deployment of a movable antenna 226, and or the like.

The ejectable module 104 further comprises visual and audible warning systems 248, 250 that can be configured to help warn people on the ground or in the water that the ejectable module 104 is descending. This can allow people that might be in the descent path of the ejectable module 104 to get out of the way. For example, the visual warning system 248 may comprise one or more lasers or other light sources that are configured to project light from the ejectable module 104 that could be visible to a person on the ground or in the air. As another example, the audible warning system 250 may comprise a whistle configured to generate a sound due to air passing therethrough as the ejectable module 104 descends. For example, the whistle may comprise two or more holes in the housing of the ejectable module 104 with a lumen extending within the housing and fluidly connected to the openings. In some embodiments, the audible warning system 250 may comprise a speaker and/or siren configured to generate a sound, such as a high-pitched sound.

Further details of various components of ejectable systems 104 are given below with reference to various drawings included herewith.

Ejection Position and Direction

An ejectable flight data recorder system as disclosed herein may be positioned at various locations on or about or within an aircraft. One such location is shown in FIGS. 3A and 3B. FIG. 3A is a side view of an aircraft 102 above the ground 306, with the launching system 106 of an ejectable flight data recorder system being positioned behind a pressure dome 308 of the aircraft, but in front of a tail cone 310 of the aircraft. Such a position can be desirable, because this section of the aircraft is unpressurized. Accordingly, if an inadvertent deployment were to occur, the creation of a hole in the aircraft for launching of the ejectable module 104 would desirably not affect a pressure within the passenger cabin. Further, such a location may have lower levels of stress in the skin of the aircraft and may be relatively easy to access for maintenance personnel.

FIG. 3A further shows an angle 302 showing that the launching system 106 is positioned to deploy or eject the ejectable module 104 in an upward and rearward direction. In this embodiment, the angle 302 is roughly 45°, but various other angles may be used. FIG. 3B shows a front view of the same aircraft above the ground 306, and shows that the launching system 106 is also positioned to deploy or eject the ejectable module 104 at an angle 304 to the side with respect to the ground 306. In this embodiment, the angle 304 is approximately 60°, or, in other words, the ejectable module 104 is ejected at a 30° tilt away from the vertical stabilizer of the aircraft. The positioning and angle of deployment shown in FIGS. 3A and 3B can be desirable for various reasons. For example, by having the ejectable module 104 ejected from an upper portion of the aircraft, it is more likely that, if the aircraft lands in the water in a normal orientation, the hole in the skin of the aircraft generated by the ejectable flight data recorder module 104 will be above the waterline, and thus will not cause water to be taken on by the aircraft through that hole. Further, it can be desirable to have the ejectable module 104 not hit any portion of the aircraft 102 after ejection. Accordingly, it can be desirable to have the ejectable module 104 ejected in a backward direction, as shown in FIG. 3A, so that the ejectable module 104 can quickly clear the aircraft as the aircraft is traveling in the generally opposite direction. Further, with reference to FIG. 3B, by setting angle 304 at approximately 60°, the ejectable module 104 can pass between the vertical stabilizer 312 and horizontal stabilizer 314, and likely will not hit the vertical stabilizer 312 or horizontal stabilizer 314. Various other angles 302 and 304 may be used in other embodiments, such as equal to, approximately, no greater than, or no less than 10, 20, 30, 40, 50, 60, 70, or 80 degrees.

Ejectable Flight Data Recorder System Structures

FIGS. 4A-4D illustrate one example embodiment of the mechanical structure or layout of a portion of an ejectable flight data recorder system 400. This embodiment comprises a supporting structure or frame 402 positioned adjacent the aircraft fuselage or skin 404. The supporting structure or frame 402 comprises four columns 406 coupled to two parallel plates 408. Extending between the parallel plates and columns 406 are four parallel plates 410. The plates 410 are used to support the launching system of the ejectable flight data recorder system 400, namely the launching tube 106, control valve 108, and pressurized gas source 110.

The plates 408 each comprise a mounting flange 412 configured to be positioned adjacent to the aircraft skin or fuselage 404 to enable the system to be coupled to the aircraft. In this embodiment, the controller or control system 112 is also mounted to one of the plates 408. In this embodiment, the centrally located launching tube 106 comprises an elongated cylindrical shape, and an internal cavity 414. The ejectable module 104 can be positioned within the internal cavity 414 in preparation for launch from the launching tube 106.

Figure 5D:
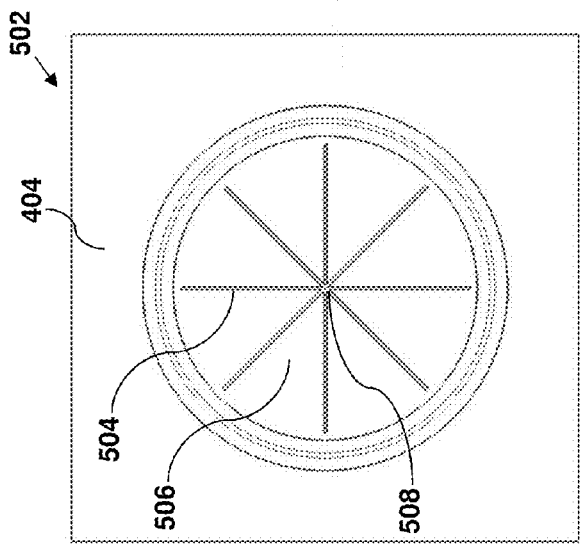

FIGS. 5A-5E illustrate another example embodiment of a mechanical structure or layout of a portion of an ejectable flight data recorder system 500. FIG. 5A illustrates a perspective view of the ejectable flight data recorder system 500 mounted to the fuselage of an aircraft 404. In this embodiment, the structure comprises a plurality of columns 406 that are coupled in more of a pyramid or triangular orientation than the system of FIGS. 4A-4E. This system still comprises, however, the launching tube 106, control valve 108, and pressurized gas source 110.

Figure 5C:
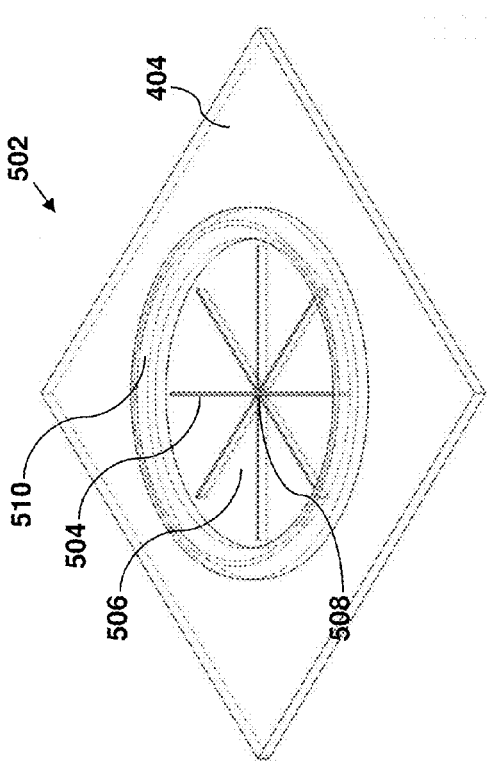
Figure 5E:
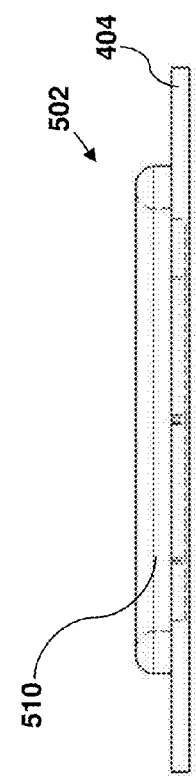

In the embodiment illustrated in FIGS. 5A-5E, the system comprises a frangible panel opening 502 configured to break apart when the ejectable module 104 is forced therethrough. FIG. 5B is an example depiction of the ejectable module 104 breaking through the frangible panel 502. FIGS. 5C-5E illustrates additional details of the frangible panel 502 in an unbroken state. The frangible panel 502 comprises an outer extending surface 404 configured to be adjacent to or coupled with the skin of the aircraft. The panel 502 further comprises a plurality of grooves, score lines, stress risers, and/or the like 504. In this embodiment, the plurality of grooves 504 are laid out in an arrangement that creates a plurality of pie shaped portions 506. When a nosecone of the ejectable module 104 is forced against a center portion 508 of the frangible panel, the grooves or stress risers 504 can cause the frangible panel to fracture or break or otherwise separate along the grooves 504, causing the pie shaped portions 506 to rotate and/or break outwardly, allowing space for the ejectable module 104 to pass therethrough, similarly to as shown in FIG. 5B. In some embodiments, as shown in FIG. 5E, the frangible panel 502 comprises an increased thickness portion 510. In this embodiment, the increased thickness portion 510 comprises a ring or hoop that generally surrounds the frangible portions and grooves 506, 504. This ring or hoop can help to make sure fracturing of the panel does not extend beyond the ring and is limited to the area within the ring. Although this embodiment uses a frangible panel 502, various other embodiments may use other designs or configurations that allow the ejectable module to pass through the aircraft skin or fuselage. For example, some embodiments may comprise one or more hinged doors, sliding doors, spring-loaded doors, and/or the like. Further, some embodiments may comprise the ability to reclose the door after ejection, such as to limit any negative aerodynamic effects of an opening in the skin or fuselage. In some embodiments, even an embodiment using a frangible panel design may include the ability to reclose the opening after launching. For example, such an embodiment may comprise a second sliding or hinged panel that slides or rotates into place after the frangible panel has broken away.

Figure 6B:
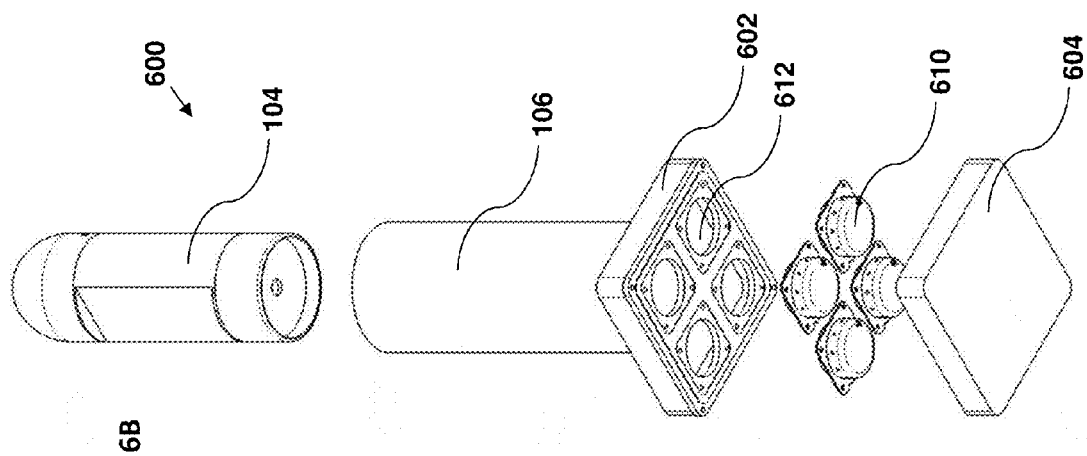
FIGS. 6A and 6B illustrate an embodiment of an ejectable flight data recorder module and a launching system.
Figure 6A:
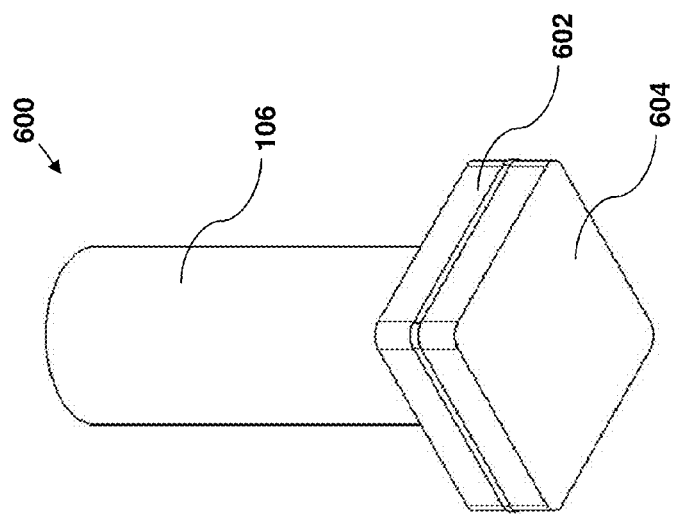

FIGS. 6A and 6B illustrate another embodiment of a portion of an ejectable flight data recorder system 600. In these figures, only the launching system and ejectable module are shown, but the complete system may include other elements, such as a supporting structure, the control system, sensors, and/or the like. FIG. 6A illustrates a perspective view of the launching system. FIG. 6B illustrates a perspective exploded view of the launching system. The launching system comprises the ejectable module 104 positioned within launching tube 106. At a base of the launching tube 106, the system comprises an upper housing portion 602 coupled to a lower housing portion 604. The upper housing portion 602 comprises a plurality of cavities 612 for positioning therein of a plurality of ejection modules or stored energy sources 610. In some embodiments, these ejection modules or energy sources 610 may comprise a compressed gas similar to the compressed gas sources illustrated in other embodiments. In some embodiments, however, these ejection modules or energy sources 610 may utilize a different source of energy, such as a pyrotechnic based energy using a solid propellant. For example, in some embodiments, the ejection modules or energy sources 610 may be similar in design to an airbag inflator as used in automobiles. For example, the ejection module 610 may comprise an igniter configured to ignite a propellant that causes a rapid increase in pressure within the cavities 612, and thus launches the ejectable module 104 from the launching tube 106. In some embodiments, both a compressed gas source and a solid propellant pyrotechnic-based source are used in combination. In some embodiments, a pyrotechnic based control valve is used to control the release of the compressed gas.

Figure 7C:
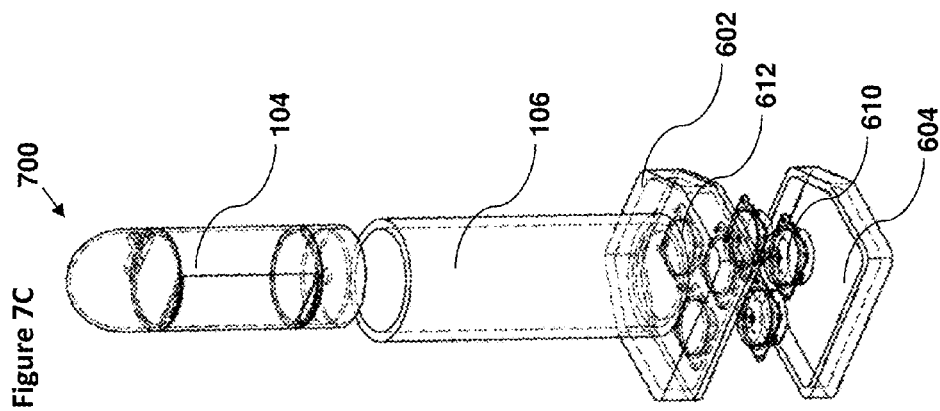
FIGS. 7A-7C illustrate another embodiment of an ejectable flight data recorder module and a launching system.
Figure 7B:
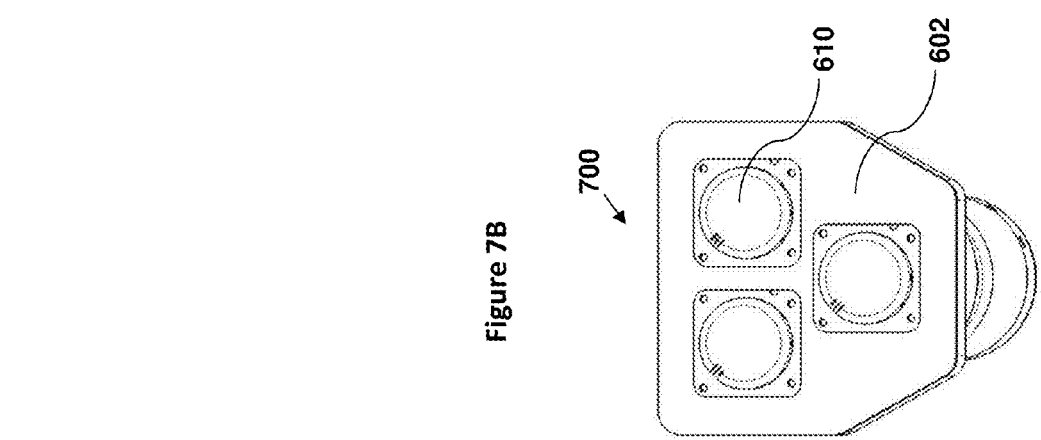
Figure 7A:
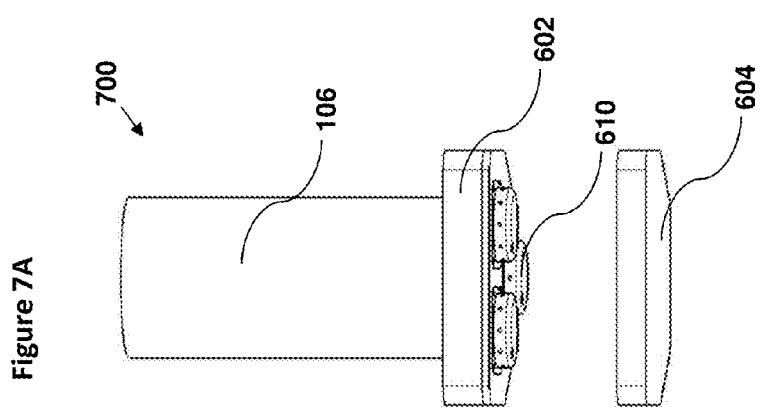

FIGS. 7A-7C illustrate another embodiment of an ejectable flight data recorder system 700. The ejectable flight data recorder system 700 is similar in design to the flight data recorder system 600 described above, except for having a different upper and lower housing 602, 604 design comprising three ejection modules 610 instead of four ejection module 610. It is contemplated that various other arrangements and/or numbers of ejection module 610 may be utilized to effectively launch the ejectable module 104 from the launching tube 106.

Although several specific designs or layouts have been described with reference to FIGS. 4A-4D, 5A-5E, 6A, 6B, and 7A-7C, numerous other configurations may be utilized as long as they are able to position the ejectable module 104 adjacent a skin of the aircraft in preparation for deployment. For example, some embodiments comprise a distributed structure, meaning not necessarily all of the components are attached to the same supporting structure. For example, in some embodiments, the control system 112 may be independently mounted to the aircraft in a different area than the launching tube 106.

Ejectable Flight Data Recorder Modules

Various embodiments of ejectable flight data recorder modules are described herein, for example with reference to FIGS. 8A-8E, FIGS. 9A-9D, FIGS. 10A and 10B, FIGS. 10C-10G, and FIGS. 11A-11E, among other figures. Any of these ejectable flight data recorder modules 104 may be used with any of the systems disclosed herein, such as the ejectable flight data recorder system 100 illustrated in FIG. 1, the ejectable flight data recorder system 200 illustrated in FIG. 2, and the like. The ejectable flight data recorder modules 104 are desirably designed to be relatively robust ejectable modules that can, for example, survive the stresses involved with a rapid ejection and landing on the ground or water, last for extended periods of time on the water or ground, comprise redundant power sources and/or communication methods, and/or the like. In some embodiments, such a relatively robust ejectable module is also desirably designed to be relatively lightweight. Reducing a weight of an ejectable module can have various benefits, including a reduction in size of the system, a reduction in an amount of power needed to eject the ejectable module rapidly from the aircraft, the size of parachute needed to control a descent of the ejected ejectable module, and/or the like.

Figure 8A:
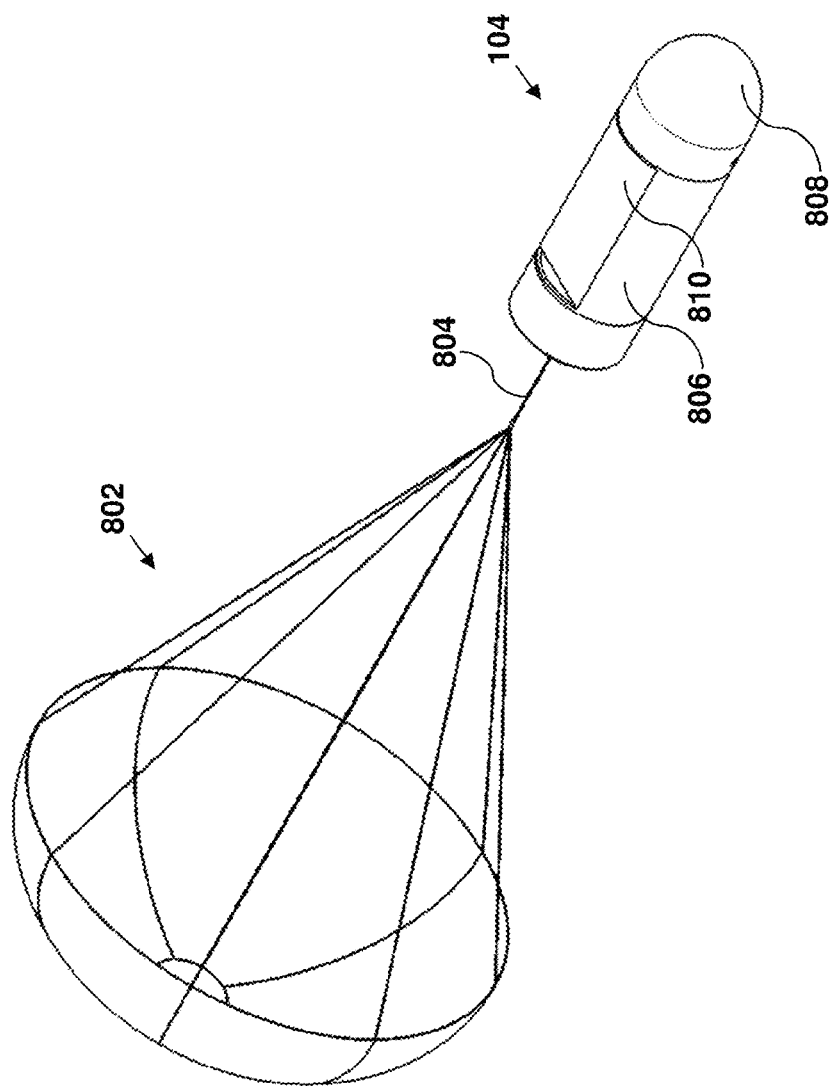

FIGS. 8A-8E illustrate one embodiment of an ejectable flight data recorder module 104. FIG. 8A illustrates a perspective view of the ejectable flight data recorder module 104 after the module has been ejected from the aircraft and the module's parachute 802 has been deployed. In this embodiment, the parachute 802 is coupled to a main housing 806 by a tether 804. In some embodiments, the ejectable flight data recorder module 104 may comprise a water sensor and a solenoid or similar configured to automatically cause detachment of the parachute 802 and/or tether 804 from the housing 806 after the ejectable module 104 detects that the ejectable module 104 has landed on the ground or water.

One beneficial design feature of the ejectable flight data recorder module 104 illustrated in FIG. 8A is that the housing 806 comprises a relatively aerodynamic shape having a generally cylindrical outer shape and a rounded or tapered nosecone 808. Such a shape can help to, for example, enable the ejectable flight data recorder module 104 to be efficiently deployed or ejected rapidly away from the aircraft. Although less aerodynamic shapes could be used, it can be desirable to have an outer shape that is relatively aerodynamic, and thus allows for a relatively predictable flight path upon ejection from the aircraft. This can help to limit a possibility that an ejected flight data recorder module impacts another portion of the plane after ejection, such as the vertical or horizontal stabilizers. In some respects, the outer shape of the housing 806 of the ejectable flight data recorder module 104 is similar to that of a bullet, and the launching tube from which the ejectable flight data recorder module is ejected is similar to a barrel through which a bullet would be fired. The embodiment illustrated in FIG. 8A further comprises a recessed or flat portion 810 of the housing that causes the outer surface of the housing to not be completely cylindrical along its full length. Not all embodiments of ejectable flight data recorder modules need or comprise such a recessed or flat portion 810. The recessed or flat portion 810 can be desirable in some embodiments, however, such as to have a solar panel positioned adjacent to it, to help in lowering a center of gravity of the device so that the flat portion 810 tends to face upward when the device is floating in the water, and/or the like.

FIGS. 8B, 8C, and 8D illustrate additional views of the ejectable flight data recorder module 104. FIG. 8B is a side view that shows the ejectable module with a portion of the parachute tether 804 still attached. FIG. 8C is a similar side view, but with the parachute tether 804 detached and a portion of the outer housing 806 removed so that some of the internal components that are positioned within a cavity 807 of the housing 806 can be seen. FIG. 8D is a perspective view also with a portion of the housing 806 removed so that internal components can be seen. The ejectable flight data recorder module 104 further comprises two holes 812 in the outer housing 806. These holes can be sized and positioned such that air passing by and/or through the holes when the ejectable flight data recorder module is descending to the ground will cause a sound to be generated. In some embodiments, the holes 812 are connected internally via a lumen, tube, air path, and/or the like that is shaped similarly to a whistle to cause a whistling or high-pitched sound to be generated when air passes therethrough. It can be beneficial in some embodiments for the ejectable module to generate a sound as it is descending, such as to warn people that may be in the vicinity of a landing area of the ejected module.

With reference to FIGS. 8C and 8D, some of the internal components, or components positioned within a cavity 807 of the housing 806 may comprise a support structure 814, a battery 815, an antenna 816, a first controller or electronic control unit 818, a second controller or electronic control unit 820, an electronic flight data recorder 822, an electronic cockpit voice recorder 824, an electronic emergency locator transmitter 826, and a solar panel 828. In this embodiment, the antenna 816 is attached to the lower frame or support 814, the battery 815 is also attached to the support 814, and the solar panel 828 is positioned on top of the battery 815. The other modules 818, 820, 822, 824, and 826 are attached to an internal surface of the housing 816. The layout of the components in this embodiment can be beneficial, because, among other things, the weight distribution can be such that a center of gravity is offset from a longitudinal axis of the housing 806. For example, with reference to FIG. 8C, the center of gravity of this embodiment would be below a horizontal longitudinal central axis of the ejectable module 104, thus causing the lower support 814 to tend to be positioned in a downward direction when the module 804 is floating on the water. This can be desirable, for example, to enable the solar panel 828 to be positioned upward such that it can receive light shining through the flat panel 810, which may be clear or transparent. Further, maintaining a particular orientation of the device in the water may be desirable for orientation of the antenna 816. In this embodiment, the antenna 816 comprises a generally cylindrical structure that is positioned to be oriented in a generally vertical direction when the ejectable module 104 is floating on the water.

The embodiment illustrated in FIG. 8C comprises two controllers or electronic control units 818, 820. Having more than one controller or electronic control unit or computer processor may be desirable for various reasons. For example, it may be desirable to have redundant controllers in case one fails. It may also be desirable to have multiple controllers each having specific responsibilities. For example, one controller 818 may be configured to manage the power supply system of the ejectable module while another controller 820 is configured to control or manage communications with external systems, such as via the antenna 816. In various embodiments, a greater or smaller number of controllers or electronic control units may be utilized.

The electronic flight data recorder 822 and electronic cockpit voice recorder 824 may be configured to, for example, store a copy of data similar to or identical to that which would typically be stored in a normal black boxes flight data recorder and cockpit voice recorder. In some embodiments, the electronic flight data recorder 822 and electronic cockpit voice recorder 824 are separate devices within the ejectable module 104, and in some embodiments, the recorders 822 and 824 are combined into a single unit. In some embodiments, the recorders 822 and/or 824 comprise an electronic nonvolatile memory configured to store such flight data in a manner that reduces the risk of loss of that data, even if power is lost in the ejectable module 104.

The emergency locator transmitter 826 can be configured to, for example, transmit signals that can enable an external system to more easily find the ejectable module 104 after the ejectable module 104 has landed in the water or on the ground. The emergency locator transmitter 826 may in some embodiments comprise a relatively simple radio, such as a distress signal generating circuit, that is configured to transmit a specific type of data (e.g., a distress signal, GPS data, and/or the like) to a specific type of receiver (e.g., a satellite network or the like) using a relatively low amount of power. In other embodiments, the emergency locator transmitter 826 may be configured to transmit additional data, transmit to more than one type of receiver, transmit using more than one frequency, and/or the like.

Figure 8E:
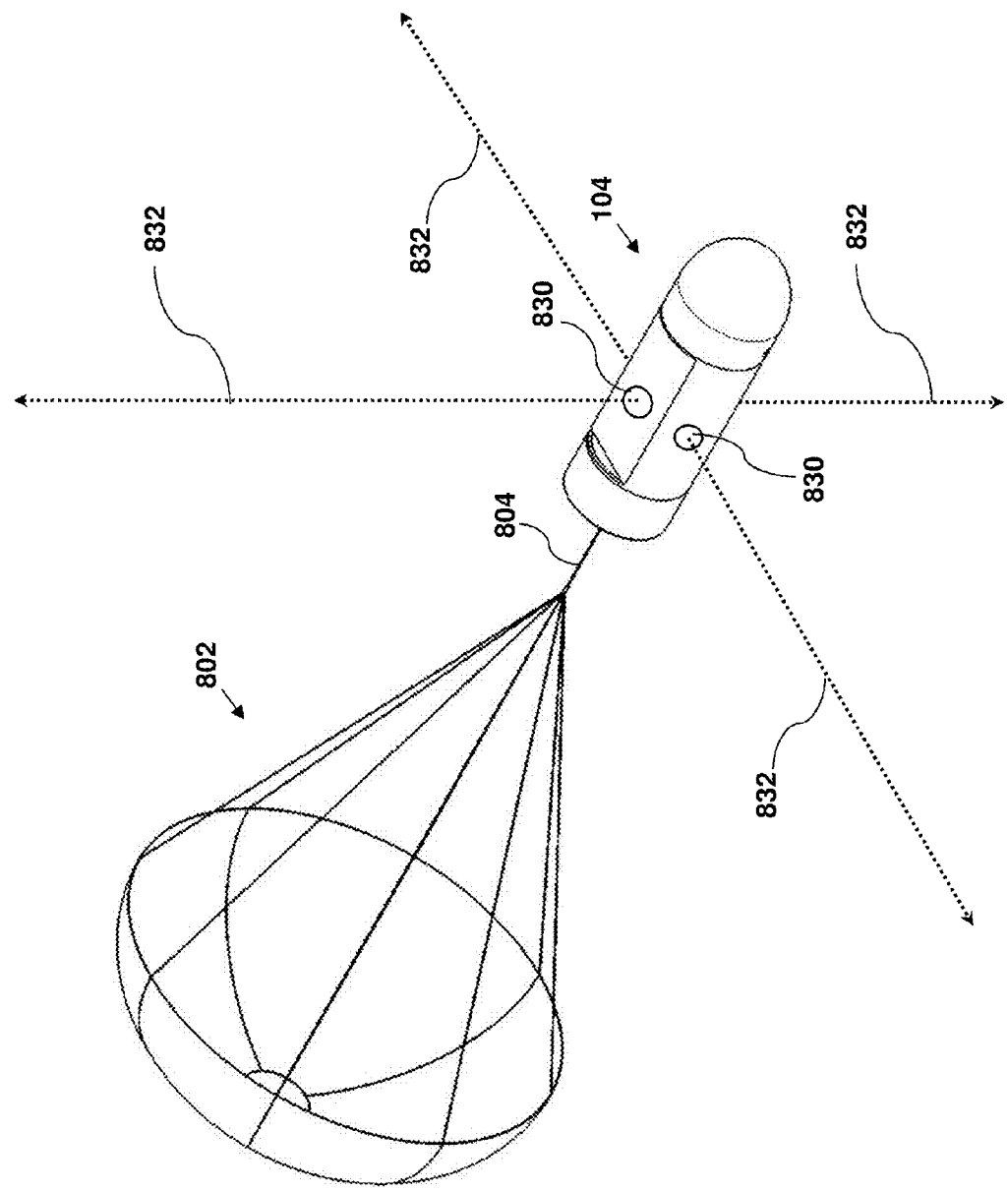

FIG. 8E illustrates an embodiment of the ejectable flight data recorder module 104 that further comprises a plurality of light generators or laser light generators 830 positioned about the housing of the ejectable flight data recorder module 104. The light generators 830 can be configured to project light, such as laser light 832, as the ejected flight data recorder module 104 descends to the ground. This light 832 can act as a visual warning to people in the vicinity of a landing area of the ejected flight data recorder module 104 or even to other flights in the area. A benefit of such a configuration can be similar to a benefit of the acoustic warning system comprising the holes 812, in that people in the vicinity of where the ejected module 104 will be landing may have sufficient warning to get out of the way and not be harmed by the ejected module. Further, other flights may have the ability to maneuver around the descending module. Although this embodiment illustrates a plurality of light generators 830 positioned around the housing of the ejectable module 104, various other embodiments may have a greater or fewer number of light generators 830, may position the light generators anywhere on the device that allows light to be transmitted from the ejectable module, may have multiple types of light generators, such as one or more strobe lights, one or more lasers, and/or the like.

In various embodiments, the housing 806 of the ejectable flight data recorder module 104 can comprise various materials. In some embodiments, it can be desirable to utilize a lightweight but relatively strong material, such as to enable the module 104 to be relatively small in size and lightweight, but still relatively robust to provide shock and/or heat protection to components within the housing 806. Further, it can be desirable to use a material for the housing that comprises thermal insulating properties, for protecting the internal components of the ejectable module from heat. For example, in some embodiments, the housing 806 comprises a polycarbonate material. Another benefit of using a polycarbonate material, or any other nonconductive material, is that the material will have little if any effect on radio transmissions to or from an antenna positioned within the cavity of the housing 806. Further, in some embodiments, at least a portion of the housing 806 can be transparent. This can be beneficial to, for example, enable light to pass through the housing and contact the solar panel 828 to generate power. In some embodiments, the recessed or flat region 810 can comprise a transparent material. In some embodiments, other regions of the housing 806 can also or alternatively comprise a transparent material. In some embodiments, some portions of the ejectable module 104 may comprise titanium or other metals. For example, the housing 806, the supporting frame 814, and any other supporting structure within the cavity 807 may comprise titanium, corrosion resistant stainless steel, or other metals. One benefit to using titanium is that titanium is relatively lightweight when compared to steel. One benefit to using corrosion resistant stainless steel, or other steels, is that they can provide a better grounding path for electronics. In some embodiments, the housing 806 may comprise a plurality of composite materials.

The embodiment of an ejectable module illustrated in FIGS. 8A-8E desirably comprises an outer diameter of approximately 5 inches and a longitudinal length of approximately 15 inches. The module desirably weighs approximately 12 pounds. In some embodiments, the mounting structure and other hardware required to mount the ejectable module to the aircraft and support the functionality of rejecting the module from the aircraft as needed can fit within a space that is approximately 2 feet×2 feet×2 feet square, or a volume of 8 cubic feet. In some embodiments, the ejection energy source can add about 35 pounds of weight to the system, for a compressed gas source, or about 30 pounds of weight to the system, for a solid propellant source. With an ejectable module having an outer diameter of approximately 5 inches, this can lead to only needing to create a hole in the fuselage of the aircraft that is approximately 6 inches or even slightly smaller. Various other dimensions and ratios and weights of ejectable modules and the overall system may be used. However, these example figures provide an example of an embodiment that can be relatively small and lightweight, leading to little, if any, impact on the aircraft the system is incorporated into. In some embodiments, the ejectable module may comprise an outer diameter that is no greater than, for example, three, four, six, seven, eight, nine, or 10 inches. In some embodiments, the ejectable module may comprise a longitudinal length that is no greater than, for example, 10, 11, 12, 13, 14, 16, 17, 18, 19, 20, 25, or 30 inches. In some embodiments, the ejectable module can, for example, weigh no more than five, 10, 15, or 20 pounds.

Although a specific arrangement and configuration of components of the ejectable flight data recorder module 104 are illustrated in FIGS. 8C and 8D, various embodiments may comprise fewer or more components, may combine one or more components together, may position them differently about the cavity 807, and/or the like. For example, the embodiment illustrated in FIGS. 8C and 8D comprises only a single sustainable power source, namely the solar panel 828. In other embodiments, however, no sustainable power source may be provided, a different sustainable power source may be used, or multiple sustainable power sources may be included. Further, as described in more detail below, the ejectable module 104 may further comprise an acoustic search system configured to track a sinking trajectory of the aircraft in a body of water.

FIGS. 9A-9D illustrate another embodiment of an ejectable flight data recorder module 104. This embodiment is similar to the embodiment illustrated in FIGS. 8A-8E. One difference, however, is that the housing 806 shown in FIGS. 9A-9D comprises a longer longitudinal length. Such a longer longitudinal length can, for example, enable a more aerodynamically stable shape, enable more internal cavity space for inclusion of supporting hardware, and/or the like. Another difference is that the embodiment illustrated in FIGS. 9A-9D comprises an external antenna 916. In this embodiment, the external antenna 916 is configured to be recessed within a slot or recessed portion 917 of the housing 806. After landing on the ground or water, the system is configured to deploy the external antenna 916, such as by rotating the antenna outward such that it extends radially from the housing 806. If the ejectable flight data recorder module 104 is designed such that a center of gravity is positioned below a longitudinal axis of the device with reference to the position illustrated in FIG. 9D, this will desirably tend to cause the device to float on the water with the extended or deployed antenna 916 pointing in a generally upward or vertical direction.

In some embodiments, the external antenna 916 may be the only antenna of the ejectable flight data recorder module 104. In other embodiments, multiple antennas may be included. For example, in some embodiments, it may be desirable to have two or more antennas that are oriented in different directions. For example, the flight data recorder module 104 may comprise an internal antenna 917 oriented parallel to a longitudinal axis of the body 806, which would be perpendicular to the external antenna 916 after the external antenna 916 has pivoted outward. Such a configuration may be desirable, for example, to increase a chance that at least one of the antennas has a desirable alignment with an antenna of a remote system, such as on a satellite, boat, other aircraft, and/or the like. In some embodiments, the external antenna 916, or even an internal antenna, may be configured to be dynamically movable by the system. For example, the system may be configured to dynamically move or rotate any of the antennas at any particular time to obtain a more efficient alignment with an external system's antenna.

In various embodiments, the ejectable module 104 is configured to be buoyant, so that the module 104 can float on the surface of a body of water after deployment. In some embodiments, this buoyancy is created by the housing 806 having a hollow cavity that enables the housing to be light enough to float relative to its overall volume. In some embodiments, the housing 806 is sealed to avoid intake of water into the cavity of the housing, which could reduce buoyancy of the ejected module 104.

Impact Energy Dissipation

Various embodiments of ejectable flight data recorder modules disclosed herein comprise one or more features that help to dissipate, absorb, and/or reduce impact loads imparted onto the module as a result of landing in the water or on the ground. For example, some embodiments disclosed herein comprise a rounded or tapered nosecone 808. In addition to providing aerodynamic benefits, such a rounded or tapered nosecone 808 can help to redirect or deflect some of the impact load if the ejectable flight data recorder module 104 hits the ground or water at any angle between vertical and horizontal. For example, if the ejected flight data recorder module 104 hits the water oriented at an approximately 45° angle, the rounded or tapered outer shape of the nosecone 808 can cause the ejected module to rotate and/or slide along the surface of the water, thus reducing or redirecting at least a portion of an impact load that would be otherwise imparted into the device if the device were to hit the water head-on at a flat surface of the ejectable module 104.

In some embodiments, the nosecone 808 further comprises one or more energy absorbing features that can be configured to further reduce an impact load imparted onto the components of the ejected flight data recorder module 104. FIGS. 10A and 10B illustrate one such embodiment. FIG. 10A illustrates an embodiment of a nosecone that comprises an energy absorbing structure 1004 positioned over or about a portion of the housing 806. The energy absorbing structure 1004 may alternatively be referred to as an impact absorbing structure, impact absorbing member, energy absorbing member, and/or the like. FIG. 10A is an exploded view, which also shows a cover 1006 that is configured to be positioned over the top of the energy absorbing structure 1004. FIG. 10B is a partial cross sectional view of the energy absorbing structure 1004 positioned over the housing 806.

The energy absorbing structure 1004 in this embodiment comprises a generally rounded, tapered, and/or conical structure that comprises a plurality of openings 1008 positioned to allow the energy absorbing structure 1004 to crush, crumple, deform, and/or the like in response to an impact of the energy absorbing structure 1004 with the ground or water. Such crushing, crumpling, deformation, and/or the like can be used to convert some of the impact load into plastic deformation of the energy absorbing structure 1004, and thus avoid imparting that impact load onto other components of the ejectable flight data recorder module 104, such as the internal components and/or the housing 806.

Some embodiments do not include the cover 1006 positioned over the energy absorbing structure 1004. However, in some embodiments, it can be desirable to include a generally smooth cover over the energy absorbing structure 1004, such as to increase the aerodynamic properties of the ejectable flight data recorder module. For example, as mentioned above, it can be desirable to design the ejectable flight data recorder module to have a generally predictable ejection path or ejection flight path after the module is ejected from the aircraft and is traveling away from the aircraft. Without such a generally predictable ejection flight path, the risk is greater that an ejected flight data recorder module will impact a portion of the aircraft, such as the vertical or horizontal stabilizers. By adding a smooth cover 1006 over the impact absorbing structure 1004, the ejectable flight data recorder module may have a smoother and/or more aerodynamic outer surface, and thus may have a more predictable and/or faster ejection flight path as the module is flying away from the aircraft.

In this embodiment, the impact absorbing structure 1004 comprises a plurality of openings 1008 positioned in a honeycomb type arrangement. Other embodiments may utilize other arrangements of openings and/or cavities in the impact absorbing structure, as long as they allow the impact absorbing structure 1004 to plastically deform in response to an impact with the ground or water, thus absorbing at least a portion of that impact load.

With reference to the cross-sectional view of FIG. 10B, in this embodiment, the energy absorbing structure 1004 comprises a proximal end 1010 and a distal end 1012. The proximal end 1010 is coupled to the housing 806. The distal end 1012, however, is not coupled to the housing 806. Rather, a void, cavity, or open-space 1014 is formed between the housing 806 and a portion of the impact absorbing structure 1004 that is distal to the proximal end 1010.

Having such a void, cavity, or open-space 1014 can be desirable, for example, to allow room for the impact absorbing structure 1004 to deform and absorb impact loads. Some embodiments may not include such a space 1014, however. Further, some embodiments may include such a space 1014, but may have the space 1014 at least partially filled with a compressible material, such as a foam or the like. Further, in some embodiments, the plurality of holes or voids 1008 may be filled with a compressible material, such as a foam or the like. Such a configuration may in some embodiments provide the benefits of a smooth cover 1006 without having a separate smooth cover 1006. Specifically, filling the holes or voids 1008 with a compressible material may enable the impact absorbing structure 1004 to have a more aerodynamic profile, while still allowing the energy absorbing structure 1004 to compress, crunch, crumple, deform, and/or the like upon impact with the ground or water.

The impact absorbing structure 1004 can comprise various materials in different embodiments. The impact absorbing structure 1004 desirably comprises a material that will plastically deform in response to an impact as opposed to breaking in a brittle manner. Although some energy may be absorbed by breaking in a brittle material, a greater amount of energy may be absorbed by deforming a plastically deformable material. For example, various embodiments of impact absorbing structures 1004 may comprise aluminum, titanium, other metals, a polymer, foam, and/or various other materials. In some embodiments, it can be desirable for the impact absorbing member 1004 to comprise a material that is less rigid than the material of the housing 806.

FIGS. 10C-10G illustrate an alternative embodiment of a housing 806 of an ejectable module 104 comprising impact absorbing structures 1004, 1005 at both the nose cone end 808 of the housing 806 (the right end as oriented in FIG. 10D) and a tail end 809 of the housing 806 (the left end as oriented in FIG. 10D). FIG. 10C illustrates a perspective view, FIG. 10D illustrates a side view, and FIG. 10E illustrates a side cross sectional view of the housing 806 having nose and tail or front and rear impact absorbing structures 1004, 1005. FIG. 10F illustrates a detail cross-sectional view of the tail or rear impact absorbing structure 1005. FIG. 10G illustrates a detail cross-sectional view of the nose or front impact absorbing structure 1004. One benefit to having impact absorbing structures at both the front and rear or nose and tail of the ejectable module 104 is that, it is possible an ejectable module may land on the ground or water in an orientation where the rear or tail end of the ejectable module 104 impacts the ground or water prior to the nose or front portion. In an embodiment where a parachute is attached to the rear of the housing, and the housing comprises a relatively aerodynamic shape, the likelihood of such an orientation upon impact is lessened. However, if a portion of the parachute system fails, or something else occurs, such as turbulent air that causes the ejectable module 104 to tumble end over end while falling, it is still possible that the rear end of the ejectable module 104 may impact the ground or water first. Further, in some embodiments, it may be desirable to not include a parachute system, and to allow the ejectable module 104 to descend in a freefall configuration, without a parachute system. In such a case, the likelihood may be increased that the tail end or rear end 809 of the ejectable module 104 impacts the ground or water before the front-end or nose cone 808. Accordingly, in any of these situations, it may be desirable to have impact absorbing properties available at the rear or tail end 809 of the ejectable module 104 in addition to or as an alternative to impact absorbing properties at the nose cone 808.

Although not shown in these drawings, it is also envisioned that other embodiments could comprise similar impact absorbing structures positioned anywhere on the housing 806, such as disposed about a central portion of the housing 806, potentially even encasing or surrounding the entire housing 806.

With reference to the detail cross-sectional view of the nose cone 808 shown in FIG. 10G, it can be seen that the nose cone 808 and impact absorbing material or structure 1004 is similar to the design illustrated in FIG. 10B. One difference, however, is that the impact absorbing structure 1004 illustrated in FIG. 10G is attached to or adjacent to the housing 806 along its entire length, instead of having a space or gap 1014 as illustrated in FIG. 10B. As discussed above, although a space or gap 1014 may have some advantages in some embodiments, it may also be desirable to not have such a space or gap 1014. Another difference shown in FIG. 10G is that the nose cone 808 of FIG. 10G comprises a threaded portion 1007 configured to allow the nose cone 808 to be separable from a main or central portion of the housing 806. This may, for example, be desirable to enable efficient assembly and/or maintenance of the ejectable module 104 and/or the internal components of the ejectable module 104 (not shown in these drawings). Although a threaded region 1007 is not shown in FIG. 10B, such a threaded region 1007 may be added to the embodiment illustrated in FIG. 10B.

As discussed above, it may be desirable for the thickness of the impact absorbing structure 1004 to vary or taper along its length. For example, in the embodiments illustrated in FIGS. 10B and 10G, the thickness of the impact absorbing structure 1004 may be, for example, approximately 0.2 inches at the proximal end 1010 and approximately 0.4 inches at the distal end 1012 (measured normal to the underlying housing 806 surface). Accordingly, in some embodiments, a ratio of the thickness of the impact absorbing structure 1004 at the distal end 1012 to the thickness at the proximal end 1010 is approximately two. In other embodiments, this ratio may be different, such as, for example, approximately, no greater than, or no less than 1, 1.5, 2, 2.5, 3, 3.5, 4, 4.5, or 5. In some embodiments, the thickness of the impact absorbing structure 1004 at the distal end 1012 may be different, such as, for example, approximately, no greater than, or no less than 0.2, 0.3, 0.4, 0.5, 0.6, 0.7, 0.8, 0.9, or 1.0 inches. In some embodiments, the thickness of the impact absorbing structure 1004 at the distal end 1012 may be within a range of 0.3-0.5 inches. In some embodiments, the thickness of the impact absorbing structure 1004 at the distal end 1012 may be within a range of 0.1-0.7 inches. Further, in some embodiments, the thickness of the impact absorbing structure 1004 at the proximal end 1010 may be different, such as, for example, approximately, no greater than, or no less than 0.1, 0.2, 0.3, 0.4, 0.5, 0.6, 0.7, 0.8, 0.9, or 1.0 inches. In some embodiments, the thickness of the impact absorbing structure 1004 at the proximal end 1010 may be within a range of 0.1-0.3 inches. In some embodiments, the thickness of the impact absorbing structure 1004 at the proximal end 1010 may be within a range of 0.1-0.7 inches. In embodiments that include a gap or space 1014 as illustrated in FIG. 10B, this gap or space 1014 may comprise a length, measured along a longitudinal axis of the nose cone 808 (e.g., normal to the surface of the nose cone 808 at the distal tip), of, for example, approximately, no greater than, or no less than 0.1, 0.2, 0.3, 0.4, 0.5, 0.6, 0.7, 0.8, 0.9, or 1.0 inches. In some embodiments, the longitudinal length of the gap 1014 may be smaller than the thickness of the impact absorbing structure 1004 at the distal end 1012. For example, a ratio of the longitudinal length of the gap 1014 to the thickness of the impact absorbing structure 1004 at the distal end 1012 may be, for example, approximately, no greater than, or no less than 0.1, 0.2, 0.3, 0.4, 0.5, 0.6, 0.7, 0.8, or 0.9. In some embodiments, the longitudinal length of the gap 1014 may be equal to the thickness of the impact absorbing structure 1004 at the distal end 1012. In some embodiments, the longitudinal length of the gap 1014 may be greater than the thickness of the impact absorbing structure 1004 at the distal end 1012. For example, a ratio of the longitudinal length of the gap 1014 to the thickness of the impact absorbing structure 1004 at the distal end 1012 may be, for example, approximately, no greater than, or no less than 1.1, 1.2, 1.3, 1.4, 1.5, 1.6, 1.7, 1.8, 1.9, or 2.0.

In some embodiments, the impact absorbing structure 1004 and/or 1005 of an ejectable module is designed to adequately absorb impacts of a falling ejectable module regardless of whether the ejectable module lands on the water or ground. In some embodiments, however, the impact absorbing structures may be designed to adequately absorb an impact of the ejected module impacting a body of water, but not necessarily impacting a ground surface. Such a design can have many benefits. For example, by designing impact absorbing structures to absorb impact forces associated with a water landing only, the impact absorbing structures can be smaller, thinner, lighter weight, and/or the like than if they were designed to absorb water impact loads and ground impact loads. This is because the impact load imparted on an ejectable module when landing in the water will likely be significantly less than if the ejectable module landed on the ground. Another benefit of designing for absorbing impact loads based on a water landing but not a ground landing is that other portions of the ejectable module can be smaller, lighter weight, thinner, and/or the like, too. For example, the housing 806 may be lighter, thinner, smaller, and/or the like. This can also allow the launching system to be smaller, lighter, less powerful, and/or the like, since the ejectable module is also smaller and lighter. Accordingly, there can be many benefits to designing an ejectable module as disclosed herein to have higher chances of surviving a water landing, but to have a lesser chance of surviving a ground landing. Such a design can be acceptable in some cases, because the most likely place where it is going to be difficult to find a crashed aircraft is if the aircraft crashes in a remote part of the ocean. Although a crash landing on ground may still present difficulties in locating an aircraft, many of the features of an ejectable module as disclosed herein may be less important in the event of a ground landing. For example, the aircraft may have its own radio transmitters that are configured to transmit GPS or other location data to a satellite or other device after the aircraft has crashed. If the aircraft crashes on the ground, such signals would not be blocked as they would if the aircraft has sunken into the ocean. Further, some embodiments of ejectable modules disclosed herein comprise an acoustic tracking system to track the sinking trajectory of an aircraft in the water. Such functionality would not be needed in the event of an aircraft crash on the ground.

With reference to the detail cross-sectional view shown in FIG. 10F, this embodiment also includes a rear or tail or back impact absorbing structure 1005. Similarly to the front impact absorbing structure 1004, the rear impact absorbing structure 1005 can comprise a compressible or plastically deformable material, which may be the same material used for the front impact absorbing structure 1004, or may be a different material. The rear impact absorbing structure 1005 similarly comprises a plurality of openings, holes, cutouts, voids, and/or the like 1008. Such features can help with the plastic deformation of the impact absorbing material. The rear impact absorbing structure 1005 comprises a proximal end 1010 and a distal end 1012, like the front impact absorbing structure 1004. At the radial outer portion 1015 of the impact absorbing structure 1005, it can be desirable for the thickness of the impact absorbing structure 1005 to taper or increase in thickness as it goes from the proximal end 1010 to the distal end 1012. Further, it can be desirable for the thickness of the impact absorbing structure 1005 to taper from a thinner thickness at a radial center point 1013 of the structure 1005 to a thicker thickness at the radial outer portion 1015 of the structure 1005. Such a design can lead to a protruding or increased thickness ring or protruding member 1017 extending around a circumference of the rear end 809 of the housing 806. This can be a desirable configuration in some embodiments, because if the rear end 809 of the housing 806 contacts the ground or water before the front-end, the circumferential edge of the rear end of the housing is likely to be the portion that contacts the ground or water first. Accordingly, it can be desirable for the thickness of the impact absorbing structure 1005 to be greatest in that area. Further, by having the thickness of the impact absorbing structure 1005 taper down to a thinner thickness away from the corner protruding member or ring 1017, this can help to provide an area for that raised material to plastically deform into upon impact. Further, weight of the material can be reduced by having the material be thinner in other areas.

Various dimensions or thicknesses of the impact absorbing structure 1005 may be used. In this embodiment, at the protruding ring 1017, a thickness of the impact absorbing structure 1005 measured in a radial direction from the radially outermost edge of the housing 806 to the radially outermost edge of the impact absorbing structure 1005 is approximately 0.2 inches. Further, a longitudinal length measured from the rearmost edge of the housing 806 (the leftmost edge as oriented in FIG. 10F) to the rearmost edge of the impact absorbing structure 1005 is approximately 0.2 inches. By having both of these dimensions be similar or the same, the configuration of the impact absorbing structure 1005 can be configured to have its most impact absorbing properties when the ejectable module lands with its longitudinal axis oriented at an angle of approximately 45° to the ground or water. In some embodiments, these dimensions may be different from one another, such as to design for different anticipated angles of impact. Further, the actual amount that the impact absorbing structure extends from the housing 806 in either the radial direction or longitudinal direction may be different than 0.2 inches in some embodiments. For example, in some embodiments, either of those two dimensions may be approximately, exactly, no greater than, or no less than 0.1, 0.2, 0.3, 0.4, 0.5, 0.6, 0.7, 0.8, 0.9, or 1.0 inches. In some embodiments, either of these dimensions can be within a range of 0.1-0.3 inches. In some embodiments, either of these dimensions can be within a range of 0.1-0.5 inches.

Various embodiments disclosed herein may comprise various other impact absorbing technologies in addition to or in lieu of impact absorbing structures on the nose or tail of the ejectable module. For example, in some embodiments, one or more of the internal components located in the cavity of the housing (e.g., the components shown in FIG. 8C) may be encased in an impact absorbing material (e.g., foam, rubber, potting compound, polymer, and/or the like) that helps to lessen the transmission of an impact load or shock from outside of the housing to the components inside the housing. Further, the exterior shape of the impact absorbing structures at the nose cone, tail section, or anywhere else on the housing may be different shapes. For example, although embodiments herein illustrate an impact absorbing structure 1004 at a nose cone that comprises a generally tapered shape, some embodiments may comprise a flat shape, rounded shape, cylindrical shape, and/or the like. Further, although some embodiments herein illustrate an impact absorbing structure 1005 at a tail section that comprises a thinner central region 1013 and a thicker radially outer region 1015, some embodiments may comprise a shape that comprises a consistent thickness throughout, that extends further in a longitudinal direction along an outer surface of the housing 806 (i.e. toward the nose section), that is tapered in shape similar to the shape of the nose cone impact absorbing structure 1004, and/or the like. In some embodiments, the ejectable module comprises one or more fins configured to help stabilize a descent of the ejectable module after ejection (similar to fins used on rockets, missiles, and the like). In some embodiments, such fins can help to increase a likelihood that the nose impacts the water or ground before the tail. In some embodiments, the fins are configured to be deployed after launching, so that the launching tube (such as launching tube 106) can be cylindrical and does not need to be configured to accommodate the fins.

Aircraft Sinking Path Detection

Some embodiments of ejectable flight data recorder systems disclosed herein comprise functionality that enables the ejected flight data recorder module to track a sinking trajectory of an aircraft after the aircraft has crashed in a body of water. Such a system can be desirable, because it can be extremely difficult for searchers to locate an aircraft that has sunken to the ocean floor, particularly in very deep portions of the ocean. Further, even if searchers are able to approximate an entry point into the water, or a point of impact of the aircraft with the surface of the water, that point of impact could be tens or hundreds of miles from the final resting place of the aircraft when it reaches the ocean floor. Without a good estimate of the sinking path or trajectory that the aircraft follows as it is sinking to the ocean floor, the search radius or the area required to be searched around the estimated point of impact can be enormous, and could take months or years to exhaustively search.

Various embodiments disclosed herein solve this problem by, among other things, enabling the ejectable module to track a sinking trajectory of the aircraft as the aircraft is sinking in the water. By knowing the sinking trajectory of the aircraft in the water, searchers may be able to restrict their search area or radius to a much smaller area that can be searched much more quickly. In some embodiments, the ejectable flight data recorder module comprises an acoustic tracking system, such as the acoustic tracking system 242 of FIG. 2. Such a system can be configured to deploy one or more hydrophones or other acoustic-based sensors and/or devices, such as sonar, that can detect audio signals from the sinking aircraft, such as from an underwater locator beacon of the aircraft. Although embodiments disclosed herein are discussed with reference to an acoustic tracking system, similar techniques could be used with other sinking trajectory tracking systems, such as systems that use optics, radio waves, or the like. It can be desirable to use an acoustic-based system, however, because soundwaves can tend to travel further through water and/or travel through water with less distortion.

In some embodiments, an acoustic tracking system can be configured to cooperate with the radio and antenna of the ejected flight data recorder module in order to transmit, either in real-time or with a delay, data to an external system that can help searchers determine the sinking trajectory of the aircraft.

Figure 11A:
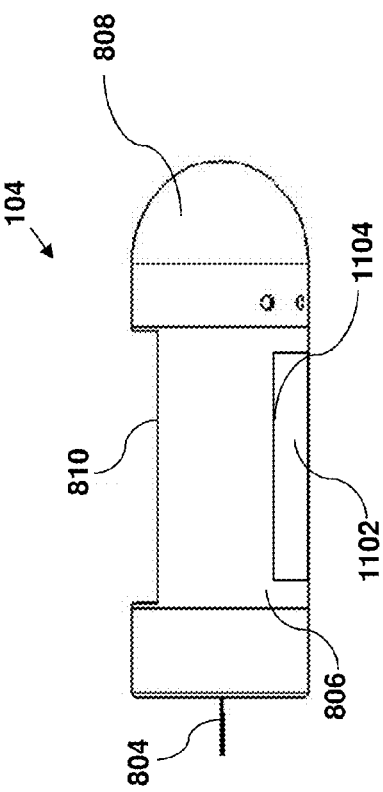
Figure 11B:
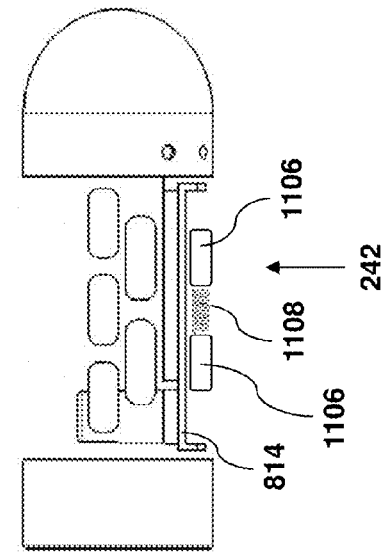

FIGS. 11A-11E illustrate an embodiment of an ejectable flight data recorder module 104 that comprises an acoustic tracking system 242. This embodiment is similar to the embodiment illustrated in FIGS. 8A-8E, with the addition of the acoustic tracking system 242. FIG. 11A shows a side view of the ejectable module 104, and FIG. 11B shows a side view with a portion of the housing 806 removed so that internal components of the ejectable module 104 can be seen. The housing 806 desirably incorporates one or more hinged doors 1102 that are hinged along an edge, such as edge 1104. The doors 1102 are configured to conceal a cavity having portions of the acoustic tracking system positioned therein. In this embodiment, with reference to FIG. 11B, the acoustic tracking system 242 comprises two sensors 1106, such as hydrophones, and a sensor separation device 1108 coupled to the sensors 1106. The sensors 1106 and sensor separation device 1108 are positioned within the cavity concealed by the doors 1102.

FIGS. 11C-11E illustrates a deployment sequence of the acoustic tracking system. In FIG. 11C, the hinged doors 1102 have opened by rotating outwardly along edge 1104. The system may be configured to, for example, detect a water landing, such as by a water sensor of the ejectable module 104 detecting the presence of water, and the system may be configured to automatically open the doors 1102 to begin the acoustic tracking system deployment process. In some embodiments, the cavity within which the acoustic sensors and sensor separation device are stored is sealed from the main cavity of the housing, such as to avoid water entering the main cavity and causing the ejectable module 104 to lose buoyancy.

With reference to FIG. 11D, the next step in the deployment process is that the sensors 1106 begin descending from the housing 806 of the ejectable module 104. As the sensors 1106 descend in the water from the housing 806, they may remain tethered to the housing 806 via tethers or cables 1107. In some embodiments, these tethers or cables 1107 may also enable the sensors 1106 to transmit data back to the floating ejectable module 104. In some embodiments, however, the sensors 1106 are configured to wirelessly transmit data back to the floating ejectable module 104. In some embodiments, the tethers or cables 1107 are approximately 10 feet long. In other embodiments, the tethers or cables 1107 may comprise a different length, such as, for example, approximately, no less than, or no greater than five, 15, 20, 25, 30, 40, or 50 feet.

The sensor separation device 1108 is configured to separate the acoustic sensors 1106 from one another after being deployed from the housing 806 of the ejectable module 104. This can be seen in FIG. 11E, where the acoustic sensors 1106 are extended away from the housing 806 and away from one another. The sensor separation device 1108 may take various forms. In this embodiment, the separation device 1108 is depicted as a spring that is compressed before deployment of the sensors, and extends after deployment to separate the sensors 1106 from one another. In some embodiments, other methods of separating the acoustic sensors 1106 may be used, such as telescoping rods, the tethers 1107 being rigid and having a rotational spring acting on them to separate the tethers 1107, and/or the like. It can be desirable to separate the sensors 1106, because the greater the separation between the sensors 1106, the more accurately a transmission source of a detected sound can be estimated. However, any amount of separation of the sensors can be helpful, even if the separation is not enough to enable a highly accurate position estimate of the sinking aircraft. Even a relatively rough estimate of the position of the aircraft as it sinks in the water can have a relatively large effect on the size of the search area.

With reference to FIG. 11E, as shown by the arrow in FIG. 11E, in some embodiments, the acoustic tracking system 11E may be configured to cause the acoustic sensors 1106 to rotate about a vertical axis and/or may be configured to track an orientation of the sensors 1106 about the vertical axis. This can be desirable, because without knowing an orientation of the sensors 1106, either directly or indirectly, the system may still be able to estimate a distance of the aircraft from the acoustic tracking system, but may not be able to estimate a heading at which the sinking aircraft is located from the acoustic tracking system. Accordingly, it can be desirable to know, either directly or indirectly, a current orientation of the tracking array or sensor array comprising the two or more acoustic sensors 1106. For example, in some embodiments, the system is configured to directly detect an orientation of the acoustic sensors 1106 by, for example, receiving data from a digital compass located in or coupled to one or more of the acoustic sensors 1106, one or more of the tethers 1107, and/or the sensor separation device 1108. Another method of directly detecting the orientation of the sensor array is by tracking an orientation of the tethers 1107 with respect to the housing 806. Another method of directly detecting the orientation of the sensor array is by the housing of the floating ejectable system comprising one or more cameras that can optically detect a position of the sensors 1106 with respect to the housing 806.

Alternatively, or additionally, in some embodiments, the system may be configured to indirectly track or at least estimate a current orientation of the acoustic sensors 1106. For example, the system may be configured such that the acoustic sensors 1106 are deployed from the housing 806 and tend to remain in a predetermined relative position with respect to the housing 806. For example, the tethers 1107 and/or sensor separation device or system 1108 may be configured to not be rotatable about the vertical axis with respect to the housing 806, or to be rotatable with respect to the housing 806 about the vertical axis within only a limited range. In such an embodiment, the acoustic tracking system may be able to indirectly estimate a current orientation of the acoustic sensors 1106 by detecting a current orientation of the housing 806, such as by using a digital compass, GPS sensor, and/or the like coupled to the housing 806.

In some embodiments, the system is configured to actively change the orientation of the acoustic sensors 1106 about the vertical axis. For example, the acoustic tracking system may comprise an actuator that causes rotation of the tethers 1107 and/or sensor separation device 1108 about the vertical axis with respect to the housing 806. As another example, the housing 806 may comprise or be coupled to a propulsion module comprising a propeller, compressed gas, or other mechanism that can cause rotation of the housing 806 about the vertical axis with respect to the water the housing 806 is currently floating in. As another example, the acoustic sensors 1106, tethers 1107, and/or sensor separation device 1108 may comprise or be coupled to a propulsion module comprising a propeller, compressed gas, or other mechanism that can be actuated to cause the sensors 1106 to rotate about the vertical axis. Such functionality can be desirable, for example, to enable the sensor array to be positioned in an orientation that can more accurately track the sinking trajectory of the aircraft.

In some embodiments, the system is configured to cause rotation of the acoustic sensors 1106 about the vertical axis, using any of the above methods, until the system detects a signal from the sinking aircraft and is able to estimate a heading of the aircraft from the acoustic tracking system. The system can then be configured to orient the acoustic sensors in an orientation that can most efficiently track the sinking aircraft, such as an orientation where a line drawn between the two sensors 1106 is perpendicular to a line between the vertical axis and the current position of the aircraft. In some embodiments, the system can be configured to then dynamically make adjustments to the orientation of the sensors 1106 as needed to continue tracking the aircraft as it sinks. As mentioned above with reference to the separation distance between the acoustic sensors, functionality related to the orientation of the sensors 1106 about the vertical axis can be helpful to more accurately track the sinking trajectory of the aircraft. Such functionality is not required, however, and even a less accurate estimate of the sinking trajectory of the aircraft can have a significant effect on the required search radius or search area. Further, even in a system where the floating ejectable module 104 is not configured to actively control a rotational position of the acoustic sensors 1106, the waves or currents of the body of water the ejectable module 104 is floating in will likely cause the acoustic sensors 1106 to experience at least some rotation about the vertical axis, which can enable the acoustic sensors 1106 to be at least passively reoriented into various headings.

In some embodiments, the acoustic tracking system comprises only one acoustic sensor 1106. For example, the system may comprise a single acoustic sensor 1106 that is configured to be omnidirectional, and the system may be configured to track a distance of the sinking aircraft from the acoustic sensor, but not necessarily a heading. In some embodiments, the system may comprise a single acoustic sensor 1106 that is configured to be directional, thus enabling distance and heading estimation. Having more than one sensor 1106 may be desirable, however, particularly if the sensors have some separation between them. Further, in some embodiments, the system comprises more than two sensors 1106, such as three, four, five, six, seven, eight, nine, 10, or more. The various sensors can be configured to be deployed in various shapes of arrays. For example, in some embodiments, the system may comprise four acoustic sensors 1106 and a separation device or system 1108 that is configured to deploy the four acoustic sensors generally equally spaced about a 360° circle. Such an embodiment may be desirable, for example, because there would never be an instance where a line drawn from the sensor array to the sinking aircraft is collinear with a line drawn between all of the sensors, as could be possible in a system having all of the sensors in a collinear arrangement. Rather, in a system comprising four sensors 1106 that are equally spaced about a 360° circle, if a line drawn between two opposite sensors is collinear with a line drawn between a center of the sensor array and the sinking aircraft, then the other two sensors will be in an ideal arrangement, specifically a line drawn between those two sensors being perpendicular to a line drawn from the aircraft to a center of the sensor array.

Figure 12:
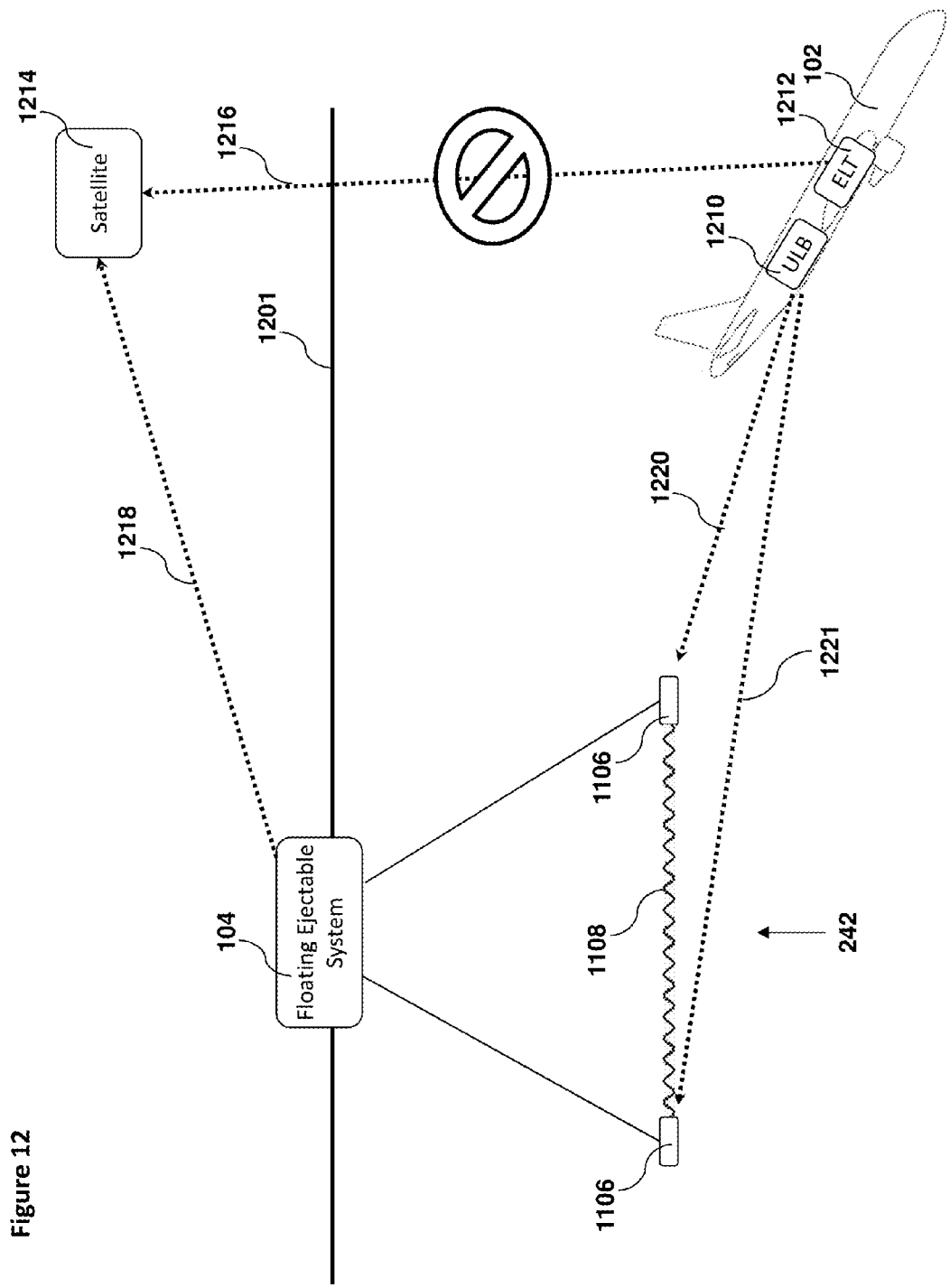
FIG. 12 illustrates a schematic diagram of an ejectable module comprising an acoustic search system being used to track a sinking aircraft.

FIG. 12 illustrates a schematic diagram of a floating ejectable module 104 operating an acoustic tracking system 242 to track a sinking aircraft 102. In this embodiment, the sinking aircraft 102 comprises an underwater locator beacon 1210 and an electronic locator transmitter 1212. The underwater locator beacon 1210 is configured to transmit sound waves or audio signals, and the electronic locator transmitter 1212 is configured to transmit radio waves. As can be seen in FIG. 12, because the aircraft has sunk sufficiently in the water, the electronic locator transmitter 1212 is incapable of transmitting radio signals via signal path 1216 to a satellite 1214 (or other remote system, such as an aircraft, boat, buoy, or even the floating ejectable module 104). Since sound waves can travel further in water than radio waves, however, the underwater locator beacon 1210 is able to transmit sound waves to the underwater acoustic sensors 1106 via signal paths 1220 and 1221. The floating ejectable module 104 can then analyze this received data to estimate a current location and/or sinking trajectory of the aircraft 102. Since the floating ejectable module 104 is above the water, or at least comprises one or more antennas positioned above a waterline 1201, the floating ejectable module 104 can be configured to then transmit this data via radio signal path 1218 to the satellite 1214 (or other remote system, such as an aircraft, boat, buoy, and/or the like).

In some embodiments, instead of the floating ejectable module 104 calculating a sinking trajectory of the aircraft 102, the floating ejectable module 104 may be configured to store data received from the acoustic sensors 1106 and/or transmit data received from the acoustic sensors 1106 to a remote system, and the remote system may be configured to do the actual analysis of that data to determine an estimated location and/or sinking trajectory of the aircraft. Further, in some embodiments, the floating ejectable module 104 may be configured to store locally on its nonvolatile memory the data received from the acoustic sensors 1106 and/or a calculated position and/or sinking trajectory of the aircraft 102.

Robust and Safe Deployment System

As discussed above, various embodiments of ejectable flight data recorder systems disclosed herein are designed to make it less likely that an ejectable module will be ejected at a time when it would be more likely to cause harm to people outside the aircraft and/or at a time when recovery or locating of the crashed aircraft might be relatively easy. Further, various embodiments of ejectable flight data recorder systems disclosed herein are configured to analyze data from various sensors and/or an aircraft data bus to determine, among other things, when an emergency situation is potentially occurring, what type of situation is occurring, and whether and when to cause ejection of the ejectable module based on those conditions.

For example, in a situation where an immediate loss of the aircraft is likely, such as in the event of an explosion, the system may be configured to detect this event and cause ejection of the ejectable module without delay, or with relatively minimal delay, in order to increase the likelihood that the ejectable module is not destroyed by the explosion. In such a case, particularly when the aircraft is at a relatively high altitude, such as a cruising altitude, the ejectable module may end up landing a relatively far distance from the aircraft wreckage. This may be more desirable, however, than the alternative, which may be that ejection is delayed and the ejectable module gets destroyed along with the rest of the aircraft.

As another example, in some emergency situations, the ejectable flight data recorder system may be able to detect a potential emergency situation is occurring well before harm to the aircraft and/or ejectable flight data recorder system will occur. For example, if flight control is lost while the aircraft is cruising, such as all engines of the aircraft ceasing to operate and/or the pilot losing the ability to control flight surfaces, this may be an emergency situation that is likely to lead to a crash, but that may last several minutes before the aircraft actually crashes. In such a case, it may be desirable to ensure that the ejectable module is ejected prior to the crash, but to delay its ejection until just before the crash. One benefit, among others, of waiting until just before the crash is that the ejected module will likely end up landing relatively close to the aircraft crash site. If searchers are able to locate the ejected module, that may help to narrow the search area required to find the actual aircraft wreckage. Further, in embodiments that comprise an acoustic tracking system that can track the sinking trajectory of the aircraft, causing the ejectable module to land relatively close to the aircraft wreckage may increase the accuracy of its acoustic tracking system.

Figure 13:
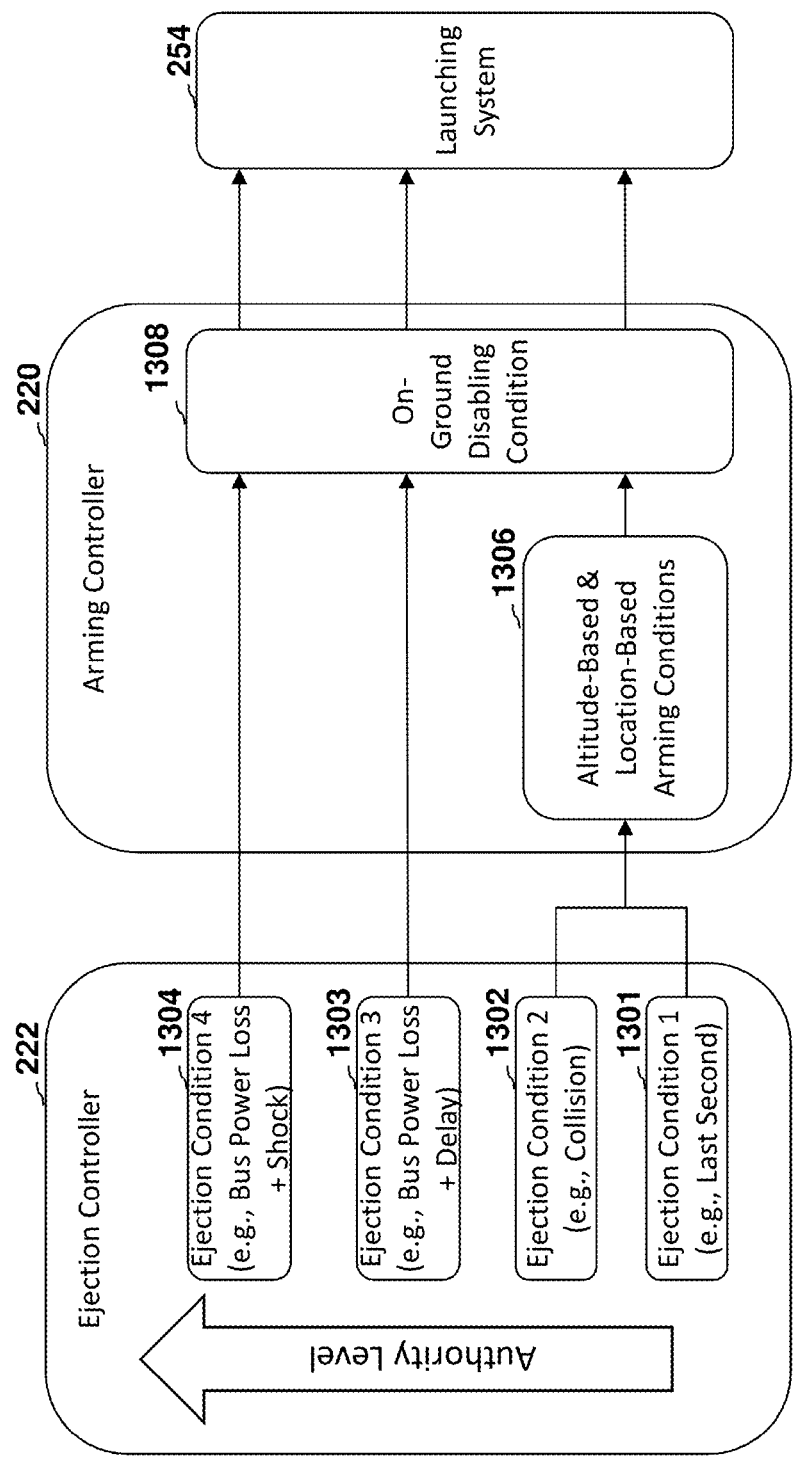
FIG. 13 illustrates a block diagram of an embodiment of an arming controller, ejection controller, and launching system of an ejectable flight data recorder system.

FIG. 13 is a block diagram of a portion of an embodiment of an ejectable flight data recorder system. The block diagram of FIG. 13 comprises an ejection controller 222, an arming controller 220, and a launching system 254. These three components may, for example, be the ejection controller 222, arming controller 220, and launching system 254 illustrated in FIG. 2, discussed above. FIG. 13 illustrates additional details of example embodiments of the ejection controller 222 and arming controller 220, however.

The ejection controller 222 can be configured to analyze data received from one or more sensors and/or an aircraft data bus to determine whether one or more ejection conditions has occurred or is occurring. In some embodiments, this analysis may be referred to as the ejection controller 222 implementing ejection logic. FIG. 13 illustrates four example ejection conditions, but other embodiments may comprise less ejection conditions, more ejection conditions, or any other combination of ejection conditions. The example ejection conditions illustrated in FIG. 13 are ejection condition one, labeled box 1301, ejection condition two, labeled box 1302, ejection condition three, labeled box 1303, and ejection condition four, labeled box 1304. Ejection condition one may be, for example, a determination that the aircraft is descending and is likely to crash into the ground or a body of water. For example, the ejection controller 222 may be configured to analyze altitude data, airspeed data, geographic position data, topographical map data related to a present geographic area, and/or the like, to calculate or estimate a remaining time to impact with the ground or body of water. The ejection controller 222 can be configured to then cause the launching system 254 to eject the ejectable module shortly before the anticipated impact with the ground or body of water. The amount of time before the anticipated impact that the system is configured to cause ejection of the ejectable module can be configured to take into account, for example, the amount of time it takes for the launching system 254 to launch the ejectable module after receiving an ejection command, an additional buffer of time that compensates for potential inaccuracies in the altitude, airspeed, geographic position, and/or topographical map data, and/or the like. In some embodiments, the ejection controller 222 is configured to cause launching of the ejectable module or system no more than five seconds before the system anticipates the aircraft will crash into the ground or water. In other embodiments, this time may be different. For example, in some embodiments, the ejection controller 222 is configured to cause launching of the ejectable module or system no more than one, two, three, four, six, seven, eight, nine, 10, 15, 20, 25, or 30 seconds before the system anticipates the aircraft will crash into the ground or water.

In some embodiments, the amount of time before an estimated time of impact that the system is configured to launch the ejectable module is different depending on whether the aircraft is crashing into the water or onto the ground. In some embodiments, the ejectable module is configured to be ejected sooner when the aircraft is crashing onto the ground than if it were crashing into the water. This may be desirable for a variety of reasons. For example, when the aircraft is crashing to the ground, instead of into a body of water, it can be more difficult to know at exactly what altitude the aircraft will impact the ground. For example, when crashing into a mountainous region, a slight change in the current trajectory of the descending aircraft could have a relatively large impact on the time to impact and/or the altitude at which the aircraft impacts the ground. Accordingly, it can be desirable to have a larger safety buffer of time to make sure the ejectable module is ejected prior to the aircraft crashing. As another example, when an aircraft is crashing onto the ground instead of into a body of water, it may be more likely that the aircraft will be found more easily than if the aircraft had crashed in a deep remote portion of an ocean. For example, the aircraft crash site may be observable in satellite imagery, the crashed aircraft itself may be able to send out a distress signal to a satellite or other device, and/or the like. Further, the tracking of a sinking trajectory of the aircraft is not needed when the aircraft crashes on the ground. Accordingly, although it can still be helpful to have the ejectable module land relatively close to the impact site of the aircraft, it may be less important that the ejectable module land near to where the aircraft impacts than if the aircraft were landing in water.

With continued reference to FIG. 13, example ejection condition two may comprise, for example, the ejection controller 222 detecting that a collision has occurred. For example, the ejection controller 222 may be configured to analyze data from one or more sensors, the aircraft data bus, and/or the like and determine that a collision has occurred. The system may be configured to determine that a collision has occurred based on, for example, data received from a dedicated collision sensor, acceleration data received from an accelerometer, and/or the like. In some embodiments, the ejection controller 222 may be configured to automatically attempt to initiate launching of the ejectable module or ejectable system in response to detection of a collision. In some embodiments, however, the ejection controller 222 may be configured to conduct additional analysis to determine or estimate, for example, a severity of the collision, a likelihood that the collision will result in a catastrophic loss of the aircraft, and/or the like before causing the launching system 254 to eject to the ejectable system.

Example ejection conditions three and four shown in FIG. 13 are both related to detection of an explosion of or onboard the aircraft and/or an extensive fire. One difficulty with responding to an explosion on an aircraft is that the explosion occurs rapidly, and delay in causing ejection of an ejectable flight data recorder module could lead to the ejectable module being destroyed in the explosion along with the rest of the aircraft. Blocks 1303 and 1304 illustrate two potential ways of dealing with such a situation. For example, ejection condition four comprises the ejection controller 222 determining that bus power has been lost, which will likely occur in the event of an explosion, and also determining that a shock load typical of an explosion has occurred. For example, the ejection controller 222 may be configured to monitor the bus power of the aircraft and to monitor one or more shock sensors, collision sensors, accelerometers, and/or the like. If the ejection controller 222 detects both loss of bus power and a shock load, the system may be configured to determine that an explosion has likely occurred, and rapidly cause the launching system 254 to eject the ejectable module.

In a case where the aircraft bus power is lost, but a shock load is not detected by the ejection controller 222, the system may be configured to delay a predetermined amount of time before causing the ejectable module to deploy. This may be desirable, for example, because there could be situations where there is a glitch in the system and bus power is temporarily lost. If the bus power is restored within the predetermined amount of time, this makes it more likely an explosion has not occurred, and the ejection controller 222 may be configured to not cause launching of the ejectable module. If the predetermined amount of time passes, however, and bus power has still not returned, this may make it more likely that an explosion or other catastrophic event, such as an extensive fire, has occurred, and the ejection controller 222 may be configured to cause the launching system 254 to launch the ejectable module. In some embodiments, if the ejection controller 222 is still capable of receiving sufficient data to determine or estimate when the aircraft will crash, the ejection controller 222 may revert to operating under ejection condition one shown at block 1301, meaning the system may estimate the time to impact and delay causing ejection of the ejectable module until just before the crash.

With further reference to FIG. 13, the arming controller 220 is configured to analyze data from various sensors and/or the aircraft data bus to set an arming state of the ejectable flight data recorder system. In some embodiments, this analysis may be referred to as the arming controller 220 implementing arming logic. One benefit of the arming controller 220 is that the launching system 254 can be disarmed or prevented from ejecting the ejectable system in situations where such ejection might be more likely to cause harm to people or property and/or when it is less likely that the aircraft would be difficult to find in the event of a crash. For example, block 1308 illustrates an on-ground disabling condition. With this condition, the arming controller 220 is configured to analyze data to detect that the aircraft is on the ground, sometimes referred to as weight-on-wheels. In this situation, the arming controller 220 can be configured to disable the system such that any detection of an ejection condition by the ejection controller 222 does not cause ejection of the ejectable module. For example, the arming controller 222 can be configured to cause the relief valve 150 to open. This is for at least a couple reasons. First, if the aircraft is on the ground, this is the time of greatest risk that a person may be present near the ejection location of the ejectable system, and thus that person could be harmed by the ejection of the ejectable system. Second, if the aircraft is on the ground, it is unlikely that a prolonged or difficult search would be required to locate the aircraft in the event of an emergency.

The arming controller 220 further comprises block 1306, which comprises functionality for the arming controller 220 to selectively and dynamically arm or disarm the launching system 254 based on a present location of the aircraft. In some embodiments, the arming controller 220 is configured to dynamically arm or disarm the system based on altitude data, geographic location data, a distance of the aircraft from a landmark, such as a city, populated area, terrain feature, and/or the like. For example, the arming controller 220 may be configured to analyze geographic location data, such as generated by a GPS sensor, and compare that to map or other data that allows the arming controller 220 to determine if the aircraft is within a predetermined distance of a landmark. If the Arming controller 220 determines the aircraft is within the predetermined distance from the landmark, the arming controller 220 may be configured to automatically or dynamically disarm the system. As one example of this, the landmark may comprise a city or other populated area, and the arming controller 220 may be configured to disarm the launching system 254 when the arming controller 220 detects the aircraft is within 100 miles of the landmark. This can be desirable for at least a couple reasons. First, if the aircraft is near a city or other populated area, the risk is higher that a person or property may be damaged by a descending ejectable module. Second, if the aircraft is near a city or other populated area the aircraft will likely be much easier to find after a crash than if the aircraft were further away from a populated area.

As another example of location-based arming that can be implemented by the arming controller 220, the arming controller 220 may be configured to analyze altitude data and dynamically or automatically arm and disarm the launching system 254 based on a present altitude of the aircraft. For example, the arming controller 220 may be configured to dynamically disarm the launching system 254 once an aircraft has taken off and reached a predetermined lower threshold altitude. This predetermined lower threshold altitude may be, for example, set at a level where it is less likely that an aircraft will have time to recover from an emergency situation when an emergency situation occurs. For example, in some embodiments, the predetermined lower threshold altitude may be 6000 feet. In other embodiments, the predetermined lower threshold altitude may be lower or higher, such as, for example, no greater than 1000, 2000, 3000, 4000, 5000, 7000, 8000, 9000, or 10,000 feet.

Further, in some embodiments, the arming controller 220 may comprise an upper threshold altitude above which the arming controller 220 is configured to rearm the launching system 254. For example, the predetermined upper threshold altitude may be equal to the designed service ceiling of the present aircraft. This may be desirable, for example, because the aircraft exceeding its designed service ceiling may be an indicator that something is wrong and an emergency may be occurring. In some embodiments, the predetermined upper threshold level is not set at exactly the service ceiling of the aircraft, but rather is set relatively close to the service ceiling, such as within 500, 1000, 1500, 2000, or 2500 feet of the service ceiling.

In some embodiments, the arming controller 220 is configured to simultaneously take into account altitude data and geographic location data in determining when to arm or disarm the launching system 254. For example, in some embodiments, if the system is configured to disarm the launching system within 100 miles of a center of a city, and between 6000 feet and the service ceiling of the aircraft, then a disarmed region may be created that is cylindrical in shape, centered at the city center, and extending above the city from 6000 feet to the service ceiling of the aircraft. In some embodiments, however, the geographic position-based disarming may be independent of the altitude-based arming, and may trump or override the altitude-based arming. For example, the system may be configured to be armed above the service ceiling of the aircraft, but then be disarmed when the aircraft enters the cylindrical region above the city, even if the aircraft is still above the service ceiling.

As discussed above, although utilizing an arming controller 220 to dynamically disarm the launching system 254 when certain conditions are present may be desirable, there may be situations where it is more desirable to cause ejection of the ejectable module anyway, regardless of, for example, the current altitude or geographic position of the aircraft. For example, in the event of an explosion, ejecting the ejectable flight data recorder module may be deemed more important than a relatively small risk that someone on the ground be hit by the ejected module. One reason for this is that, if the aircraft is exploding, then components of the aircraft are likely going to come crashing to the ground anyway, and ejecting the ejectable module may not increase the risk of harm to people on the ground much more than the risk already is from those people getting hit by pieces of the aircraft.

To address such a situation, the ejection controller 222 may be configured to bypass at least some of the arming or disarming conditions of the arming controller 220 in response to detection of at least some ejection conditions. As shown in FIG. 13, ejection conditions three and four are configured to bypass the altitude-based and location-based arming conditions of the arming controller 220, but still obey the on ground disabling condition. Accordingly, if ejection conditions three or four occur, which correspond to the ejection controller 222 detecting an explosion, the ejection controller 222 may be configured to cause the launching system 254 to eject the ejectable module, regardless of the aircraft's present position, unless the aircraft is presently on the ground. In some embodiments, at least some ejection conditions may be configured to bypass all disarming mechanisms, including the on-ground disabling condition 1308.

As shown in FIG. 13, the functionality where some ejection conditions are configured to ignore some arming conditions set by the arming controller 220 can be referred to as different ejection conditions having different authority levels. As shown in FIG. 13, the ejection conditions near the bottom of block 222 have a lower authority level than the ejection conditions near the top of block 222. Accordingly, ejection conditions one and two, having a lower level of authority, are configured to obey the altitude-based and location-based arming conditions of the arming controller 220. Ejection conditions three and four, corresponding to a higher level of authority, however, are configured to not obey the altitude-based and location-based arming conditions of the arming controller 220.

Arming Examples

Figure 14A:
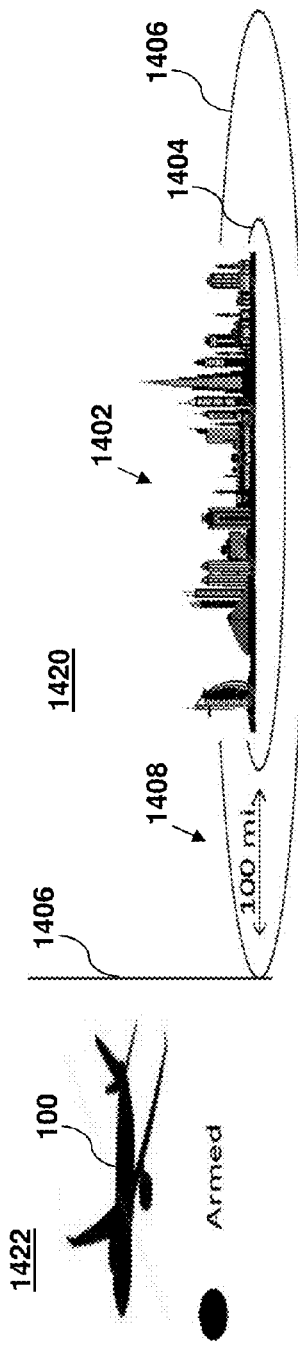
FIGS. 14A-14C illustrate schematic diagrams of locations where an embodiment of an ejectable flight data recorder system may be automatically armed or disarmed based on an aircraft's location.

FIGS. 14A-14C and 15 illustrate examples of how an aircraft 100 may have its ejectable flight data recorder system dynamically armed or disarmed based on a location of the aircraft. FIG. 14A illustrates an example of arming or disarming the system dynamically based on a distance from a landmark 1402 that comprises a city or other populated area. In this embodiment, the city 1402 comprises a border 1404. The border 1404 may be an actual border of the city as defined in property records, or may be defined otherwise as, for example, a circular line that encompasses the city, a circle of a particular diameter, or any other shape of border intended to have the city 1402 position therein. An outer limit 1406 defines a disarmed region 1420. In this embodiment, the outer limit 1406 is a generally circular border that is positioned distance 1408 (in this case 100 miles) away from the city border 1404. Accordingly, the disarmed region generated based on this landmark or city 1402 will encompass the landmark itself 1402, and extend 360° about the landmark 1402 outward 100 miles in each direction from the border 1404. In some embodiments, distance 1408 is measured from a center of the landmark, instead of a border of the landmark. In some embodiments, there may be an upper limit or ceiling to this disarmed area 1406. For example, the disarmed area 1406 may comprise a cylinder that extends upward from the center of the landmark 1402 to an upper limit of 6000 feet, or any other altitude. In some embodiments, the upper limit is not flat and may be dome-shaped, pyramid shaped, or the like. The border 1406 of the disarmed region in this embodiment creates disarmed region 1420 and armed region 1422. The system can be configured to automatically and dynamically arm or disarm the ejectable flight data recorder system based on which area of the aircraft is presently in.

Figure 14B:
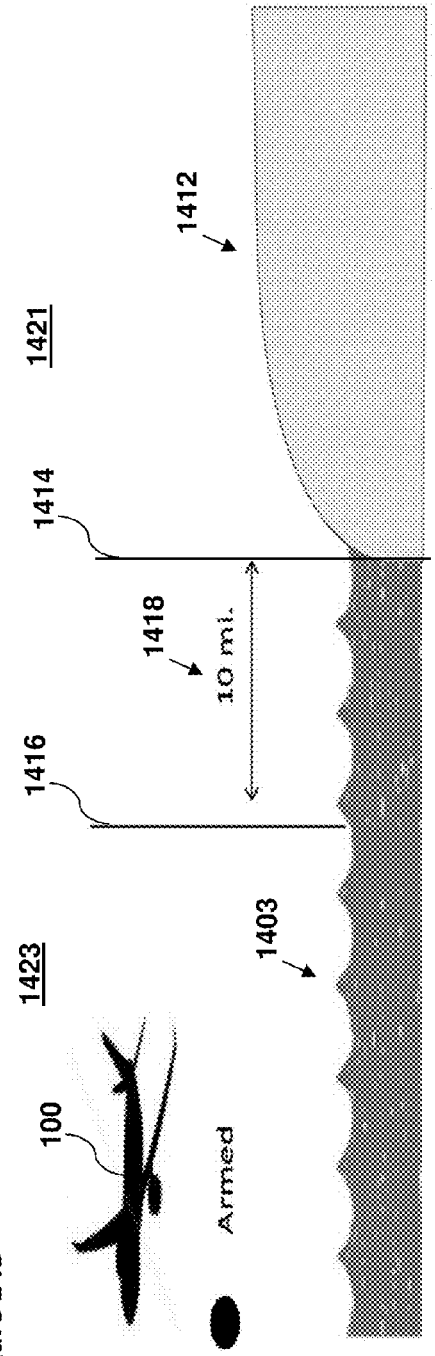

FIG. 14B illustrates another example of how the system may be configured to automatically and dynamically arm or disarm the system based on a geographic position. This diagram illustrates an aircraft 100 flying over a body of water 1403 that is adjacent to a land portion 1412 having a coastline 1414. The coastline 1414 is defined as a line along which the water 1403 meets the land 1412. In some embodiments, the system may be configured to approximate this coastline 1414. In this embodiment, the system is configured to position a border 1416 between disarmed region 1421 and armed region 1423 a distance 1418 (in this case 10 miles) from the coastline 1414. In some embodiments, it may be desirable for distance 1418 from a coastline 1414 to be less than distance 1408 from a city or populated area 1402 as shown in FIG. 14A. This may be desirable, because as you get further into a body of water from a coastline, the amount of people present in that area will likely decrease much more rapidly than as you get further away from a city or populated area over the ground.

Figure 14C:
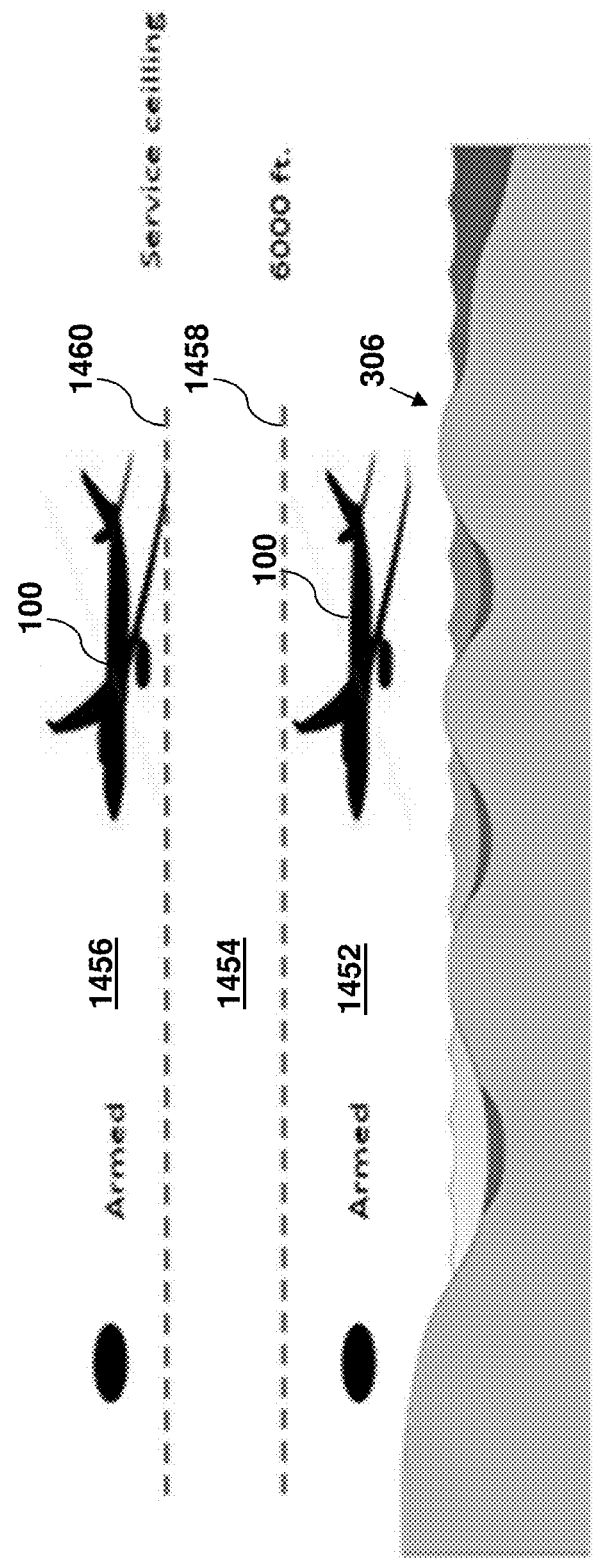

FIG. 14C illustrates an example of how the system may be configured to dynamically arm and disarm the ejectable flight data recorder system based on an altitude of the aircraft 100. The diagram shown in FIG. 14C comprises a disarmed region 1454 and armed regions 1452 and 1456. The border 1458 between the armed region 1452 and disarmed region 1454 is set in this embodiment at 6000 feet. Other embodiments may set this border 1458 at other levels, as discussed above. The upper border 1460 between disarmed region 1454 and armed region 1456 is set in this embodiment at the service ceiling of the aircraft 100. In other embodiments, this upper-level 1460 may be set differently, as discussed above.

Figure 15:
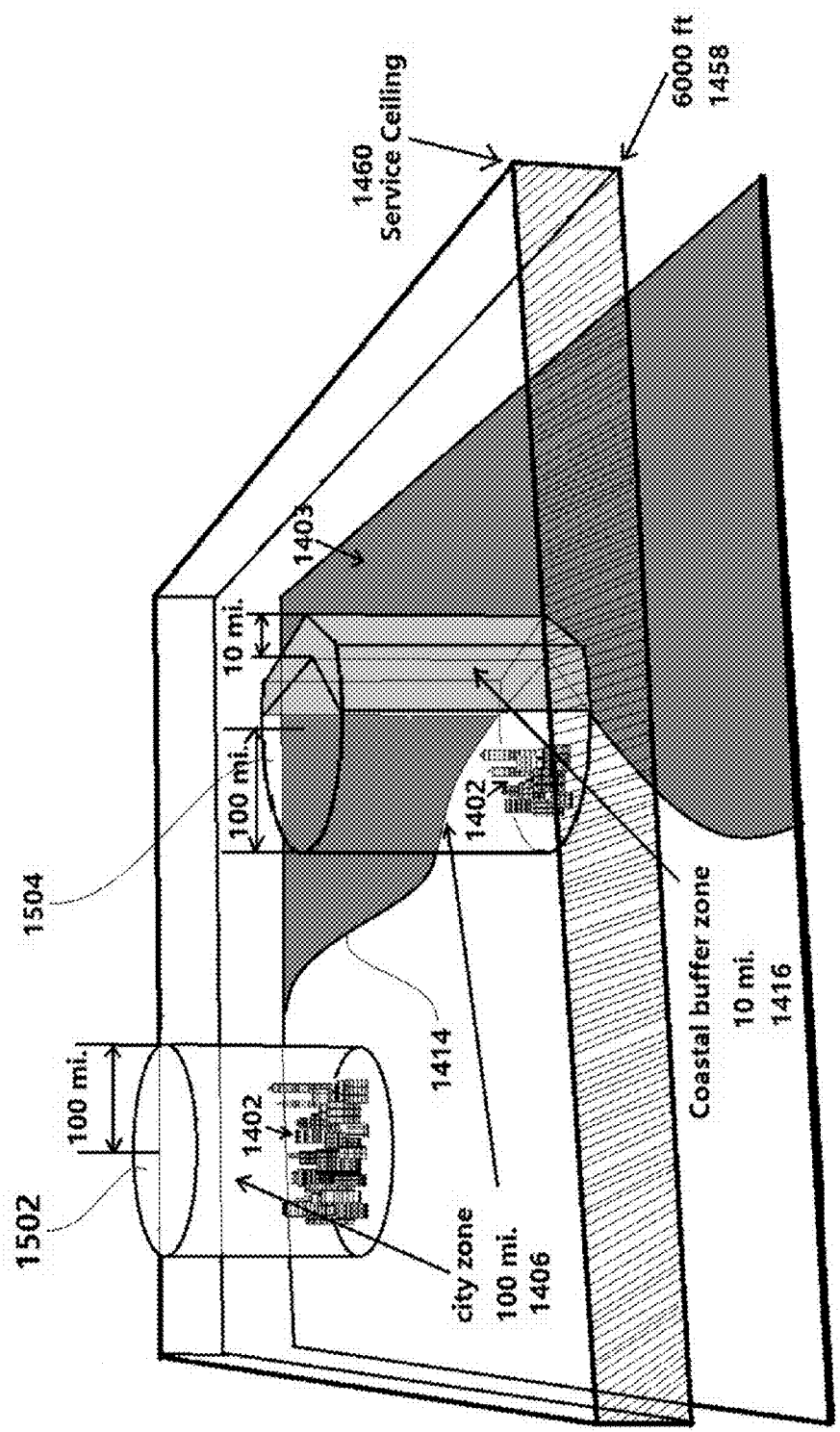
FIG. 15 illustrates a schematic diagram of regions in three-dimensional space where an embodiment of an ejectable flight data recorder system may be armed or disarmed based on an aircraft's location.

FIG. 15 illustrates a three-dimensional depiction of how various arming conditions based on an aircraft's geographic position and/or altitude may combine to create various regions, such as disarmed regions 1502 and 1504. In this example, disarmed region 1502 comprises a cylinder having a 100 mile radius about a city 1402. In this embodiment, there is no upper limit to the altitude or height of the disarmed region 1502. In some embodiments, however, there may be an upper limit to the height of the disarmed region 1502. Disarmed region 1504 comprises a shape that combines the concepts illustrated in FIGS. 14A and 14B related to a disarmed region about a populated area 1402 and near a coastline 1414. If the coastline 1414 were not near the city 1402, then disarmed region 1504 may be similar in shape to disarmed region 1502, meaning it may be a generally cylindrical region centered on the city 1402. However, because the city 1402 is near the coastline 1414, the arming controller may be configured to modify the shape of the disarmed region 1504 by bringing the outer border of the disarmed region in closer to the city where the city is adjacent the coastline 1414. For example, in this embodiment, wherever the disarmed region 1504 crosses into the body of water 1403, the border of the disarmed region 1504 is set at a distance of 10 miles from the coastline 1414. However, where the disarmed region 1504 does not cross into the body of water 1403, the border of the disarmed region 1504 is set at a longer distance, in this case 100 miles, from the city 1402.

FIG. 15 also illustrates upper and lower altitude thresholds 1460, 1458, respectively, that are configured to control an arming state of the system when the system is not within the disarmed regions 1502, 1504. For example, when an aircraft is not within the disarmed regions 1502, 1504, the system may be configured to be disarmed when between upper and lower predetermined altitude levels 1460 and 1458, but armed otherwise.

Example Arming and Ejection Process

Figure 16:
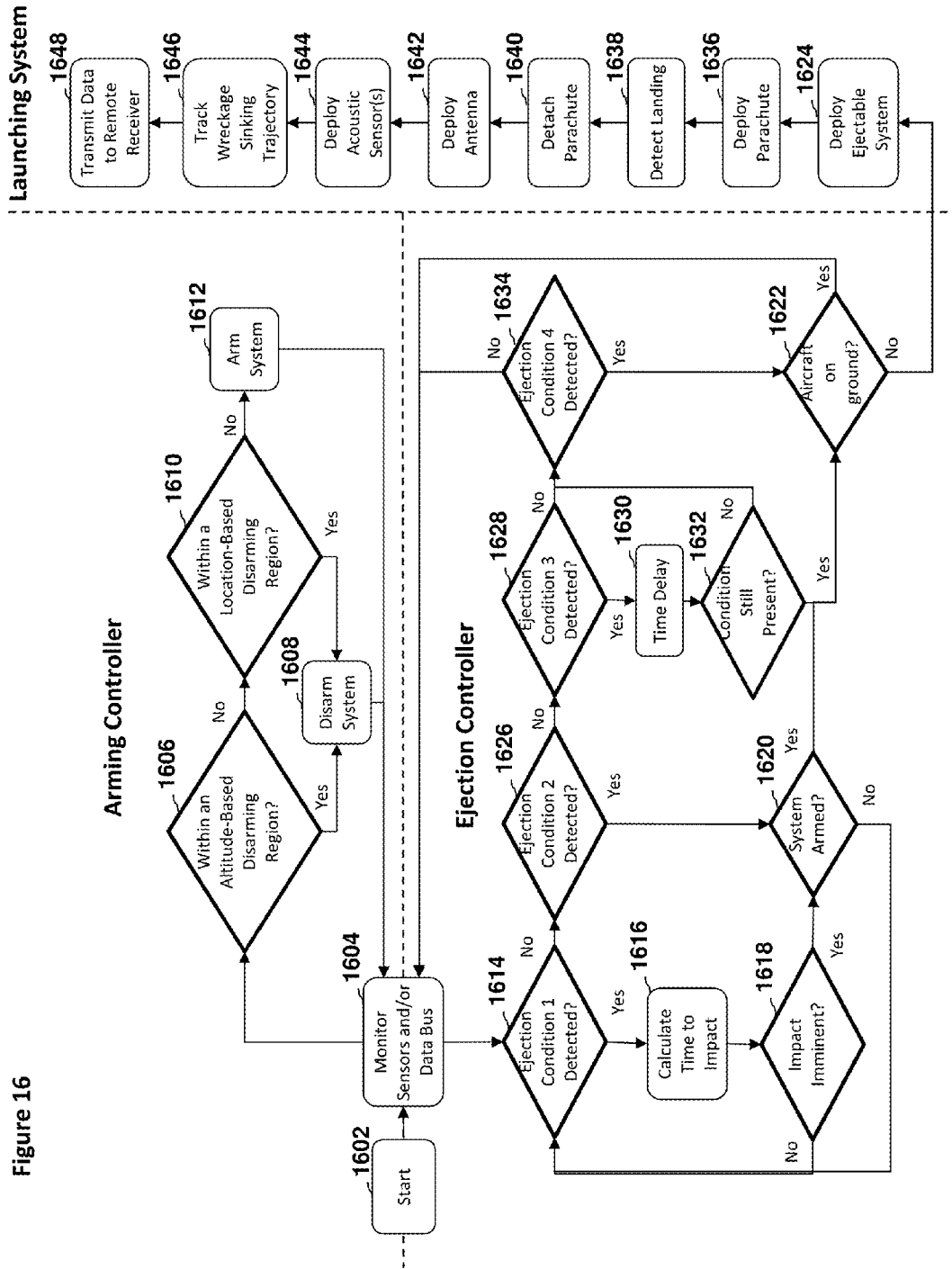
FIG. 16 illustrates an embodiment of a process flow diagram showing an example of an arming controller, ejection controller, and launching system operating to monitor data and cause an ejectable flight data recorder module to be launched.

FIG. 16 illustrates an example embodiment of a process flow diagram that may be performed by, for example, the systems illustrated and discussed above with reference to FIGS. 2 and 13. This process flow diagram illustrates one example of dynamically arming an ejection system, dynamically analyzing multiple ejection conditions, and causing automatic launching of an ejectable module upon a determination that an ejection condition has occurred and that the ejectable module should be ejected. This process flow diagram is merely one example of an implementation of an arming controller, ejection controller, and launching system, and various other embodiments may operate differently to implement the features discussed elsewhere herein, and/or may comprise more or fewer blocks than are described in FIG. 16.

The process flow begins at block 1602. At block 1604, an arming controller and ejection controller monitor one or more sensors and/or an aircraft data bus. For example, the arming controller 220 and the ejection controller 222 of FIG. 13 may be configured to monitor various sensors and a data bus of the aircraft. At block 1606, the arming controller determines whether the aircraft is within an altitude-based disarming region. For example, the arming controller may be configured to analyze a present altitude of the aircraft and compare that altitude to one or more predetermined altitude threshold levels that define one or more borders between armed and disarmed regions. If the arming controller 220 determines the aircraft is within an altitude based disarming region, the process flow proceeds to block 1608, and the arming controller 220 disarms the system. The process flow then proceeds back to block 1604, and the arming controller continues to monitor sensors and/or the aircraft data bus.

If the arming controller determines the aircraft is not within an altitude based disarming region at block 1606, the process flow proceeds to block 1610. At block 1610, the arming controller is configured to determine whether the aircraft is presently within a location-based disarming region. For example, the arming controller 220 may be configured to analyze GPS or other geographic location data and compare that data to information that defines location-based disarming regions based on distances from various landmarks, such as cities, populated areas, airports, coastlines, and/or the like. If the arming controller determines the aircraft is not presently within a location-based disarming region, the process flow proceeds to block 1612 and the arming controller arms the launching system. The process flow then proceeds back to block 1604 and continues as described above. If the arming controller determines at block 1610 that the aircraft is within a location-based disarming region, the process flow proceeds to block 1608 and continues as described above.

Now turning to the ejection controller, at block 1614, the ejection controller determines whether a first ejection condition has been detected. For example, this ejection condition may correspond to the example ejection condition one from FIG. 13, namely that the system detects the aircraft is in an operating state where a crash is likely to occur at some point in the near future. For example, detection of this ejection condition at block 1614 may comprise detecting a rapid downward pitch of the aircraft, detecting loss of thrust, detecting an increasing airspeed in a downward direction, detecting a rapid loss of altitude, and/or the like. If the ejection controller detects that condition one has or is occurring at block 1614, the process flow proceeds to block 1616. At block 1616, the ejection controller is configured to calculate or estimate a time to impact. For example, the ejection controller may be configured to analyze an airspeed of the aircraft, a rate of altitude loss, an altitude of the ground near the present area or anticipated impact area, and/or the like to estimate a remaining time until the aircraft impacts the ground or water. At block 1618, the process flow varies depending on whether an impact with the ground or water is imminent. For example, based on the calculated time to impact from block 1616, the ejection controller may be configured to determine whether the estimated time to impact is within a predetermined threshold, such as one second, five seconds, 10 seconds, 30 seconds, or the like. By determining the estimated time to impact is within such a predetermined threshold, this can be considered an indication that an impact is imminent. If an impact is not imminent at block 1618, the process flow proceeds back to block 1614, and the ejection controller continues to check whether ejection condition one is still detected. By operating in this fashion, an inadvertent or premature deployment of the ejectable module may be avoided, because the ejectable module will only be caused to eject when an impact is imminent. If the pilot is able to resolve the present issue and return to normal flight, the system will desirably not eject the module.

If the ejection controller determines at block 1618 that an impact is imminent, then the process flow proceeds to block 1620. At block 1620, the process flow varies depending on whether the system is armed. For example, if the aircraft is presently within a disarming region based on altitude or location, the arming controller may have disarmed the system, and the process flow would proceed back to block 1614 for the ejection controller to continue the process as described above. If the system is armed at block 1620, however, the process flow proceeds to block 1622. At block 1622, the process flow varies depending on whether the aircraft is on the ground, such as there being weight on the wheels. If the aircraft is on the ground, such as may be determined by the arming controller 220, the system may cause the ejectable module to not be ejected, and the process flow can proceed back to block 1604 and proceed as described above. If the aircraft is not on the ground at block 1622, however, the process flow can proceed to block 1624, where the launching system, such as launching system 254, can be caused to eject and ejectable system, such as ejectable module 104 illustrated in FIG. 2.

Returning to the process flow blocks implemented by the ejection controller, at block 1626, the process flow varies depending on whether a second ejection condition has been detected. This ejection condition two may, for example, correspond to example ejection condition two of FIG. 13, namely that a collision is detected. If ejection condition two is detected, the process flow proceeds to block 1620 and proceeds as described above. If ejection condition two is not detected, the process flow proceeds to block 1628, and the ejection controller determines whether ejection condition three has been detected. Ejection condition three may, for example, correspond to example ejection condition three of FIG. 13, namely loss of bus power without a simultaneous detection of a shock load. As discussed above, detection of a loss of bus power may be an indicator that an explosion has occurred. If that loss of bus power does not occur at or around the same time as a shock load, it is possible that an explosion has not occurred, however, or that a less significant explosion has occurred. Accordingly, it may be desirable to wait a predetermined amount of time before launching the ejectable module. Accordingly, if ejection condition three is detected, the process flow proceeds to block 1630, where a time delay is implemented. This time delay may take various values, such as, for example, no greater than five, 10, 20, 30, 60 seconds or other values. At block 1632, the process flow varies depending on whether ejection condition three is still present. If ejection condition three is still present after the time delay, the process flow proceeds to block 1622 and proceeds as described above to potentially launch the ejectable module. If ejection condition three is not still present at block 1632, after the time delay, the process flow proceeds to block 1634.

At block 1634, the process flow varies depending on whether ejection condition four is present. Ejection condition four may be, for example, example ejection condition four illustrated in FIG. 13, namely loss of aircraft bus power, accompanied with detection of a shock load. Because such a condition is likely to be indicative of an explosion occurring, the system may be configured to proceed directly to block 1622 upon detection of such condition, instead of implementing a time delay 1630. If ejection condition four is not detected at block 1634, the process flow proceeds back to block 1604 and proceeds as described above.

Although this process flow diagram illustrates an example of the ejection controller checking for four different ejection conditions, various other embodiments may check for fewer conditions, more conditions, different conditions, and/or the like.

Starting at block 1636, the process flow diagram illustrates some of the processes that may be performed by the launching system, including the ejectable system, upon ejection of the ejectable system. These processes may be performed by, for example, the launching system 254 and ejectable module 104 illustrated in FIG. 2, and described above. At block 1636, the ejectable system may deploy a parachute, which may help to control a descent of the ejectable system. At block 1638, the ejectable system can be configured to detect a landing, either on the ground or water. At block 1640, the ejectable system can be configured to detach the parachute from the ejectable system in response to detecting the landing. This may be desirable, for example, so that to the parachute does not cause the ejectable system to be dragged underwater or the like.

At block 1642, the ejectable system may be configured to deploy an antenna. For example, the embodiment described above with reference to FIGS. 9A-9D may be configured to deploy its external antenna 916. Some embodiments may not have an antenna that needs to be deployed, however.

At block 1644, the ejectable system may be configured to deploy acoustic sensors of an acoustic tracking system. For example, the ejectable system may be configured to deploy acoustic sensors or hydrophones 1106 as illustrated in FIGS. 11C-11E. At block 1646, the ejectable system can be configured to track a sinking trajectory of the crashed aircraft using the deployed acoustic tracking system. At block 1648, the ejectable system can be configured to transmit data to a remote receiver, such as a satellite, aircraft, boat, buoy, and/or the like. This data may comprise, for example, flight data stored before the emergency event, location information related to the present location of the ejectable module, trajectory tracking information related to the sinking aircraft, and/or the like.

Computing System

Figure 17:
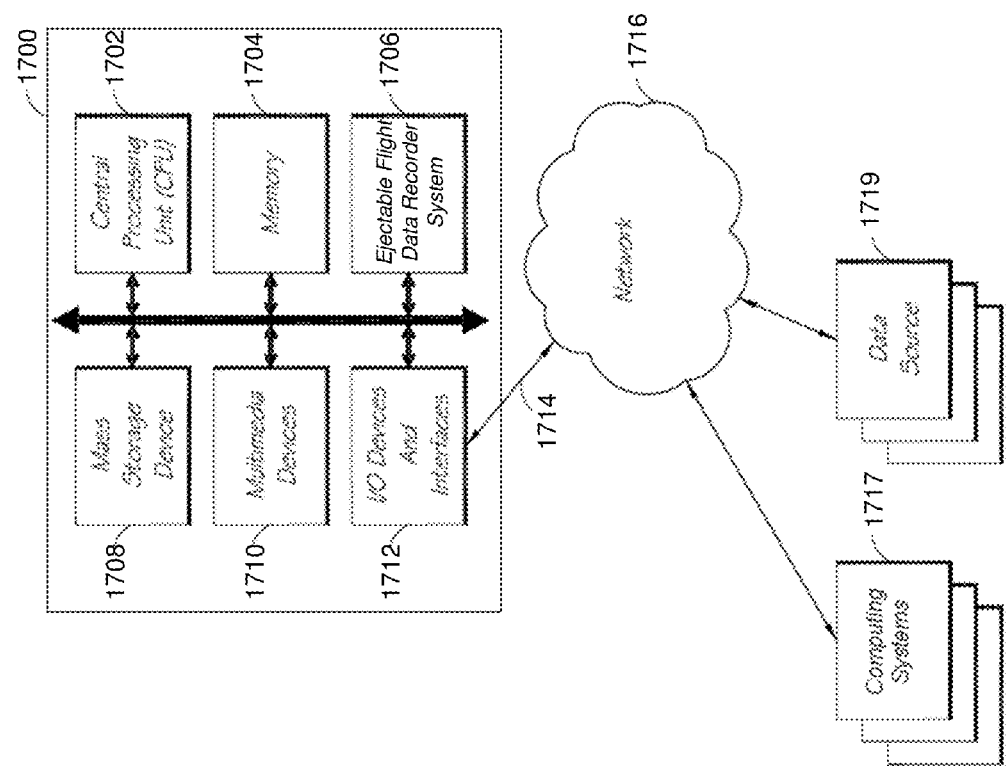
FIG. 17 is a block diagram depicting an embodiment of a computer hardware system configured to run software for implementing one or more embodiments of the systems described herein.

FIG. 17 is a block diagram depicting an embodiment of a computer hardware system configured to run software for implementing one or more embodiments of the ejectable flight data recorder systems and other systems described herein.

In some embodiments, at least a portion of the systems described above take the form of some or all of the computing system 1700 illustrated in FIG. 17, which is a block diagram of one embodiment of a computing system that is optionally in communication with one or more computing systems 1717 (for example, other systems of the aircraft, satellite systems, ground systems, user access point systems used to configure the ejectable flight data recorder system, and/or the like) and/or one or more data sources 1719 (for example, sensors, inputs, databases, external systems, and/or the like) via one or more networks 1716. The computing system 1700 may be used to implement one or more of the systems and methods described herein. While FIG. 17 illustrates one embodiment of a computing system 1700, it is recognized that the functionality provided for in the components and modules of computing system 1700 may be combined into fewer components and modules, further separated into additional components and modules, and/or in some embodiments the system may comprise fewer or additional components and modules. For example, a fully-autonomous system may not comprise a multimedia device 1710 and/or user interfaces 1712, although a multimedia device and/or user interface may be desirable in some embodiments, such as to facilitate human interaction with the system, such as for configuration of the system.

Ejectable Flight Data Recorder System Module

In one embodiment, the computing system 1700 comprises an ejectable flight data recorder system module 1706 that carries out one or more of the functions described herein with reference to controlling ejection procedures and/or accomplishing one or more processes included in the ejection procedure and/or after ejection, including any one of the techniques described above. The ejectable flight data recorder system module 1706 and/or other modules may be executed on the computing system 1700 by a central processing unit 1702 discussed further below.

In general, the word "module," as used in this section with reference to FIG. 17 (but not as used elsewhere in reference to an ejectable module, such as ejectable module 104), refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 1700 also comprises a mainframe computer suitable for controlling and/or communicating with large databases, performing high volume transaction processing, and generating reports from large databases. The computing system 1700 also comprises a central processing unit ("CPU") 1702, which may comprise a conventional microprocessor. The computing system 1700 further comprises a memory 1704, such as random access memory ("RAM") for temporary storage of information and/or a read only memory ("ROM") for permanent storage of information, and a mass storage device 1708, such as a hard drive, diskette, or optical media storage device. Typically, the modules of the computing system 1700 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1700 may comprise one or more commonly available input/output (I/O) devices and interfaces 1712, such as a keyboard, mouse, touchpad, and printer. In one embodiment, the I/O devices and interfaces 1712 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1712 comprise a microphone and/or motion sensor that allow a user to generate input to the computing system 1700 using sounds, voice, motion, gestures, or the like. In the embodiment of FIG. 17, the I/O devices and interfaces 1712 also provide a communications interface to various external devices. The computing system 1700 may also comprise one or more multimedia devices 1710, such as speakers, video cards, graphics accelerators, and microphones, for example.

Computing System Device/Operating System

The computing system 1700 may run on a variety of computing devices, such as, for example, an electronic board, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1700 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1700 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 17, the computing system 1700 is coupled to a network 1716, such as a LAN, WAN, or the Internet, for example, via a wired, wireless, or combination of wired and wireless, communication link 1714. The network 1716 communicates with various computing devices and/or other electronic devices via wired or wireless communication links. In the embodiment of FIG. 17, the network 1716 is communicating with one or more computing systems 1717 and/or one or more data sources 1719.

Access to the ejectable flight data recorder system module 1706 of the computer system 1700 by computing systems 1717 and/or by data sources 1719 may be through a web-enabled user access point such as the computing systems' 1717 or data source's 1719 personal computer, cellular phone, smartphone, laptop, tablet computer, e-reader device, audio player, or other device capable of connecting to the network 1716. Such a device may have a browser module that is implemented as a module that uses text, graphics, audio, video, and other media to present data and to allow interaction with data via the network 1716.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1712 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1700 may comprise a physical or logical connection established between a remote microprocessor and a mainframe host computer for the express purpose of uploading, downloading, or viewing interactive data and databases on-line in real time. The remote microprocessor may be operated by an entity operating the computer system 1700, including the client server systems or the main server system, an/or may be operated by one or more of the data sources 1719 and/or one or more of the computing systems 1717. In some embodiments, terminal emulation software may be used on the microprocessor for participating in the micro-mainframe link.

In some embodiments, computing systems 1717 who are internal to an entity operating the computer system 1700 may access the ejectable flight data recorder system module 1706 internally as an application or process run by the CPU 1702.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 17, the network 1716 may communicate with other data sources or other computing devices. The computing system 1700 may also comprise one or more internal and/or external data sources. In some embodiments, one or more of the data repositories and the data sources may be implemented using a relational database, such as DB2, Sybase, Oracle, Code-Base and Microsoft® SQL Server as well as other types of databases such as, for example, a flat file database, an entity-relationship database, and object-oriented database, and/or a record-based database.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

What is claimed is:

1. An ejectable flight data recorder for robust retention of flight data and aiding in locating an aircraft after an emergency situation in a remote location over a body of water, the ejectable flight data recorder comprising:
    a buoyant housing configured to provide shock and heat protection to components positioned within the housing;
    a nonvolatile memory positioned within the housing, the nonvolatile memory configured to store flight data comprising at least duplicated data from a conventional flight data recorder and a cockpit voice recorder;
    an energy-dissipating nose cone positioned at a distal end of the housing for reducing an impact load on the housing and components positioned within the housing when the ejectable flight data recorder impacts a water surface;
    a distress signal generating circuit positioned within the housing;
    an antenna electrically coupled to the distress signal generating circuit, wherein the distress signal generating circuit is configured to transmit via the antenna a distress signal to a satellite;
    at least three hydrophones configured to be deployable from the housing and suspended beneath the housing after a water landing of the ejectable flight data recorder; and
    one or more computer processors programmed to analyze acoustic information received by the at least three hydrophones to estimate a sinking trajectory of the aircraft in a body of water.

2. The ejectable flight data recorder of claim 1, further comprising a water sensor configured to detect the water landing of the ejectable flight data recorder and to cause deployment of the at least three hydrophones and activation of the distress signal generating circuit.

3. The ejectable flight data recorder of claim 1, further comprising:
    a hydrophone separation structure comprising a spring positioned to separate the at least three hydrophones from each other after deployment from the housing, wherein the at least three hydrophones are configured to detect a signal transmitted by an underwater locator beacon of the aircraft.

4. The ejectable flight data recorder of claim 1, further comprising at least one sonar sensor for tracking the sinking trajectory of the aircraft.

5. The ejectable flight data recorder of claim 1, further comprising:
    a first orientation sensor for detecting an orientation of the housing with respect to an environment; and
    a second orientation sensor for detecting an orientation of one or more of the at least three hydrophones with respect to the environment or the housing.

6. The ejectable flight data recorder of claim 1, wherein the nonvolatile memory is further configured to store data relating to an orientation and position of the ejectable flight data recorder.

7. The ejectable flight data recorder of claim 1, further comprising:
    a sustainable power system for providing backup electrical power, the sustainable power system comprising a solar panel array.

8. The ejectable flight data recorder of claim 1, further comprising:
a sustainable power system for providing backup electrical power, the sustainable power system comprising an electrochemical salt water generator.

9. The ejectable flight data recorder of claim 1, further comprising:
a sustainable power system for providing backup electrical power, the sustainable power system comprising a kinematic movement based generator.

10. The ejectable flight data recorder of claim 1, wherein the antenna comprises a combination of horizontally and vertically oriented elements.

11. The ejectable flight data recorder of claim 1, wherein the housing comprises an aerodynamically stable shape.

12. The ejectable flight data recorder of claim 1, wherein the energy-dissipating nose cone comprises a plurality of interconnected voids to enable crumpling of the nose cone to absorb energy when the ejectable flight data recorder impacts the water surface, the plurality of interconnected voids comprising a honeycomb configuration.

13. The ejectable flight data recorder of claim 1, wherein the buoyant housing comprises an aerodynamically stable shape having a longitudinal axis, the housing further comprising a flat outer surface oriented parallel to the longitudinal axis, a center of gravity of the ejectable flight data recorder being positioned such that the flat outer surface will tend to be oriented in an upward direction when the buoyant housing is floating in the body of water.

14. The ejectable flight data recorder of claim 7, wherein the housing comprises a polycarbonate material.

15. The ejectable flight data recorder of claim 1, wherein the housing comprises a plurality of composite materials.

16. The ejectable flight data recorder of claim 1, wherein the nonvolatile memory is further configured to store at least thirty minutes of data relating to a position of the ejectable flight data recorder.

17. The ejectable flight data recorder of claim 1, further comprising one or more position sensors for detecting a geographic position of the ejectable flight data recorder, wherein the one or more position sensors comprises at least one of the following: a global positioning system (GPS) sensor, a GLONASS sensor, an inertia based sensor, an altimeter, a barometer, or a compass.

18. The ejectable flight data recorder of claim 1, further comprising a visual warning system comprising one or more of a laser or LED light source configured to project light from the ejectable flight data recorder after the ejectable flight data recorder is deployed from the aircraft.

19. The ejectable flight data recorder of claim 1, further comprising an audible warning system configured to generate a sound as the ejectable flight data recorder descends after being deployed from the aircraft, the audible warning system comprising at least one of the following: one or more holes in an exterior surface of the housing sized and positioned to cause air passing therethrough to generate a sound, a whistle, a siren, or a speaker.

\* \* \* \* \*